United States Patent
Okada

(10) Patent No.: US 6,934,818 B2
(45) Date of Patent: Aug. 23, 2005

(54) ACCESS CONTROL APPARATUS AND METHOD FOR CONTROLLING ACCESS TO STORAGE MEDIUM

(75) Inventor: Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 09/901,605

(22) Filed: Jul. 11, 2001

(65) Prior Publication Data

US 2002/0046328 A1 Apr. 18, 2002

Related U.S. Application Data

(63) Continuation of application No. PCT/JP99/05679, filed on Oct. 14, 1999.

(30) Foreign Application Priority Data

Jan. 12, 1999 (JP) ............................................ 11-004979

(51) Int. Cl.[7] ............................................. G06F 12/00
(52) U.S. Cl. ....................... 711/154; 711/151; 711/158; 711/163; 711/167; 718/103; 710/40
(58) Field of Search ............................ 711/4, 151, 154, 711/158, 163, 167; 710/40, 44; 718/103

(56) References Cited

U.S. PATENT DOCUMENTS

| | | | | |
|---|---|---|---|---|
| 5,530,871 A | * | 6/1996 | Abe ........................... | 710/244 |
| 5,717,641 A | | 2/1998 | Ando et al. ................. | 365/191 |
| 5,761,692 A | * | 6/1998 | Ozden et al. .................. | 711/4 |
| 5,787,482 A | * | 7/1998 | Chen et al. ................. | 711/158 |
| 5,818,811 A | | 10/1998 | Fujii ........................ | 369/275.4 |
| 5,914,928 A | | 6/1999 | Takahashi ................. | 369/47.14 |
| 5,944,792 A | * | 8/1999 | Yamato et al. .............. | 709/219 |
| 5,991,106 A | * | 11/1999 | Ohmori ...................... | 360/46 |
| 6,023,720 A | * | 2/2000 | Aref et al. .................. | 709/103 |
| 6,233,648 B1 | * | 5/2001 | Tomita ......................... | 711/4 |
| 6,263,411 B1 | * | 7/2001 | Kamel et al. ............... | 711/167 |

FOREIGN PATENT DOCUMENTS

| | | |
|---|---|---|
| EP | 0701251 A1 | 3/1996 |
| EP | 0759677 A2 | 2/1997 |
| EP | 0798710 A2 | 10/1997 |
| EP | 0827139 A2 | 3/1998 |
| EP | 0886266 A2 | 12/1998 |
| JP | A-8-203142 | 8/1996 |
| JP | A-9-46691 | 2/1997 |
| JP | A-9-91879 | 4/1997 |
| JP | A-9-185864 | 7/1997 |
| JP | A-9-259537 | 10/1997 |
| JP | A-9-330566 | 12/1997 |
| JP | A-10-124879 | 5/1998 |
| JP | A-10-214455 | 8/1998 |
| JP | A-10-320774 | 12/1998 |
| JP | A-11-16216 | 1/1999 |
| JP | A-11-25610 | 1/1999 |
| JP | A-11-96559 | 4/1999 |
| JP | A-11-144383 | 5/1999 |

OTHER PUBLICATIONS

A.L. Narasimha Reddy, et al., "I/O Issues in a Multimedia System", COMPUTER, IEEE, Mar. 1994, pp. 69–74.

* cited by examiner

Primary Examiner—Mano Padmanabhan
Assistant Examiner—Jasmine Song

(57) ABSTRACT

In a write process through channels Ch1, Ch2, and Ch3, the deadline of each channel is set based on the transfer rate variable by the ratio of dummy packets to valid packets, and deadline information is written with write data on a disk. In a read process through a channel Ch4, the deadline is set according to the deadline information read with read data from the disk. Then, data is sequentially processed in order from the data having the earliest deadline. Considering the difference in transfer rate between outer and inner zones on the disk, a write zone is determined. When data is simultaneously recorded through the channels Ch1 and Ch2 on an ASMO in a groove-land record system, the data is sequentially recorded through the channel Ch1 on the groove and through the channel Ch2 on the land.

11 Claims, 57 Drawing Sheets

| MAXIMUM TRANSFER RATE (NUMBER OF BYTES/ NUMBER OF PACKETS) | DEADLINE INFORMATION | BINARY DATA | VALID DATA |
|---|---|---|---|

FIG. 15

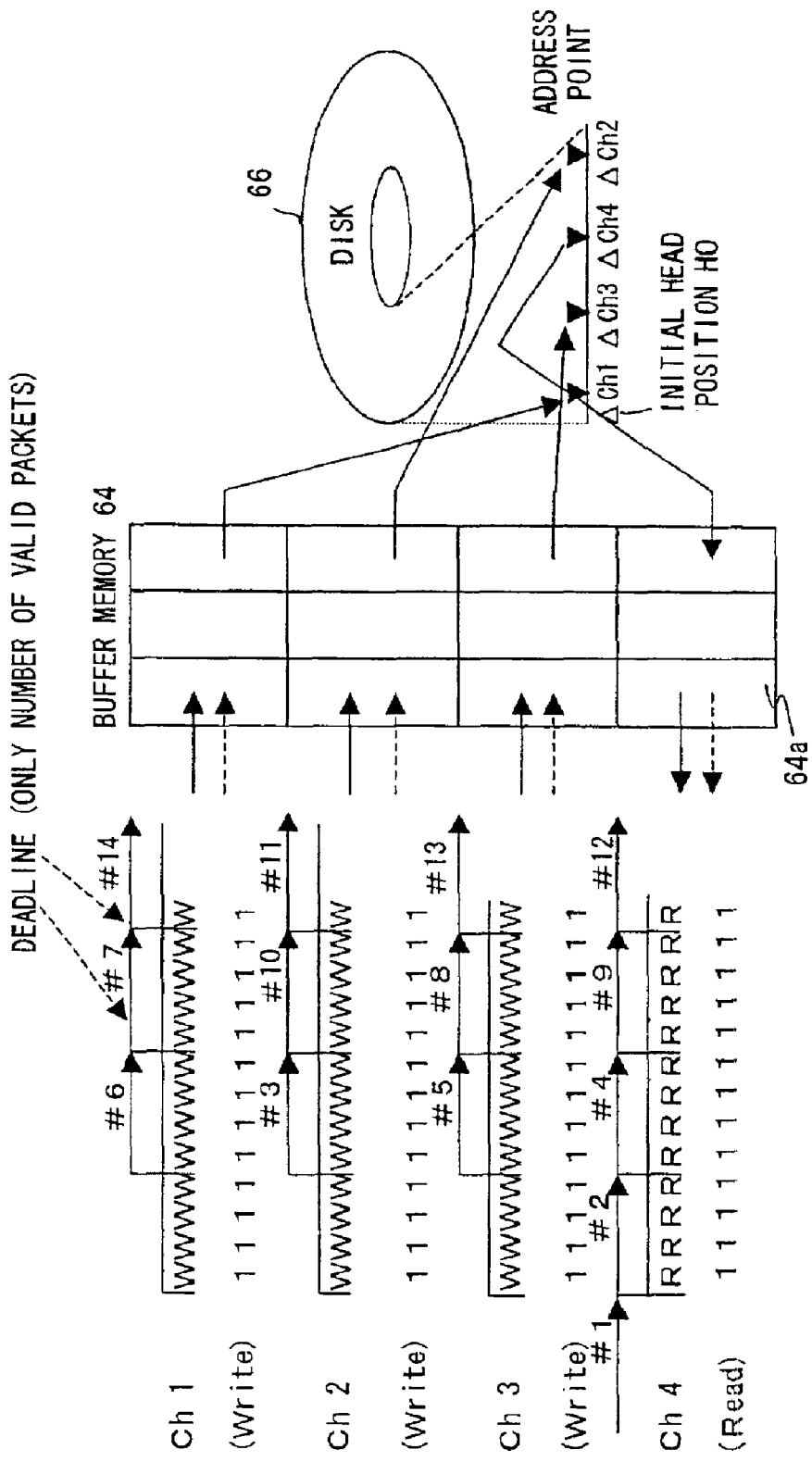
F I G. 16

| PROCESS ORDER | DEADLINE T | R/W | CHANNEL C | BLOCK ADDRESS A ON DISK |
|---|---|---|---|---|
| 1 | Ti | Wi | Ci | Ai |
| ⋮ | ⋮ | ⋮ | ⋮ | ⋮ |
| m−1 | Tj | Rj | Cj | Aj |
| m (REGISTRATION) | Tk | Rk | Ck | Ak |
| ⋮ | ⋮ | ⋮ | ⋮ | ⋮ |
| 2N | | | | |

Order(1) = {T, R/W, C, A}

$Tk(m) > Tj(m-1)$ ? → COMPLETED ;

$Tk(m) == Tj(m-1)$ ?

{$Ak(m) - Ah > Aj(m-1) - Ah$? → COMPLETED}

EXCHANGING Order(m) AND Order(m-1) ;

$Tk(m) > Tj(m/2)? \rightarrow > Tj(3m/4)?$
     CONTINUING
     $< Tj(3m/4)?$ $Tk(m) < Tj(m/2)? \rightarrow > Tj(m/4)?$
     CONTINUING
     $< Tj(m/4)?$ INSERTING Order(m) IN ORDER OF DETERMINATION;

FIG. 22

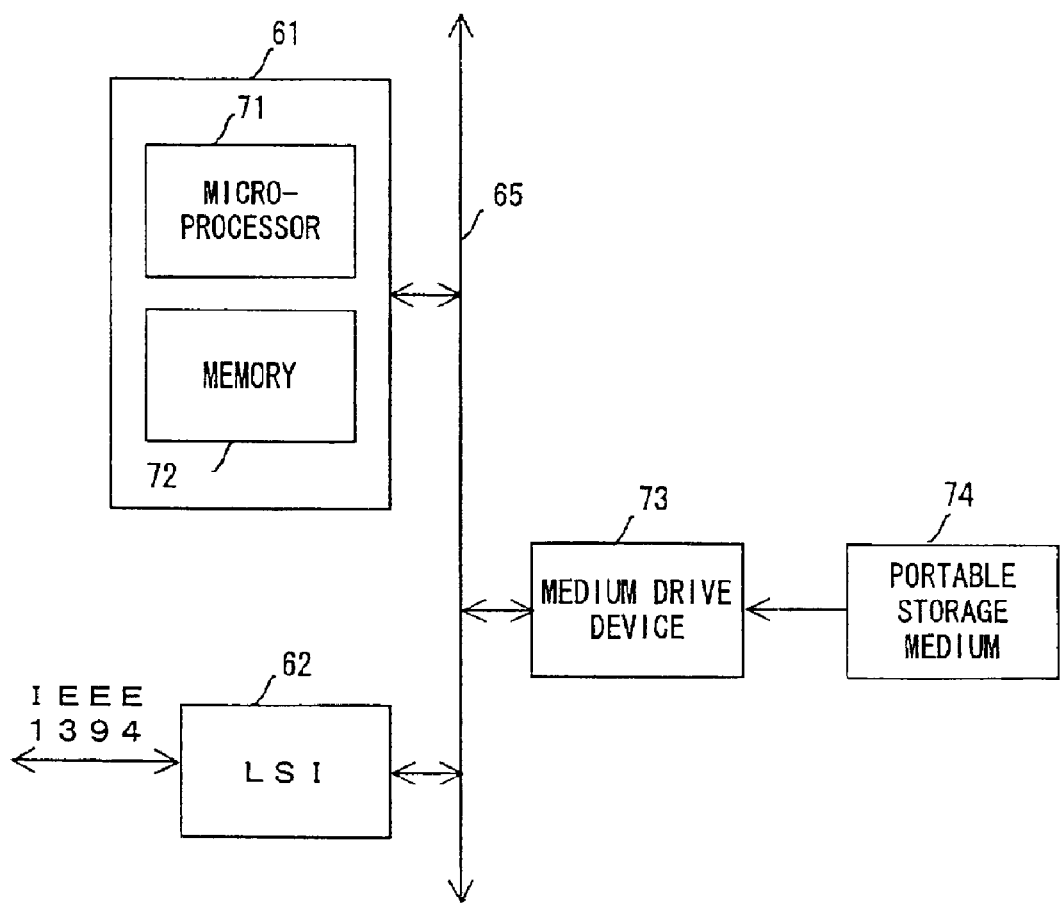
F I G. 30

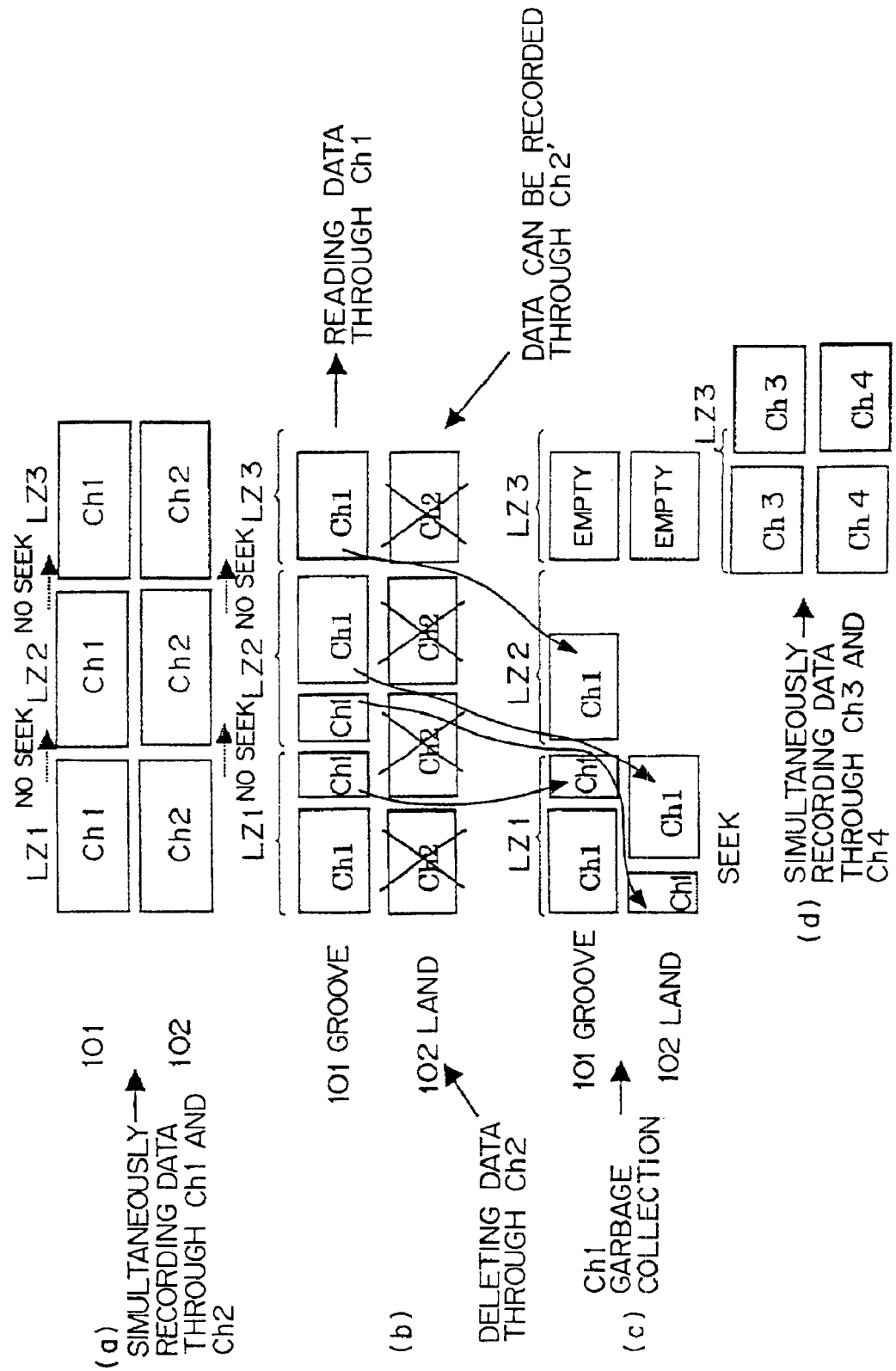
F I G. 34

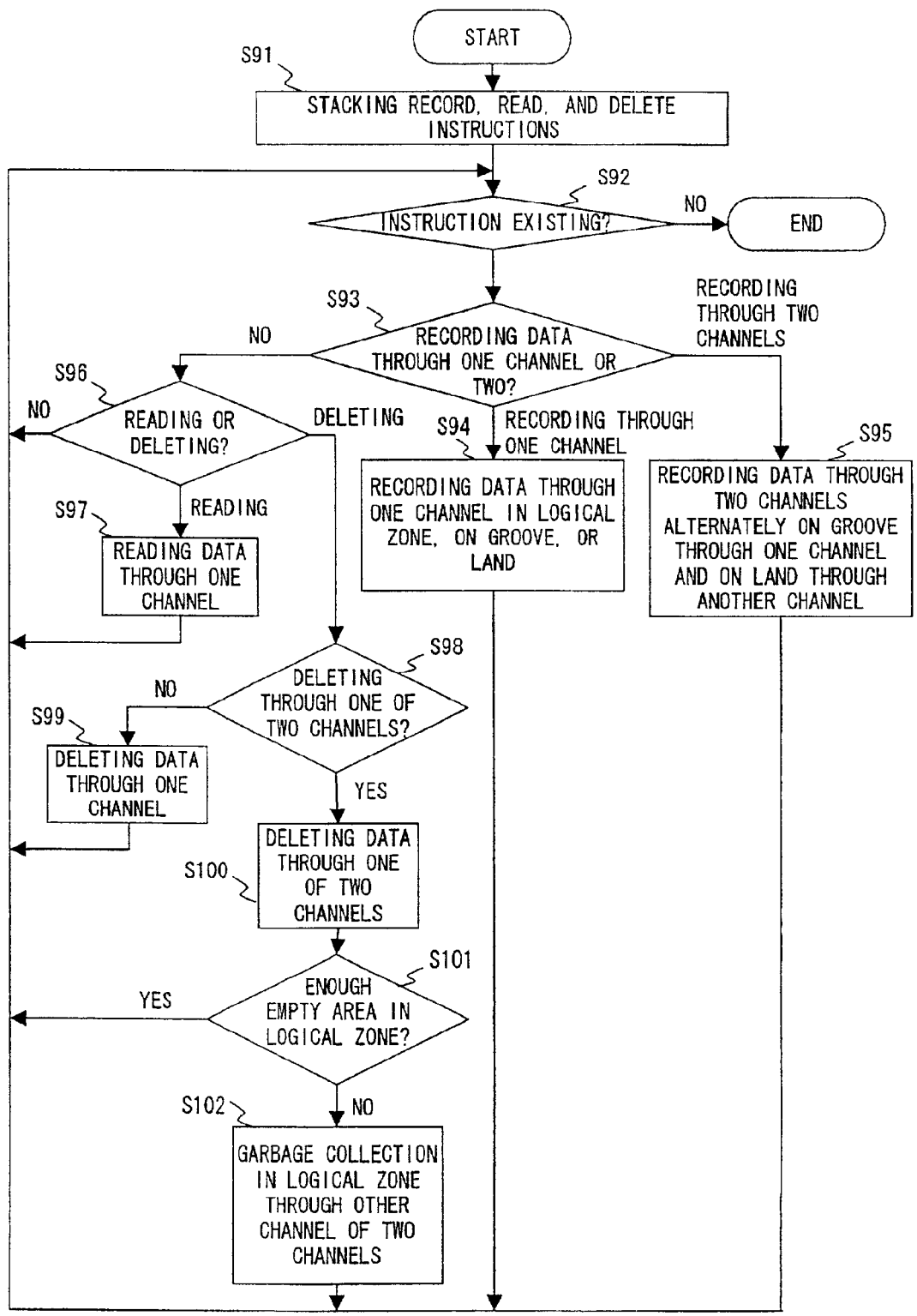
F I G. 3 5

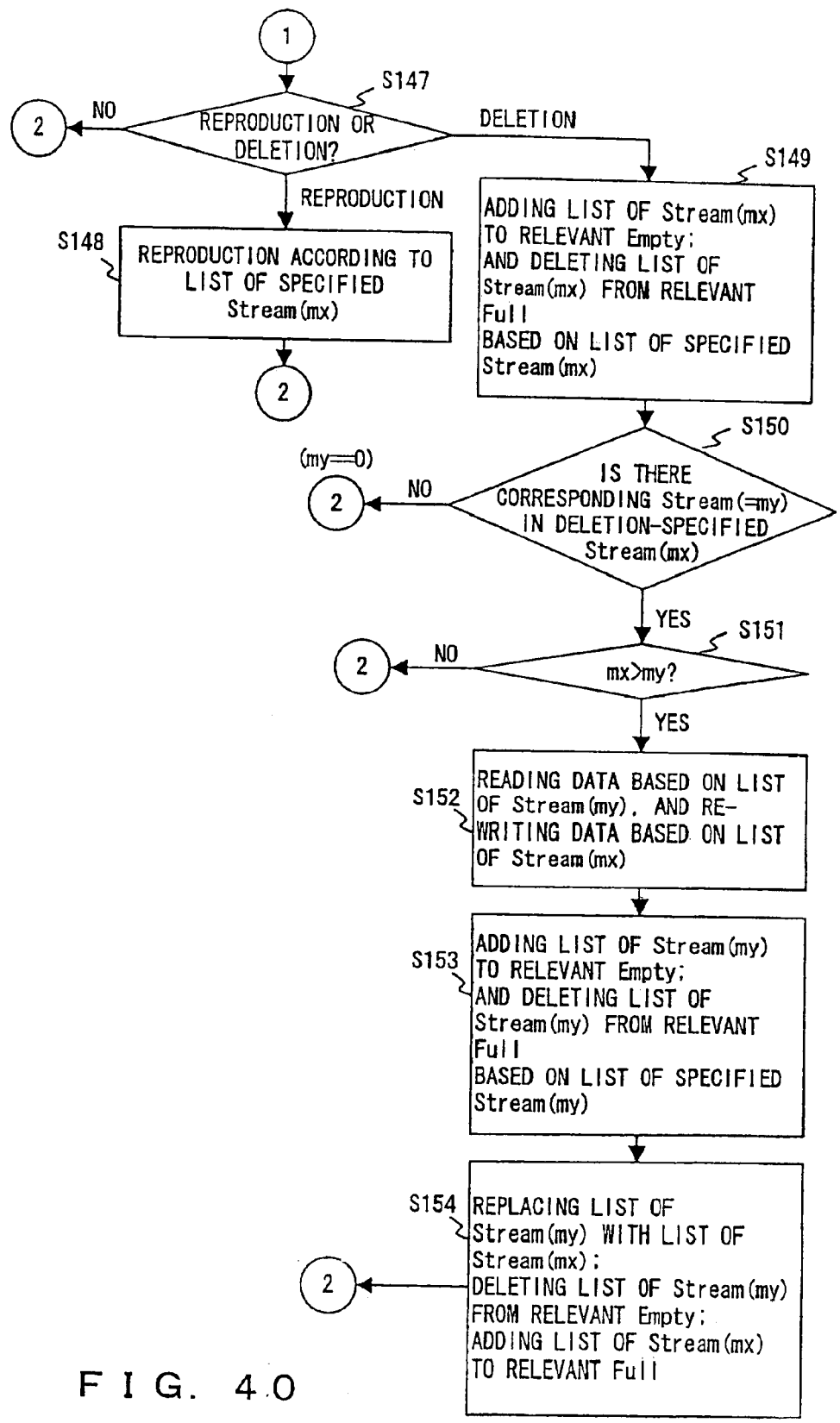
F I G. 40

| STREAM LIST | (LEADING ADDRESS, AMOUNT OF DATA) → COMPLETION, CORRESPONDING stream FOR RECORDING DATA THROUGH TWO CHANNELS |
|---|---|
| Stream(1) | (Add, Data) → (Add, Data) → ····· → End.m? |
| ... | |
| Stream(m) | (Add, Data) → (Add, Data) → ····· → End.m? |

120

F I G. 4 1

130

| INNER/OUTER | ZONE | EMPTY/FULL LIST | (LEADING ADDRESS, AMOUNT OF DATA) → COMPLETION : LIST STRUCTURE |
|---|---|---|---|
| INNER ZONE | 1 | Empty[1] | (Add, Data) → (Add, Data) →······→ End |
| | | Full[1] | (Add, Data) → (Add, Data) →······→ End |
| | ... | ... | ... |
| | n | Empty[n] | (Add, Data) → End |
| | | Full[n] | End |
| OUTER ZONE | n+1 | Empty[n+1] | (Add, Data) → End |
| | | Full[n+1] | End (INITIAL VALUE) |
| | ... | ... | ... |
| | 2n | Empty[2n] | (Add, Data) → (Add, Data) →······→ End |
| | | Full[2n] | (Add, Data) → (Add, Data) →······→ End |

FIG. 42

| ZONE no. | NUMBER OF BYTES/TRACK | NUMBER OF TRACKS | NUMBER OF SECTORS | SECTOR ADDRESS |
|---|---|---|---|---|
| 1 | 92KB | 1000 | 184k | 1-184000 |
| 2 | 100KB | 1000 | 200k | 184000-384000 |
| 3 | 108KB | 1000 | 216k | 384001-600000 |
| 4 | 116KB | 1000 | 232k | 600001-832000 |
| 5 | 124KB | 1000 | 248k | 832001-1080000 |
| 6 | 132KB | 1000 | 264k | 1080001-1344000 |

*: 512B/SECTOR

F I G. 4 3

| | STORAGE ADDRESS | MEANING OF INFORMATION | STORED DATA (LEADING STORAGE DEVICE, AMOUNT OF DATA, NEXT STORAGE ADDRESS) |
|---|---|---|---|
| | 0 | End | (0, 0, 0) |
| 120 { | 1 | Stream(1) | ①(0, 0, 0)③→(1080001, 264000, 19)⑤→(1, 184000, 20) |
| | 2 | Stream(2) | ①(0, 0, 0)②→(1, 184000, 18)④→(0, 0, 0) |
| | 3 | Stream(3) | ①(0, 0, 0)⑦→(1080001, 256000, 22) |
| 151 | 4 | Stream(4) | ①(0, 0, 0)⑥→(300001, 84000, 21) |
| | 5 | Stream(5) | ①(0, 0, 0) |
| | 6 | Empty[1] | ①(1, 184000, 0)②→(0, 0, 0)④→(1, 184000, 0)⑤→(0, 0, 0) |
| INITIALIZED AREA | 7 | Empty[2] | ①(184001, 200000, 0)③→(300001, 84000, 0)<br>④→(184001, 200000, 0)⑤→(300001, 84000, 0)⑥→(0, 0, 0) |
| | 8 | Empty[3] | ①(384001, 216000, 0)⑦→(0, 0, 0) |
| | 9 | Empty[4] | ①(600001, 232000, 0) |
| | 10 | Empty[5] | ①(832001, 248000, 0)③→(876001, 204000, 0)<br>⑤→(832001, 248000, 0)⑦→(876001, 204000, 0) |
| | 11 | Empty[6] | ①(1080001, 256000, 0)③→(0, 0, 0)⑤→(1080001, 256000, 0)<br>⑦→(0, 0, 0) |
| 130 | 12 | Full[1] | ①(1, 0, 0)②→(1, 184000, 0)④→(1, 0, 0)⑤→(1, 184000, 0) |
| | 13 | Full[2] | ①(184001, 0, 0)③→(184001, 116000, 0)④→(184001, 0, 0)<br>⑤→(184001, 11600, 0)⑥→(184001, 200000, 0) |
| | 14 | Full[3] | ①(384001, 0, 0)⑦→(384001, 216000, 0) |
| | 15 | Full[4] | ①(600001, 0, 0) |
| | 16 | Full[5] | ①(832001, 0, 0)③→(832001, 44000, 0)<br>⑤→(832001, 0, 0)⑦→(832001, 44000, 0) |
| | 17 | Full[6] | ①(1080001, 0, 0)③→(1080001, 256000, 0)<br>⑥→(1080001, 84001, 0)⑦→(1080001, 256000, 0) |
| 152 EXTENSION AREA | 18 | $Z_1 \rightarrow Z_2$ | (184001, 0, 0)③→(184001, 116000, 0) |
| | 19 | $Z_6 \rightarrow Z_5$ | (832001, 0, 0)③→(832001, 44000, 0) |
| | 20 | $Z_1 \rightarrow Z_2$ | (184001, 0, 0)⑤→(184001, 116000, 0) |
| | 21 | $Z_2 \rightarrow Z_3$ | (384001, 0, 0)⑦→(384001, 216000, 0) |
| | 22 | $Z_6 \rightarrow Z_5$ | (832001, 0, 0)⑦→(832001, 44000, 0) |
| | 23 | | |
| | 24 | | |
| | 25 | | |
| | 26 | | |
| | 27 | | |

FIG. 44

STEP 1: DISTRIBUTING AND RECORDING
DATA IN ZONES 1 AND 2     ← (17.5+20)/2>18
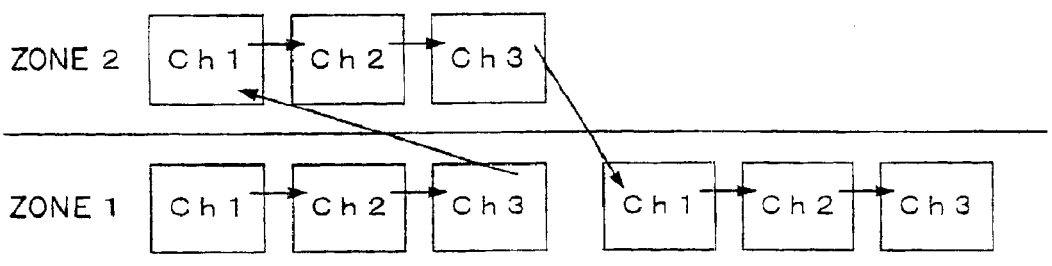
(a)
STEP 2: RECORDING
DATA IN ZONE 1  ←17.5>12
(b)
STEP 3: DISTRIBUTING AND RECORDING
DATA IN ZONES 2 AND 6   ← (20+30)/2>24
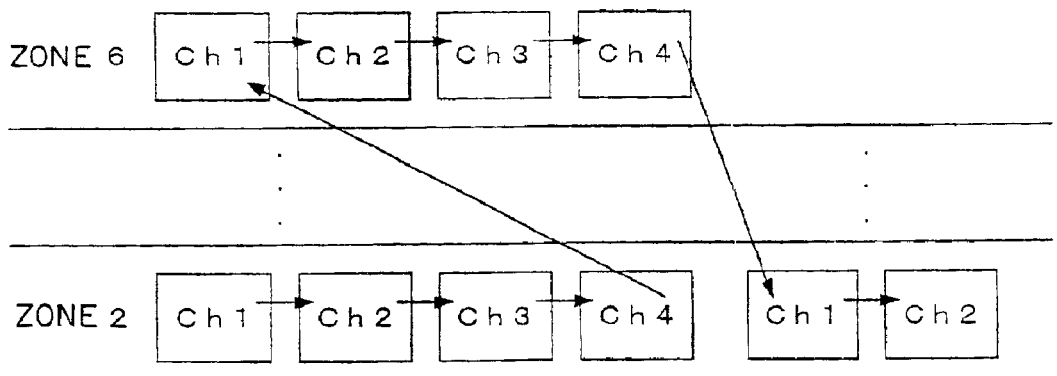
(c)
FIG. 53

STEP 1 : DISTRIBUTING AND RECORDING
DATA IN ZONES 2 AND 3     ← (20+22.5) ×0.9/2>18
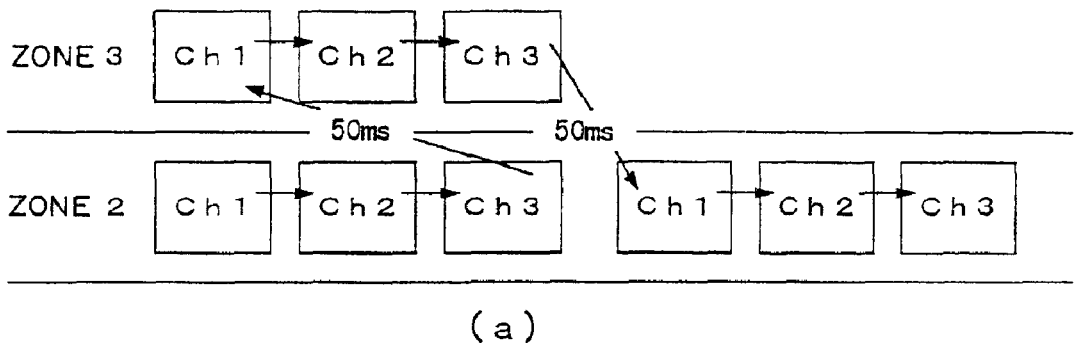
(a)
STEP 2 : RECORDING
DATA IN ZONE 1 ←17.5>12
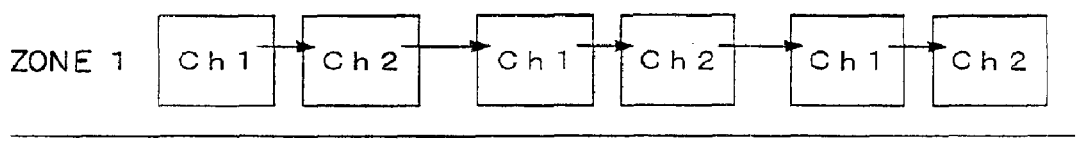
(b)
STEP 3 : DISTRIBUTING AND RECORDING
DATA IN ZONE 5 AND 6     ← (27.5+30) ×0.9/2>24
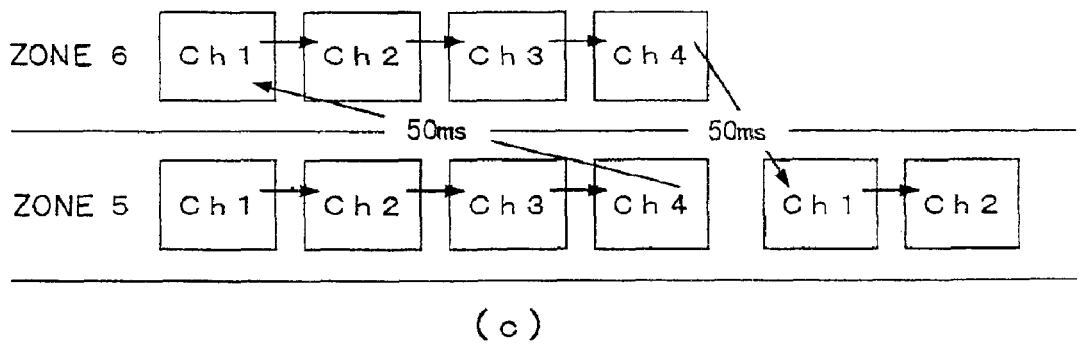
(c)
FIG. 54

STEP 1: DISTRIBUTING AND RECORDING
DATA IN ZONES 2 AND 3     ← $(20+2/3+22.5\times1/3)\times0.9>18$
DISTRIBUTING DATA ALTERNATELY THROUGH 1ch AND 2ch
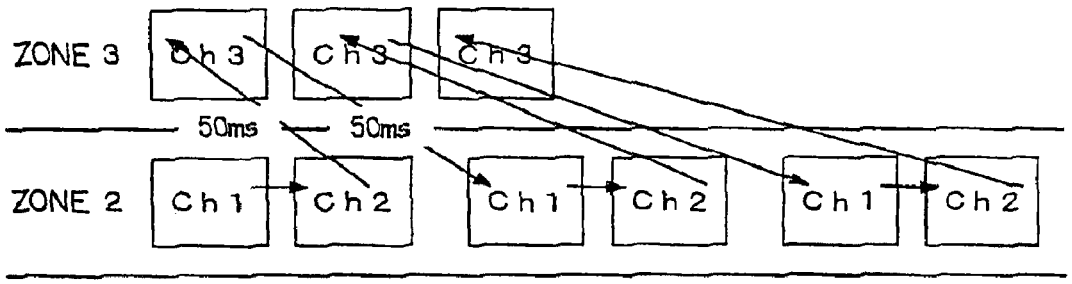
(a)
STEP 2: RECORDING DATA
IN ZONES 1 AND 2     $(\leftarrow17.5/2+20/2)\times0.9>12$
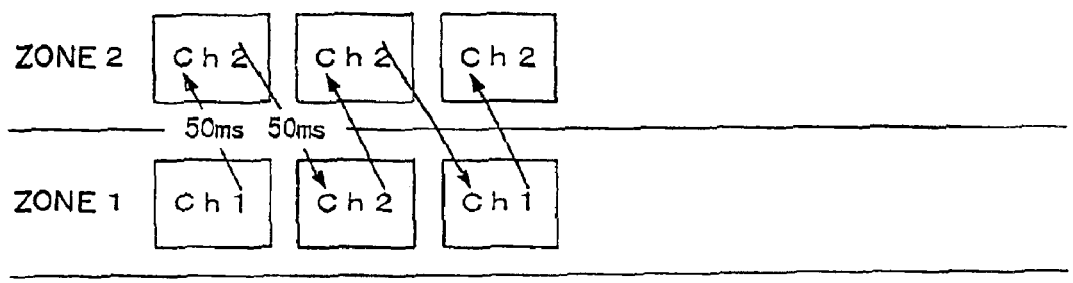
(b)
STEP 3: DISTRIBUTING AND RECORDING
DATA IN ZONES 5 AND 6     ← $(27.5\times2/4+30\times2/4)\times0.9>24$
ALTERNATELY DISTRIBUTING DATA IN TWO CHANNEL UNITS
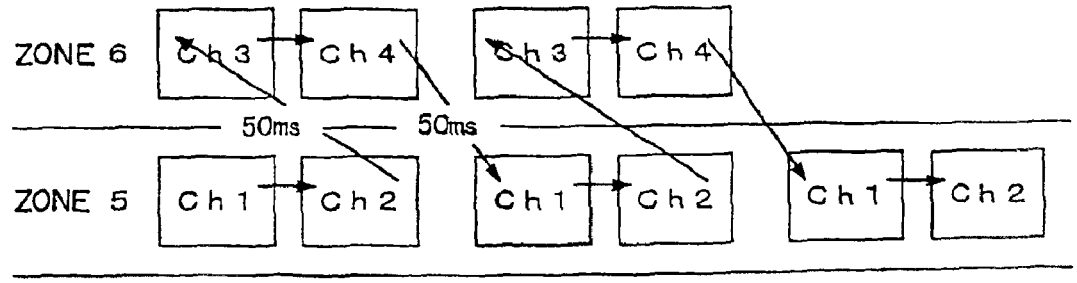
(c)
FIG. 55

ACCESS CONTROL APPARATUS AND METHOD FOR CONTROLLING ACCESS TO STORAGE MEDIUM

CROSS REFERENCE TO RELATED APPLICATION

This application is a continuation of international PCT application No. PCT/JP99/05679 filed on Oct. 14, 1999.

BACKGROUND OF THE INVENTION

1. Field of the Invention

The present invention relates to an apparatus and method for controlling the access to a storage medium to simultaneously record/read data along a plurality of channels.

2. Description of the Related Art

With remarkable progress in moving picture coding/decoding LSI (large scale integration) for microcomputers, MPEG 2 (Moving Picture Experts Group Phase 2), etc., the technology of digitizing pictures has been outstandingly improved. As a result, television broadcasting is quickly changing from an analog system to a digital system.

In satellite broadcasting using a BS (broadcasting satellite), a CS (communications satellite), etc., programs of several hundred channels are prepared in response to various requests from users.

With the growing tendency towards digital broadcasting and an increasing number of channels, and with the development of inexpensive set top boxes (STB) and digital TV (television) programs, etc., users are receiving a large volume of digital picture data at home. Therefore, it is predicted that there are an increasing number of opportunities to store data in a storage device.

To mainly aim at accumulating a large volume of picture data, a large capacity storage device such as a hard disk, an optical disk, etc. has been developed. For example, when the MPEG 2 is used, two-hour picture data can be compressed into several GB and stored.

For the above mentioned storage device, in addition to the throughput required for an input/output system of a computer, real-time processibility is newly required. In the situation, the most promising interface for realizing a home network connecting the STB, the storage device, a printer, a display device such as a TV, etc. can be a high-speed serial interface referred to as IEEE (Institute of Electrical and Electronic Engineers) 1394.

In the IEEE 1394, data such as voice, pictures, etc. are transferred in real time. Therefore, it has a unique transfer mode referred to as isochronous transfer to guarantee the transfer of data at a constant transfer rate. Therefore, when picture data is stored in the storage device, or when picture data is read from the storage device, the request for a real-time process should be satisfied based on the isochronous transfer.

In addition, with an increasing number of multi-channel systems, a process of simultaneously (to be exact, in time series) fetching data along a plurality of channels is to be performed. Therefore, it is important to check how many channels of data can be simultaneously and efficiently stored/read with the request for the real-time process satisfied.

However, in the case of the storage device, there are a number of time factors such as, in addition to a data transfer, a wait for seek, a wait for turn, verification, retry, etc. A wait for seek indicates the time required for a disk head to move to a desired track. A wait for turn indicates a time required to turn a disk until the head of a desired sector appears below the disk head. Verification indicates a process of confirming written data. Retry indicates accessing again when access first fails.

The above mentioned time factors often prevent a real time process of successfully keeping a schedule after terminating a process within a predetermined deadline. Therefore, to efficiently access a disk, the order of reading/writing data, and the areas of storing and reading data have been controlled by disk scheduling according to the conventional technology.

The following methods are listed as the conventional scheduling algorithm (A. L. N. Reddy and J. C. Wyllie, "I/O Issues In a Multimedia System", Computer, 27, Mar, pp. 69–74, 1994.).

(1) EDF (Earliest Deadline First): The method of prioritizing the process having the earliest deadline.

(2) LSTF (Least Slack Time First): The method of prioritizing the process having the shortest time allowance.

(3) SSTF (Shortest Seek Time First): The method of prioritizing the process having the shortest seek time.

(4) SCAN: The method of prioritizing the process having the shortest seek time in the same seek direction.

(5) SCAN-EDF: The method of first prioritizing the process having the earliest deadline, and adopting SCAN for the processes having the same deadline.

In the above listed algorithms, (1) and (2) consider the time elements only, and do not take the efficiency of disk access (shortening the seek time) into account. On the other hand, (3) and (4) consider the elements of efficiency, but do not take the elements of time into account. Therefore, they are not appropriate for a real time process. As a result, the algorithm (5) is commonly used at present because it takes both time and efficiency in disk access into account.

FIG. 1 shows the concept of the disk scheduling by the above mentioned EDF and SCAN. In this example, it is assumed that the picture data along four channels flow in a time division system. Ch1, Ch2, and Ch3 in the four channels CH1, Ch2, Ch3, and Ch4 are used in writing transmitted picture data to a disk 1, and Ch4 is used in reading picture data from the disk 1.

The conventional scheduling has been used for playback in most cases, and the simultaneous write process is not taken into account. Therefore, the picture data of each channel is collectively and sequentially stored for an easier read operation, and the address points of channels are often assigned separately. In this example, the address points indicating the write/read positions of the data of each channel on the disk 1 are separately assigned to Ch1, Ch3, Ch4, and Ch2 in this order from outer track to inner track as shown on the right in FIG. 1.

When a write process is performed, the received picture data is temporarily stored in one buffer of a double buffer 2. Then, the process of writing the first stored picture data has to be completed while the next picture data is being stored in the other buffer of the double buffer 2. For example, through Ch1, data W12 has to be stored in the double buffer 2, and the data W11 has to be written from the double buffer 2 to the disk 1 in the round T. The same process is performed for Ch2 and Ch3.

When a read process is performed, the picture data is first read from the disk 1, and temporarily stored in one buffer of the double buffer 2. While the stored picture data are being transmitted, the next picture data is to be read in advance from the disk 1, and the process of storing the read data in the other buffer of the double buffer 2 is to be completed. For example, through Ch4, while data R42 is being transmitted from the double buffer 2, the next data R43 is to be completely read from the disk 1 to the double buffer 2 in the round T.

In FIG. 1, since disk access is requested in the order of Ch1, Ch2, Ch3, and Ch4 in time series, the deadline of the process is set in the same order. Therefore, when the EDF is adopted, the disk 1 is accessed in the order of Ch1, Ch2, Ch3, Ch4, Ch1, Ch2, Ch3, Ch4, . . .

However, since the address points of the channels Ch1 through Ch4 are arranged in a different order, the seek distance between channels is long, and it takes a long time to move the head. Especially, the address points of Ch1 and Ch2 are set apart, and it takes a longer time to write data through Ch1 and Ch2.

When the SCAN is adopted, data is accessed in the order of Ch1, Ch3, Ch4, and Ch2 sequentially from the nearest position from the head regardless of the order of access requests. After accessing data through Ch2, the seek order is inverted, that is, data is accessed in the order of Ch2, Ch4, Ch3, Ch1. In this case, in response to access requests, the write operation through Ch1 is perform first in a round, but last in the next round. Therefore, there can be the possibility that an access request is not satisfied due to a long access interval. In such a case, the double buffer 2 has to be large enough to satisfy an access request.

On the other hand, the SCAN-EDF of the above mentioned method (5) is obtained by combining the EDF and the SCAN, and can realize the scheduling with both seek time and access request order taken into account.

However, the above mentioned conventional disk scheduling has the following problems.

In the conventional scheduling, the storage device receives and transmits picture data at a fixed rate. For example, FIG. 2 shows the process of inputting picture data of six channels Ch1 through Ch6 in the storage device at a predetermined bit rate. One transponder corresponds to the capacity of one line in satellite broadcasting.

On this assumption, it is considered that the deadline of writing/reading data through channels Ch1 through Ch6 is periodically set, and the deadline is set according to the initially determined round information.

However, the picture data displayed on a digital broadcast, etc. is statistically multiplexed as shown in FIG. 3. Therefore, the transfer rate is not always constant. In this case, the rate for one transponder is constant, but the transfer rate of coded data of the MPEP 2 of each channel depends on the speed of the movement of images, thereby realizing efficient broadcasting.

When a packet is transferred in the isochronous transfer system of the IEEE 1394, data to be transferred is normally contained in the packet. However, for the picture data transferred at the above mentioned variable rate, the transfer time guarantee is maintained by transmitting a dummy packet containing no data when data to be transferred is not regularly arranged due to the variable rate (in accordance with IEC (International Electrotechnical Commission) 18663 and IEEE 1394-1995).

FIG. 4 shows the procedure of the above mentioned packet transfer system. In this procedure, a 4-byte time stamp T is added to a 188-byte transport packet 3 to generate a 192-byte packet 3a. The packet is divided into 24-byte blocks. The four (which can be any other integer) data blocks are collected as one data block packet 4, and transferred as an isochronous transfer packet.

A header H of IEEE 1394 and a CIP (Common Isochronous Packet) header for multimedia data are added to the data block packet 4. The data block dividing method is defined in the CIP header, and a reception node can re-design the transport packet 3 according to the information.

One cycle start packet S and one data block packet 4 are transferred every 125 µs. If there is no data block packet 4, a dummy packet 5 containing only a CIP header is transferred as an isochronous transfer packet.

When the conventional deadline is set under the above mentioned situation, the deadline is defined for a case severer than a normal case based on the maximum transfer rate at which all isochronous transfer packets contain the data block packet 4. Therefore, data cannot be processed through a larger number of channels.

Furthermore, the above mentioned scheduling methods (1) through (5) are mainly used for playback, do not prescribe a write area on a disk, and assume that pieces of the picture data are separately stored on the disk. Therefore, when data is processed through a large number of channels, it may undesirably take a long seek time.

In addition, the current disk has a large storage capacity by dividing a high-density disk into a plurality of zones (tracks), and adopting the ZCAV (Zone Constant Angular Velocity) as a disk turn control system, thereby setting a higher transfer rate for an outer zone than an inner zone. The transfer rate of the innermost zone is, for example, about 60% of the transfer rate of the outermost zone.

However, the conventional scheduling method does not consider the above mentioned plurality of zones, but assumes that data are uniformly stored in inner and outer zones on the disk, and the amount of data and the transfer rate are uniform in the inner and the outer zones. Therefore, the performance becomes worse when data at a high transfer rate is collectively written to an inner zone. Therefore, data cannot be processed through a large number of channels in this method.

Recently, an ASMO (Advanced Storage Management Optical disc) has been studied as an optical disk mainly for storage of picture data. The ASMO is a magneto-optical disk in a magnetic field modulation system, and has the capacity of 6.1 GB at maximum per side of a 120-diameter disk.

FIG. 5 shows the configuration of the ASMO.

As shown in FIG. 5, the ASMO realizes a large capacity in a land-groove storage system for storing data with high density on both land 11 and groove 12. The pitch of the land 11 and the groove 12 is set to 0.6 micrometer. The thickness of a data recording area 13 of a disk is 0.6 mm. In this example, the data recording area 13 is divided into 22 physical zones. That is, one disk has 22 physical zones. One physical zone has several thousands of tracks. Tracks are spirally formed on a disk.

Furthermore, to have a system (chukking mechanism) of setting a disk on a drive device commonly used for a CD and a DVD, the thickness of a central portion (cramp portion) 18 on which no data is recorded on the disk is set to 1.2 mm.

In each physical zone, a predetermined number of tracks are radiantly provided. Each track is divided into one or more frames 14. The frame 14 is divided into a plurality of segments. Normally, the leading segment is an address segment (ADRS) 15, and other segments are referred to as data segments 16. Clock marks 17 indicated by Δ shown in FIG. 5 are assigned to the address segment 15 and the data segment 16.

For example, 2 KB of data and ECC (Error Correcting Code) are recorded on all data segments 16 of one frame 14. Furthermore, address information, a tilt pattern, a preamble, a reserve, etc. are recorded on the address segment 15. On the address segment 15, the information is recorded as wobble on one side only in two sides forming the groove 12, that is, in a single-side wobble method. A single sided wobbled address 19 is a single-side wobble address (two-side address can be realized) indicating the position of data. In the ASMO, the number of frames per disk turn is 16 through 73.

For the land 11 and the groove 12, the pit length is 0.235 micrometer.

As described above, the ASMO is physically divided into 22 zones, but these physical zones are divided into 714 logical zones (N through M+2) from the outermost zone to the innermost zone as shown in FIG. 6. In FIG. 6, the change in the amount of data in the buffer with the elapse of time is added to the right of each of the logical zones N through M+2. The example shown in FIG. 6 indicates the process of accessing the logical zones N through N+1 of the ASMO, reading the data from the logical zones N through N+1 to the buffer, and then reading the data from the innermost logical zone M+2 to the buffer. In this case, while the head are seeking through the outer logical zone N+1 through the inner logical zone M+2, the data stored in the buffer is transferred to an external device, and the amount of data in the buffer is gradually reduced.

The time taken for accessing the logical zone M+2 after accessing the logical zone N+1 has to be within 1 second. Within 1 second, data of 1 MB is transferred from the buffer to the external device.

FIG. 7 shows the data structure of the logical zones of the ASMO. As shown in FIG. 7, in the ASMO, a logic zone 20 has a storage capacity of 8 MB, and comprises 4 MB of land 11 and 4 MB of adjacent groove 12.

The logic zone 20 is divided into a user area (hatched portion) and a spare portion (black portion). Normally, data is sequentially recorded in order from the first piece of data in a sector unit. At this time, if there is no defective sector in the user area, the data is stored only in the user area. However, if there are defective sectors in the user area, then the data to be recorded in the defective sectors is recorded in the spare area. Thus, the spare area is used as a replacing spare sector when there is a defective sector in the user area. To compensate for the above mentioned defective sector, slipping replacement (SR) and linear replacement (LR) are used. The SR is a method of sequentially recording data in the subsequent sectors. In this case, the spare area stores data with the data to be stored in the number of defective sectors shifted backwards. On the other hand, the LR is a method of replacing the defective sectors with the spare area.

FIG. 7 shows the type of SR and LR methods.

(1) shows the SR method, and (2) through (4) show the LR method. There are three types of LR methods.
That is, (2) is a method of replacing a defective sector with a spare area in the same logical zone;

(3) is a method of replacing a defective sector with a spare area in the previous logical zone; and (4) is a method of replacing a defective sector with a spare area in the adjacent logical zone.

Thus, the ASMO is designed to shortening the access time by providing a replacing area (spare area) in the grooves and the lands of the logical zones although a data replacing process is required. Several MBs are used for physical zones and about 8 MB are used for logical zones. One physical zone contains 30 through 50 logical zones.

The range of the logical zones is designed based on the range (about 200 tracks) of beam jump only by the beam deflection scanning (optical seek) by the drive of an objective 30 without a seeking operation performed by moving the body of the head as shown in FIG. 8. FIG. 8 shows an accessible area (200 tracks for the maximum width from a defective block 31 to a spare block 32) by the objective 30. The speed of the optical seek by the objective 30 is approximately 5 ms at maximum. When 200 tracks are scanned in the seeking operation by moving the body of the head as in the above mentioned optical seeking operation, a double or higher speed is required.

In the ASMO, the logical zones are sequentially accessed in principle. Although the head moves by the maximum seek distance (from the innermost zone to the outermost zone) in the next step, seamlessly fetching and reading voice and picture data can be guaranteed. The access wait time taken by the movement for the above mentioned maximum seek distance is one second. Therefore, to fetch/read voice and picture data in real time in one second, there is an internal buffer for storing data of 1 MB.

FIGS. 9 and 10 show the concept of seamlessly fetching and reading voice and picture data in the ASMO. FIG. 9 shows the operation of writing buffered voice and picture data to the ASMO in the logical zones N through N+2. In addition, FIG. 10 shows the operation of reading voice and picture data from the logical zones N through N+2 of the ASMO to the buffer.

In the ASMO, recording and reading data through only one channel is considered, but simultaneous recording, simultaneous reading, and time-shift reading (reading while recording) are not taken into account.

The current 3.5 inch MO (Magneto-optical disk) is based on the SCAV (Zone Constant Angular Velocity) as a turn control system. Therefore, the seek time is shorter than in the ASMO. However, in the case of the 3.5 inch MO, the transfer speed is lower for inner zones than outer zones (the transfer speed for inner zones is about 60% of the transfer speed for outer zones). When the simultaneous recording and the simultaneous reading are performed on multi-channel picture data, higher performance is required, and the data cannot be correctly processed in the inner zones. The problem occurs in the HDD (Hard Disk Drive).

In the case of the ASMO, the ZCLV (Zone Constant Linear Velocity) is adopted for constant transfer speed in the entire process by changing the number of revolutions at the inner and outer zones as a turn control system. As a result, the problem with the 3.5 inch MO does not occur. However, when access is gained for plural zones, a control time to change the number of revolutions is required, which reduces the performance.

The first object of the present invention is to provide an access control apparatus and method for efficiently processing data through a larger number of channels when access to a storage medium can be performed in real time while data through a plurality of channels are being recorded and read. The second object of the present invention is to simultaneously record and read data using a storage medium storing on both land and groove.

SUMMARY OF THE INVENTION

According to the first principle of the present invention, the access control apparatus includes a scheduling unit and a control unit, and processes a plurality of access requests to a storage medium.

The scheduling unit determines the deadline of an accessing process depending on the change of the data transfer rate, and sets the execution schedule for a plurality of access requests in order from the process having the earliest deadline. The control unit controls the execution of access requests according to the execution schedule.

For example, when an isochronous transfer is performed, the data transfer rate changes with time depending of the ratio of inserted dummy packets. The scheduling unit dynamically determines the deadline of the write/read processes depending on the transfer rate at each time point, and sets the schedule of performing the write/read processes in order from the process having the earliest deadline. Then, the control unit controls the execution of the write/read processes according to the set schedule.

With the above mentioned access control apparatus, the deadline is determined based on the actual transfer rate, and flexible scheduling is performed based on the deadline. Therefore, the scheduling is performed based on the transfer rate of each channel even when statistically multiplexed picture data at a variable rate is recorded/read in real time, thereby recording/reading data through a larger number of channels.

According to the second principle of the present invention, the access control apparatus includes the control unit and a determination unit, and processes a plurality of access requests to a disk type storage medium.

The determination unit determines a write area such that a plurality of write positions can be close to each other in response to a plurality of write requests to write data to a storage medium. The control unit controls the process of sequentially writing write data to the above mentioned write area in response to each write request.

The determination unit determines a write area containing a plurality of write positions close to each other, and the control unit controls the process of sequentially writing write data at each write request to the plurality of write positions in the write area. The write positions correspond to, for example, a series of addresses in the zone provided on a disk type storage medium.

With the above mentioned access control apparatus, even when a simultaneous write request for picture data through a plurality of channels is issued, the data of the channels is sequentially and collectively written, thereby considerably reducing the wait for seek or turn when data is to be written. Therefore, the processes can be efficiently performed, and data can be recorded/read through a larger number of channels.

According to the third principle of the present invention, the access control apparatus is based on the access control apparatus for controlling the process of simultaneously recording data through a plurality of channels in a storage medium whose revolution is controlled based on the ZCAV. Then, it includes a selection unit for selecting a plurality of zones from the storage medium such that the transfer speeds of the zones on the storage medium can be leveled; and a control unit for controlling the data through the plurality of channels such that the data can be distributed and recorded in the plural selected zones. The selection unit selects the plurality of zones with, for example, outer zones associated with inner zones.

With the above mentioned access control apparatus, the data through each channel can be correctly recorded on the storage medium corresponding to the simultaneous record request function (general request performance) for the data through a plurality of channels by alternately accessing a plurality of zones such that the transfer speed (transfer rate) throughout the storage medium can be constant.

According to the fourth principle of the present invention, the access control apparatus is based on the access control apparatus for controlling the process of simultaneously recording data through a plurality of channels in a storage medium whose revolution is controlled based on the ZCAV. The apparatus includes a selection unit for selecting a plurality of zones having a transfer speed average higher than the general request performance as a sum of the data storage request performance of data of each channel from the storage medium; and a control unit for controlling data to be distributed and recorded through the plurality of channels to the selected plural zones.

With the access control apparatus, a plurality of zones are selected such that they can have the performance higher than a sum of request performance (general request performance) of the data of each channel, and the data of each channel is distributed and recorded in the plurality of zones. As a result, the data of a plurality of channels can be correctly recorded on a storage medium.

With the above mentioned access control apparatuses according to the third and fourth principles of the present invention, for example, the selection unit selects the plurality of zones with the transfer time of the head between the zones taken into account. In addition, for example, the selection unit selects the plurality of zones with the number of the plurality of channels taken into account in addition to the transfer time of the head between zones. In the above mentioned zone selection, zones can be selected with higher precision.

Furthermore, the control unit controls the data of each channel and the recording zone such that they correspond one-to-one to each other. Thus, the data of each channel can be more quickly read, and, after deleting data, the area can be efficiently utilized.

The control unit controls the data such that the data of each channel can be alternately recorded on each zone in a block unit. Furthermore, the control unit controls data such that the data of each channel can be alternately recorded in the same zone.

With the access control apparatus according to the fifth principle of the present invention based on the access control apparatus according to the third and fourth principles of the present invention, the apparatus further includes a deletion unit for deleting data of a specified channel recorded in the zone from a specified zone; and a garbage collection unit for moving data of another channel recorded in the outermost zone.

With the above mentioned access control apparatus, an outer zone processed at a higher transfer speed can be efficiently utilized, and data can be always recorded at a high speed.

Furthermore, with the access control apparatus according to the sixth principle of the present invention based on the access control apparatus according to the above mentioned third and fourth principle of the present invention, the apparatus further includes a read unit for continuously reading read data from the zone in which the data of the channel is recorded when a read request for the data of a specified channel is accepted.

With the above mentioned access control apparatus, channel data can be quickly read.

According to the seventh principle of the present invention, the access control apparatus is based on the access control apparatus for controlling the process of simultaneously recording data through a plurality of channels in a storage medium whose revolution is controlled based on the ZCLV. The apparatus includes a selection unit for selecting an outer zone having a larger storage capacity by priority when simultaneous storage requests are received through a plurality of channels; and a control unit for controlling the data through the plurality of channels to be collectively recorded in the selected zone.

With the above mentioned access control apparatus, channel data can be more quickly recorded.

According to the eighth principle of the present invention, the access control apparatus is based on the access control apparatus which controls the process of simultaneously recording data through a plurality of channels in a storage medium in the land/groove system. The apparatus includes a determination unit for determining land or groove on which the data of each channel is recorded one to one when simultaneous storage requests are received through a plurality of channels; and a control unit for controlling the data of each channel to be distributed and recorded through the corresponding determined land or groove.

When the storage medium has divided logical zones having a predetermined number of sectors having land and groove, the control unit controls, for example, such that the data of each channel can be alternately distributed and recorded on land and groove in a logical zone unit.

With the above mentioned access control apparatus, the access efficiency to data of each channel can be improved. Furthermore, the data simultaneously recorded through one channel can be deleted without affecting the data simultaneously recorded through another channel. In addition, the number of times of the garbage collecting process can be reduced.

According to the ninth principle of the present invention, the access control apparatus is based on the eighth principle of the present invention, and further includes a deletion unit for deleting data of a channel from the land or the groove on which the data is recorded when a request to delete the data of the channel is accepted; and a garbage collection unit for moving data of another channel recorded on another land or groove associated with the above mentioned land or the groove to a logical zone having an empty area for a rewrite operation.

With the above mentioned access control apparatus, channel data can be easily and quickly deleted, and discontinuous empty areas can be reduced.

According to the tenth principle of the present invention, the access control apparatus is based on the apparatus according to the eighth and ninth principles of the present invention, and further includes a read unit for reading data from the land or groove on which data of a channel is recorded when a request to read the data of the channel is accepted.

With the above mentioned access control apparatus, data of a specified channel can be quickly read through a channel.

BRIEF DESCRIPTION OF DRAWINGS

FIG. 15 shows the format of the data to be recorded on a disk;

FIG. 16 shows the second disk scheduling;

FIG. 17 shows the schedule table;

FIG. 21 shows the first re-arranging algorithm;

FIG. 22 shows the second re-arranging algorithm;

FIG. 30 shows the storage position of a control program;

FIG. 34 shows the method of reading, deleting, garbage-collecting, and simultaneously recording data through two new channels after the garbage-collecting process when data of two channels are simultaneously recorded on the ASMO shown in FIG. 31 in which (a) shows the method of simultaneously recording data through first two channels, (b) show the method of deleting the data of Ch2, (c) shows the method of garbage collection of Ch1, and (d) shows the method of simultaneously recording data through the two channels Ch3 and Ch4 after the garbage collecting process;

FIG. 35 is a flowchart showing the principle of the method of recording, reading, and deleting data using a storage medium in the land/groove system according to the present invention;

FIGS. 37(*a*), 37(*b*) and 37(*c*) show the method of the process of simultaneously recording data through two channels on the disk shown in FIG. 36 in which FIG. 37(a) shows the process of simultaneously recording data through Ch1 and Ch2, and the process of deleting data through Ch2, FIG. 37(b) shows the garbage collection through Ch1, and FIG. 37(c) shows the process of simultaneously recording data through Ch3 and Ch4 after the garbage collecting process;

FIG. 40 is a flowchart (2) showing the algorithm of selecting an empty zone on a disk;

FIG. 41 shows an example of the configuration of the table for management of a stream;

FIG. 42 shows an example of the configuration of the table for management of an empty zone on a disk;

FIG. 43 shows the configuration of each zone of the disk shown in FIG. 36;

FIG. 44 shows the state transition of the list storing the stream management table and the empty zone management table in the processes of the flowcharts shown in FIGS. 39 and 40;

FIG. 53 shows the method of simultaneously recording data for two channels without considering the access time or the number of channels on the disk having the zone configuration shown in FIG. 52 in which (a) shows an example of distributing and recording data in zones 1 and 2, (b) shows an example of distributing and recording data only in zone 1, and (c) shows an example of distributing and recording data in zones 2 and 6;

FIG. 54 shows the method of simultaneously recording data through two channels without considering the access time on the disk having the zone configuration shown in FIG. 52 in which (a) shows an example of distributing and recording data in zones 2 and 3, (b) shows an example of distributing and recording data only in zone 1, and (c) shows an example of distributing and recording data in zones 5 and 6;

FIG. 55 shows the method of simultaneously recording data for two channels considering the access time and the number of channels on the disk having the zone configuration shown in FIG. 52 in which (a) shows an example of distributing and recording data in zones 2 and 3, (b) shows an example of distributing and recording data in zones 1 and 2, and (c) shows an example of distributing and recording data in zones 5 and 6;

DESCRIPTION OF THE PREFERRED EMBODIMENTS

Figure 11:
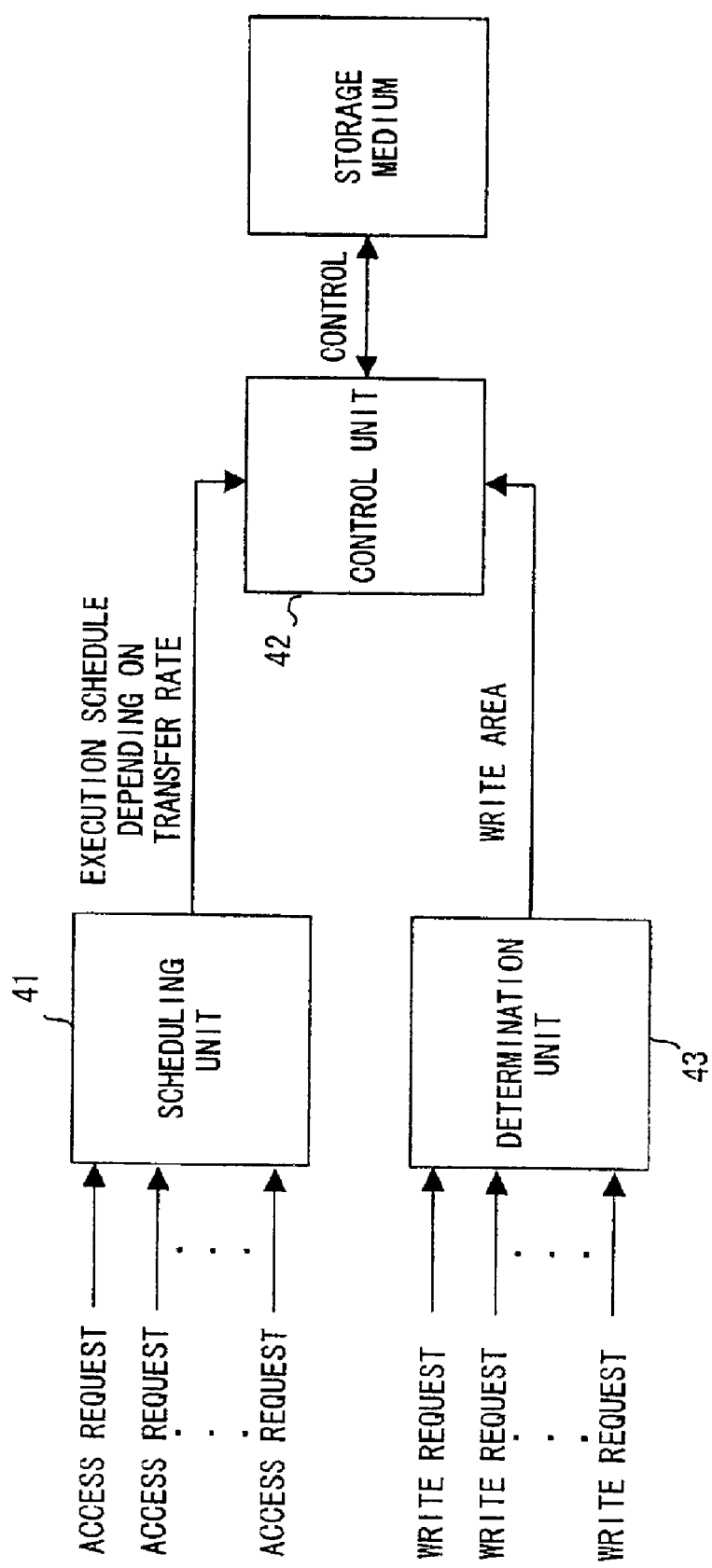
FIG. 11 shows the principle of the access control apparatus according to the present invention.

FIG. 11 shows the principle of the access control apparatus according to the present invention.

According to the first principle of the present invention, the access control apparatus includes a scheduling unit 41 and a control unit 42, and processes a plurality of access requests to a storage medium.

The scheduling unit 41 determines the deadline of an accessing process depending on the change of the data transfer rate, and sets the execution schedule for a plurality of access requests in order from the process having the earliest deadline. The control unit 42 controls the execution of access requests according to the execution schedule.

For example, when an isochronous transfer is performed, the data transfer rate changes with time depending of the ratio of inserted dummy packets. The scheduling unit 41 dynamically determines the deadline of the write/read processes depending on the transfer rate at each time point, and sets the schedule of performing the write/read processes in order from the process having the earliest deadline. Then, the control unit 42 controls the execution of the write/read processes according to the set schedule.

With the above mentioned access control apparatus, the deadline is determined based on the actual transfer rate, and flexible scheduling is performed based on the deadline. Therefore, the scheduling is performed based on the transfer rate of each channel even when statistically multiplexed picture data at a variable rate is recorded/read in real time, thereby recording/reading data through a larger number of channels.

According to the second principle of the present invention, the access control apparatus includes the control unit 42 and a determination unit 43, and processes a plurality of access requests to a disk type storage medium.

The determination unit 43 determines a write area such that a plurality of write positions can be close to each other in response to a plurality of write requests to write data to a storage medium. The control unit 42 controls the process of sequentially writing write data to the above mentioned write area in response to each write request.

The determination unit 43 determines a write area containing a plurality of write positions close to each other, and the control unit 42 controls the process of sequentially writing write data at each write request to the plurality of write positions in the write area. The write positions correspond to, for example, a series of addresses in the zone provided on a disk type storage medium.

With the above mentioned access control apparatus, even when a simultaneous write request for picture data through a plurality of channels is issued, the data of the channels is sequentially and collectively written, thereby considerably reducing the wait for seek or turn when data is to be written. Therefore, the processes can be efficiently performed, and data can be recorded/read through a larger number of channels. For example, the scheduling unit 41 and the determination unit 43 shown in FIG. 11 correspond to an MPU (microprocessor unit) 61 shown in FIG. 12 and described later, and the control unit 42 corresponds to the MPU 61, an LSI 62, a driver circuit 63, and buffer memory 64.

Embodiments of the present invention are described below in detail by referring to the attached drawings.

According to the present invention, a dummy packet is removed from a received transfer packet, and valid data is temporarily stored in the buffer memory in a predetermined block unit. At this time, the more the dummy packets, the longer time required to accumulate valid data. Then, the deadline is optionally set corresponding to the accumulation time for each channel, and the scheduling process is performed based on the deadline.

Thus, by flexibly setting the deadline based on the accumulation time depending on the actual transfer rate, the restrictions on the time for the scheduling can be reduced, and a larger number of channels or a higher rate channels can be processed.

Furthermore, when plural pieces of data are simultaneously written on severer conditions (especially through a larger number of channels or higher rate channels), the scheduling process is performed such that data can be collectively (continuously in time series) written with an outer zone of a disk having higher transfer performance defined as an access point. Thus, the restrictions of time on both transfer rate and seek wait can be reduced, thereby processing a larger number of channels, and processing higher rate channels.

Figure 12:
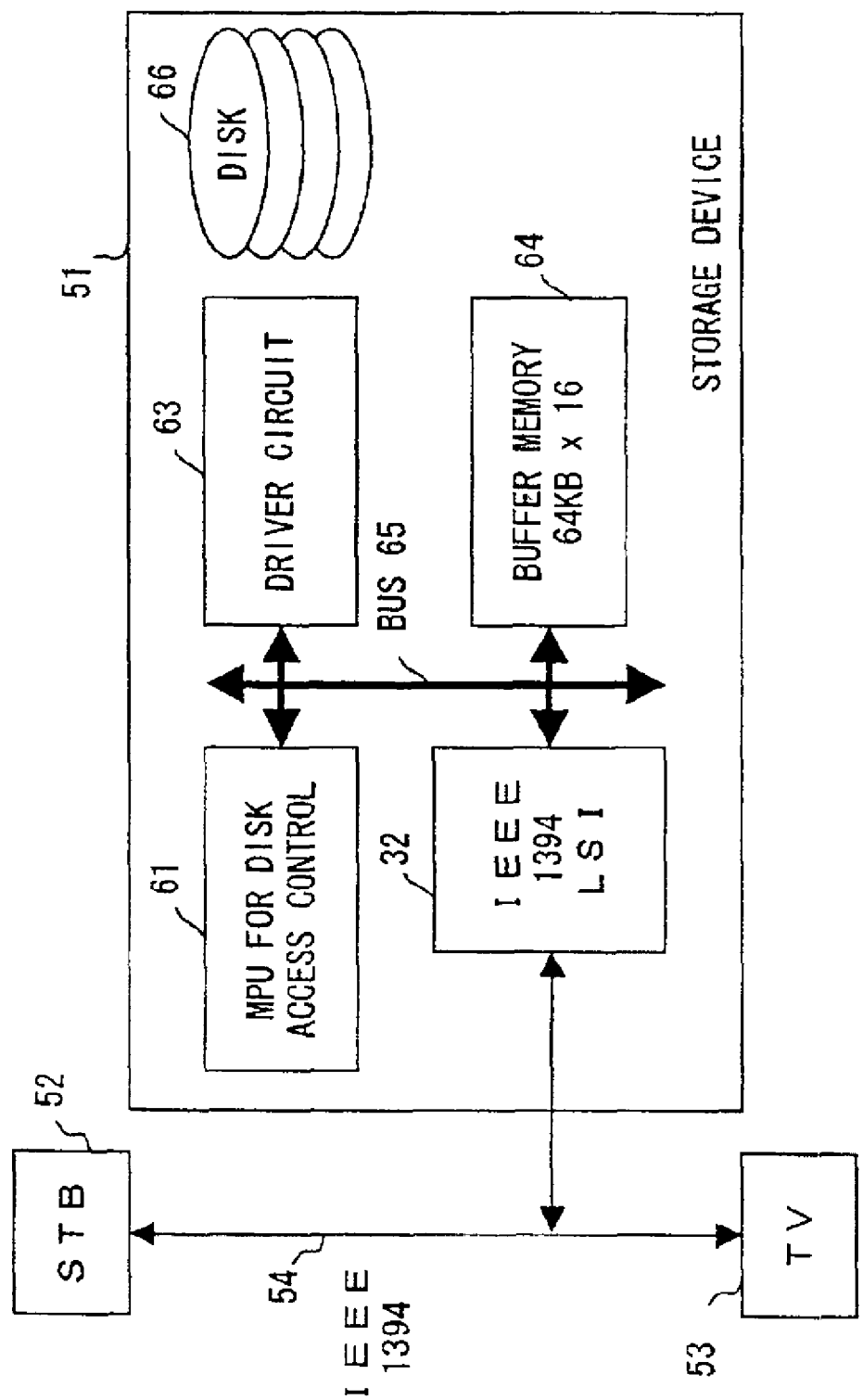
FIG. 12 shows the configuration of the storage system.

FIG. 12 shows the configuration of the storage system containing the access control apparatus according to an embodiment of the present invention. The storage system shown in FIG. 12 comprises a storage device 51, an STB 52, and a digital TV 53. Each of these devices is interconnected through an IEEE 1394 line 54. The STB 52 receives, for example, an MPEG picture data from an external network, and transfers the data to the storage device 51 by an isochronous transfer. Then, the digital TV 53 reads the picture data stored in a storage device 51, and displays it on the screen.

In the storage device 51, the circuit for controlling access to a disk comprises the MPU 61 (microprocessor unit) for controlling access to a disk, the IEEE 1394 LSI 62, the disk driver 63, and the buffer memory 64. These devices are interconnected through a bus 65.

The LSI 62 functions as a communications interface between the buffer memory 64 and the storage device 51. The buffer memory 64 comprises, for example, 16 unit blocks having the capacity of 64 KB, and temporarily stores picture data transmitted through the buffer memory 64 or the picture data to be transmitted to the line 54.

The MPU 61 receives a read/write instruction input through the line 54, and determines the access execution order and the read/write position of the disk 66 based on the disk scheduling algorithm. In the order, the disk drive (not shown in the attached drawings) provided with the disk 66 is accessed through the driver circuit 63.

Figure 13:
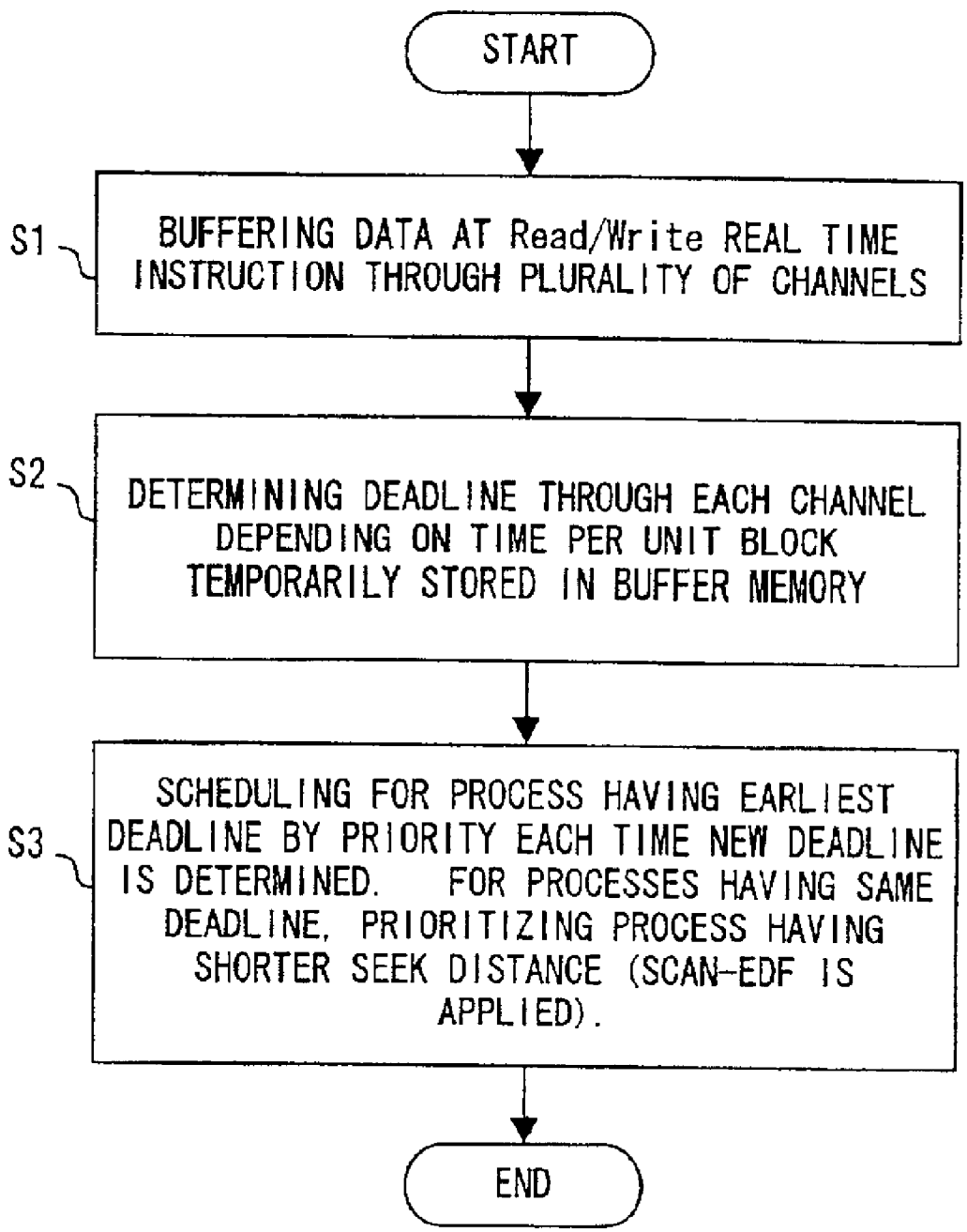
FIG. 13 is a flowchart showing the principle of the disk scheduling.

FIG. 13 is a flowchart showing the principle of the disk scheduling performed by the MPU 61. The MPU 61 temporarily stores data in a unit block of a predetermined capacity in the buffer memory 64 at a real time instruction to read/write data through a plurality of channels (step S1). The size of the unit block normally depends on the track size of the disk, and is set approximately to 64 KB.

Then, corresponding to the time required to temporarily store the data in the unit block of the buffer memory 64, the deadline of each channel is determined (step S2). When write data is temporarily stored, only the data in the data block packet in the received transfer packets is stored, and dummy packets are discarded. Therefore, the processing time depends on the number of occurrences of dummy packets, and the transfer rate is variable. Then, for each round corresponding to the maximum transfer rate, the scheduling process is performed based on the SCAN-EDF (step S3).

The maximum rate corresponds to the rate at which the data block packets are continuously transferred without dummy packets. At this time, the data transfer time per unit block is the shortest. Assuming that data is transferred at the maximum transfer rate through all channels, a new deadline is determined for each shortest data transfer time. Thus, to prevent mis-scheduling in this case, the scheduling process is periodically performed by setting the shortest data transfer time per unit block as one round.

In this example, the process having the earliest deadline is scheduled by priority based on the algorithm of the SCAN-EDF. When there are a plurality of processes having the same deadline, the channel having a shorter seek distance is prioritized. Thus, by applying the deadline determined in step S2 to the SCAN-EDF, the restrictions on time can be reduced corresponding to the situation of an actual process.

Figure 14:
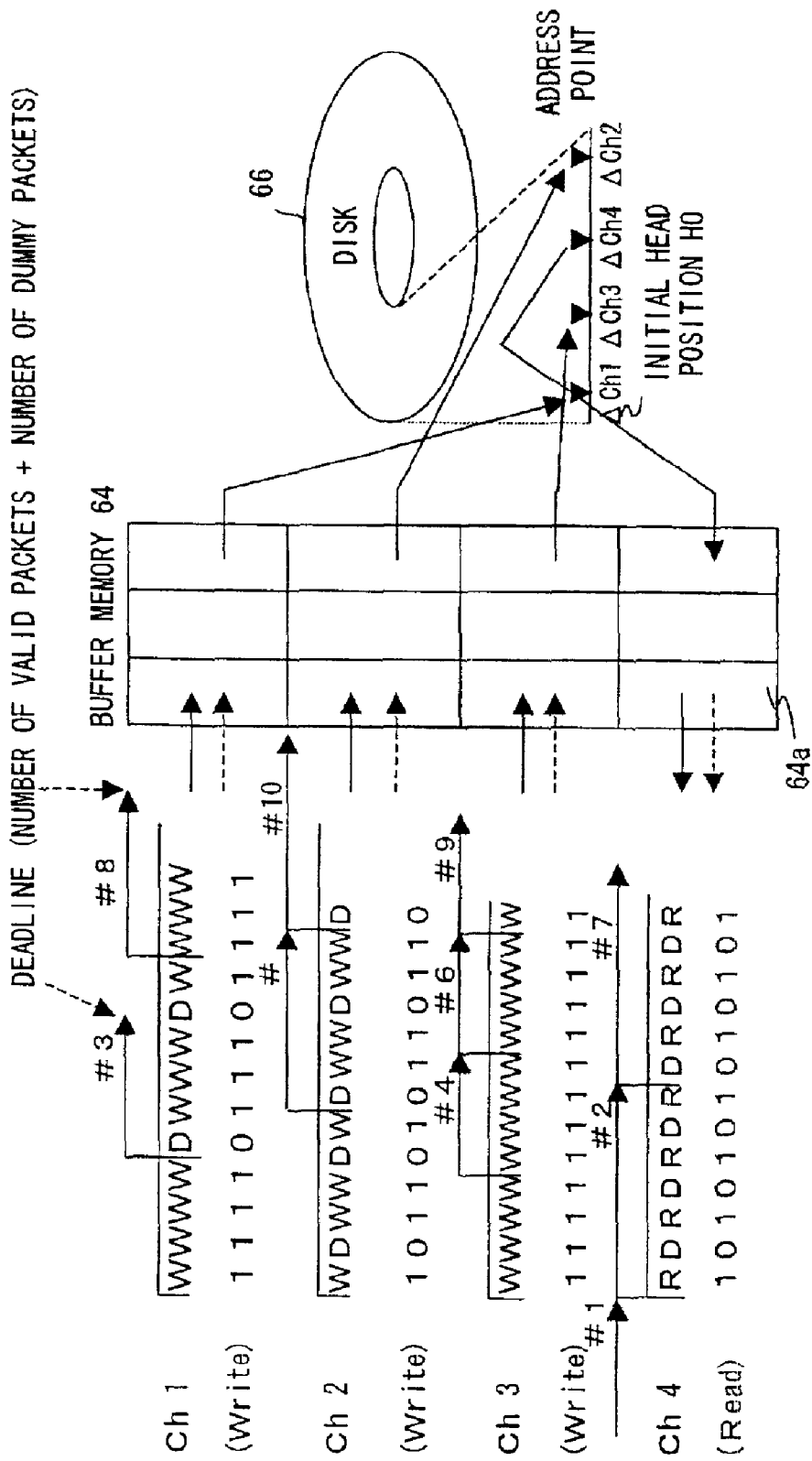
FIG. 14 shows the first disk scheduling.

FIG. 14 shows an example of the above mentioned scheduling process. In this example, in the four channels Ch1, Ch2, Ch3, and Ch4, the three channels Ch1, Ch2, and Ch3 are used in the write process while the channel Ch4 is used in the read process.

A packet W indicates a data block packet containing write data, a packet R indicates a data block packet containing read data, and a packet D indicates a dummy packet. In the buffer memory 64, each channel is assigned three unit blocks 64a.

In the write process, the data in the valid packet W excluding the dummy packet D is temporarily stored in one unit block 64a of the buffer memory 64. At this time, depending on the time required to write the data in the unit block in the buffer memory 64, the deadline of each channel is set.

Then, the 'maximum transfer rate', 'deadline information', and 'binary data indicating the types of valid packets and dummy packets in time series' are stored in a disk 66. These pieces of data are stored in the disk 66 in the format shown in FIG. 15 through the buffer memory 64. The maximum transfer rate is represented by, for example, the number of bytes of valid data per packet.

As the deadline information, for example, the time required to temporarily store the data in the unit block can be recorded, or a sum of the number of received valid packets and dummy packets can be recorded. In FIG. 15, the deadline information about the latter is used. As the binary data shown in FIG. 15, a binary sequence is used. That is, valid packets are indicated by the logic 1, and dummy packets are indicated by the logic 0.

The deadline information and the binary data are used in the read process for valid data. In this process, the deadline of the read process is determined according to the recorded deadline information, and a dummy packet is inserted according to the binary data.

Thus, on the reception side such as the digital TV 53 which has requested the process of reading data from the disk 66, the isochronous transfer packet can be received through the LSI 62 in the same sequence as the case in which picture data is directly received from the STB 52. Therefore, an isochronous transfer can be realized in real time without unnecessarily increasing the capacity of the buffer memory on the reception side.

Otherwise, if an asynchronous transfer can be realized on the reception side, only a valid packet can be transmitted without inserting a dummy packet. In this case, since the transfer data has already been stored on the disk 66, the read process can be performed in the asynchronous transfer mode, which is another transfer mode of the IEEE 1394, while guaranteeing the transfer at a pace of the reception side.

Figure 1:
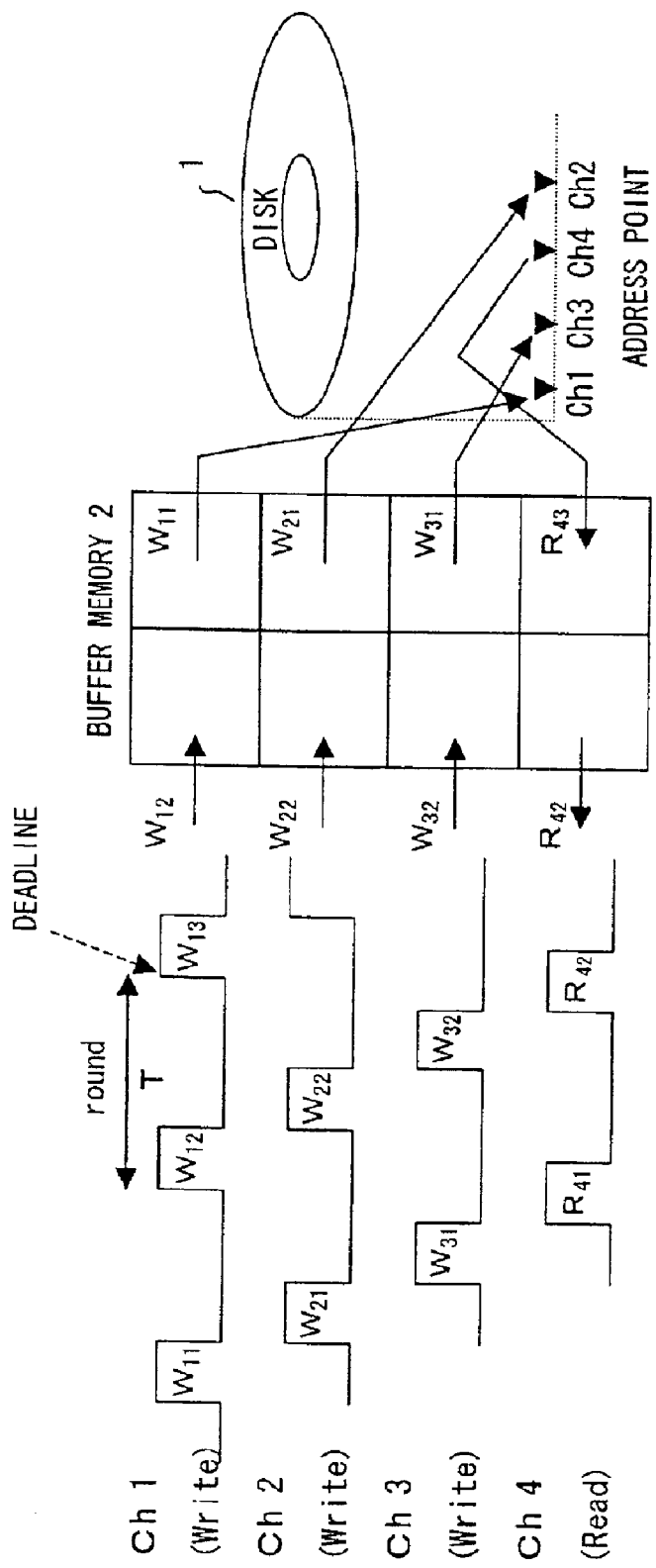
FIG. 1 shows the conventional disk scheduling.
Figure 2:
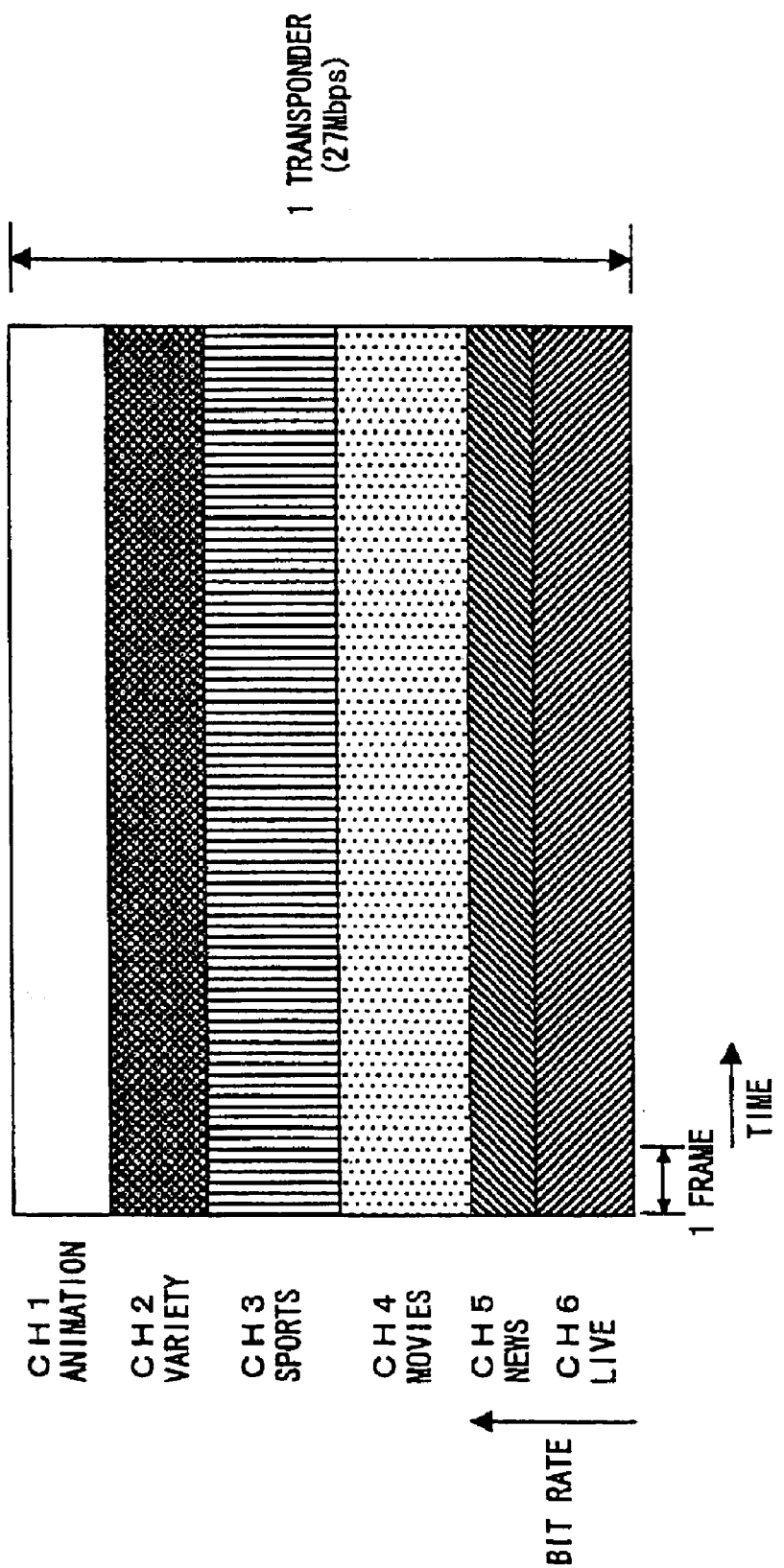
FIG. 2 shows the data at a fixed rate.
Figure 3:
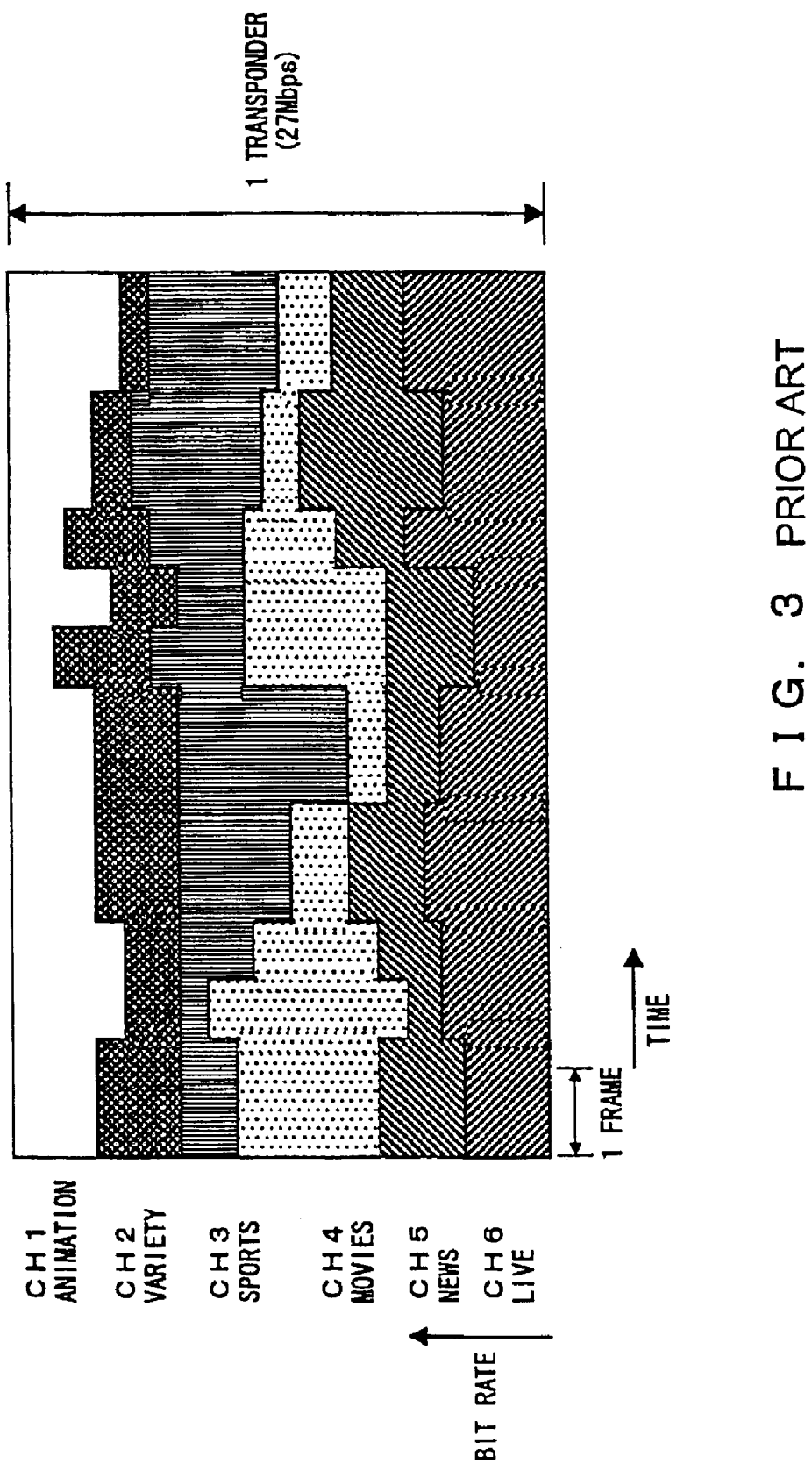
FIG. 3 shows the data at a variable rate.
Figure 4:
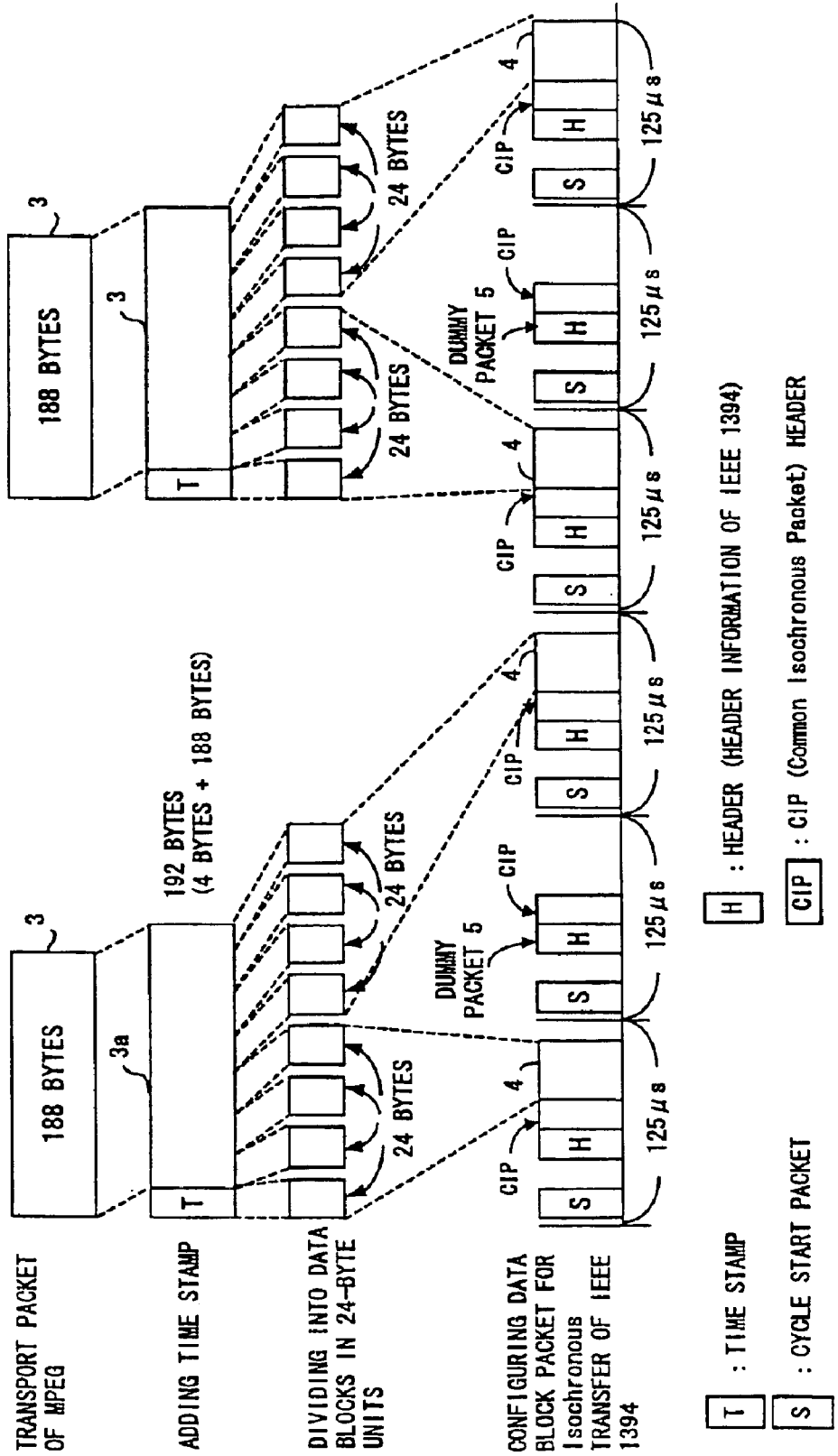
FIG. 4 shows an isochronous transfer.
Figure 5:
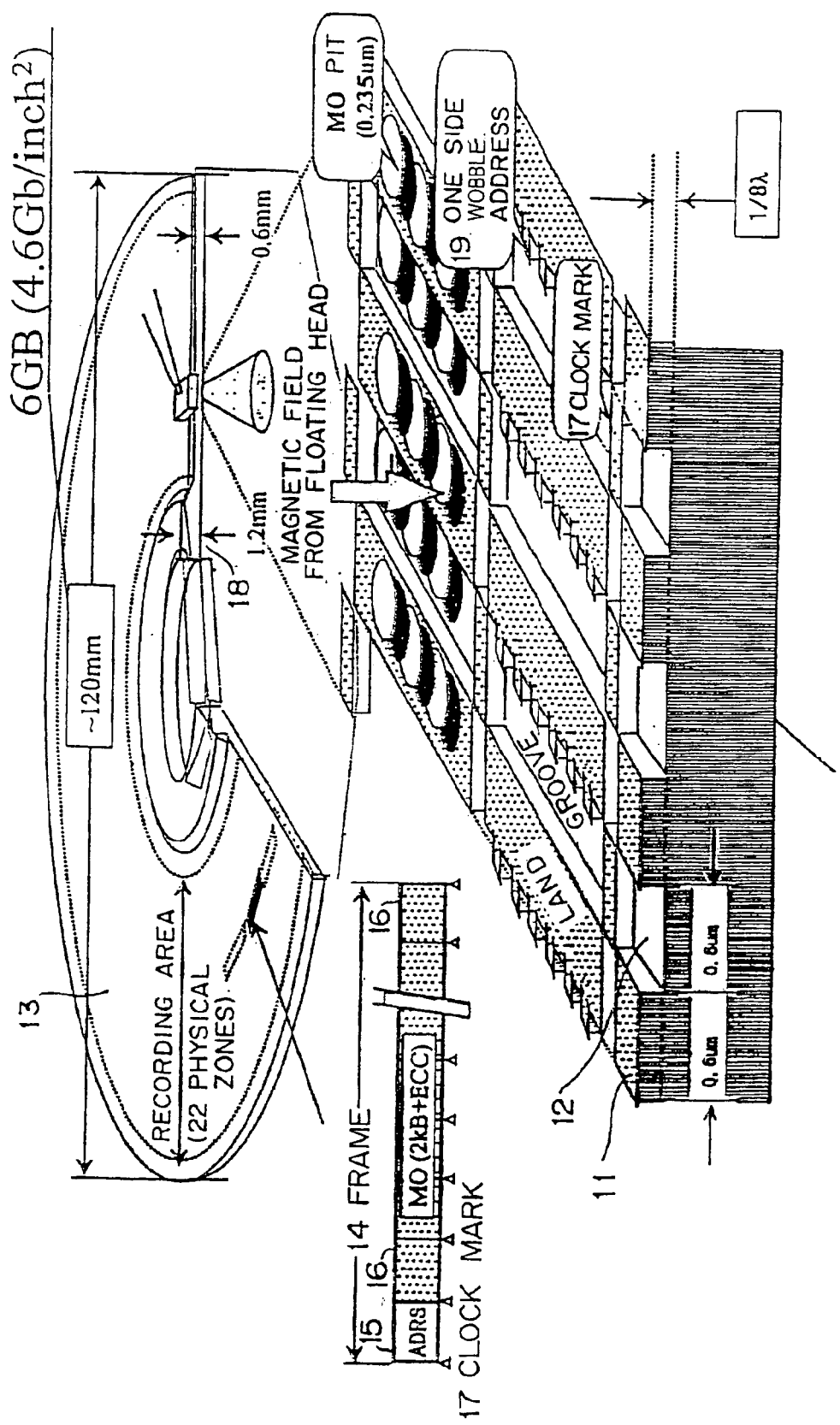
FIG. 5 shows the configuration of the ASMO.
Figure 6:
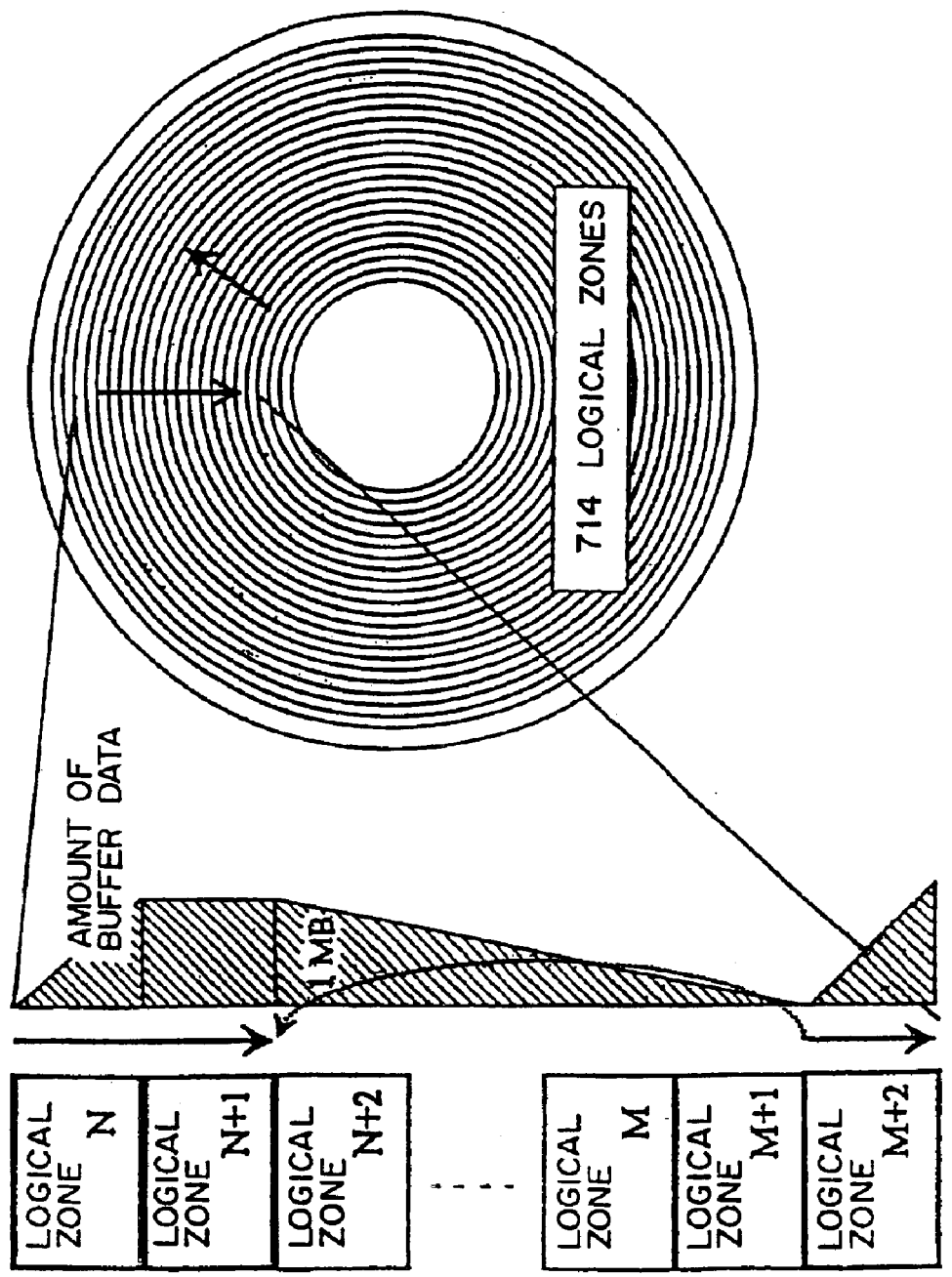
FIG. 6 shows the configuration of the logical zone in the ASMO.
Figure 7:
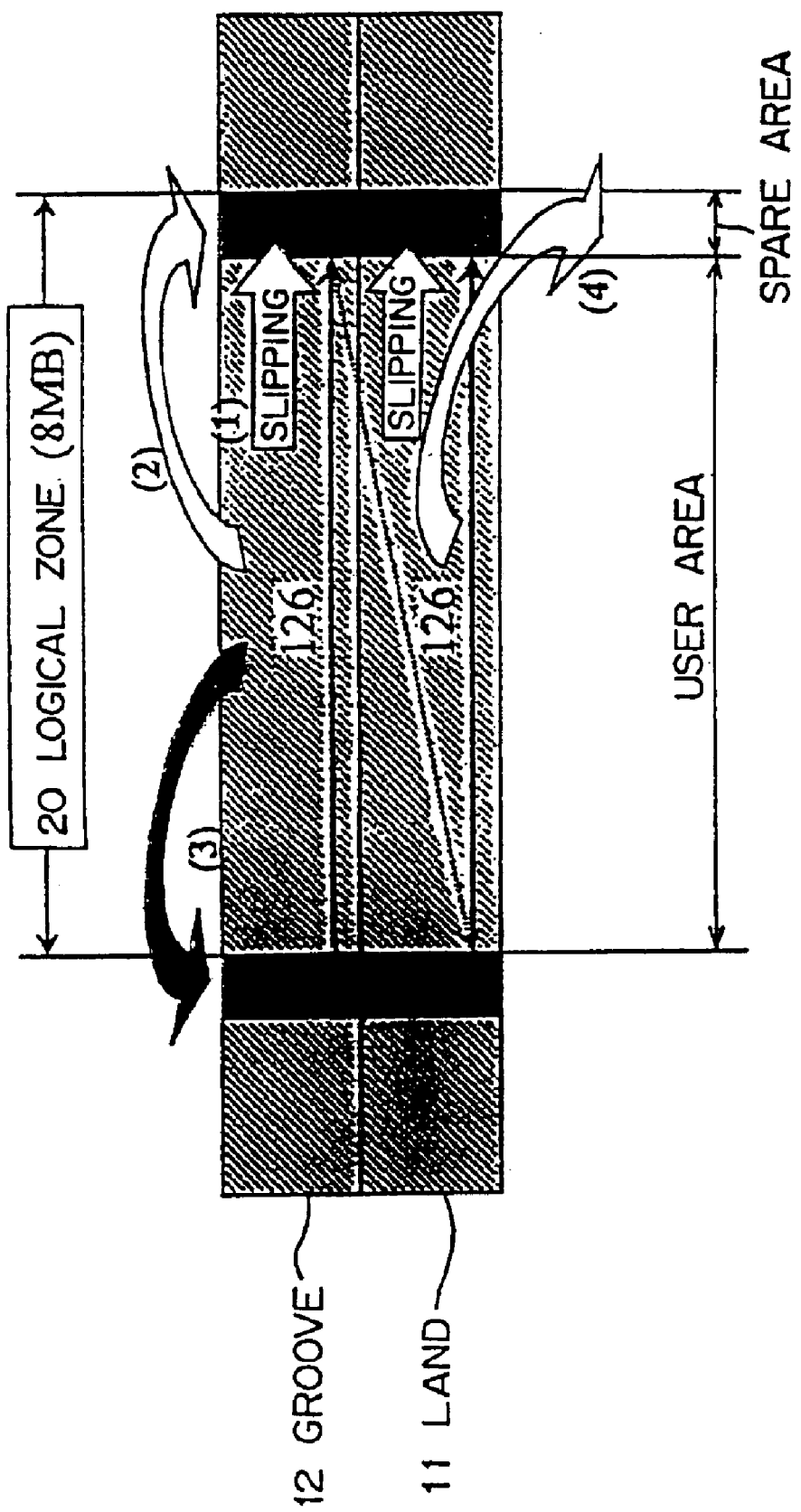
FIG. 7 shows the defect controlling method with the ASMO.
Figure 8:
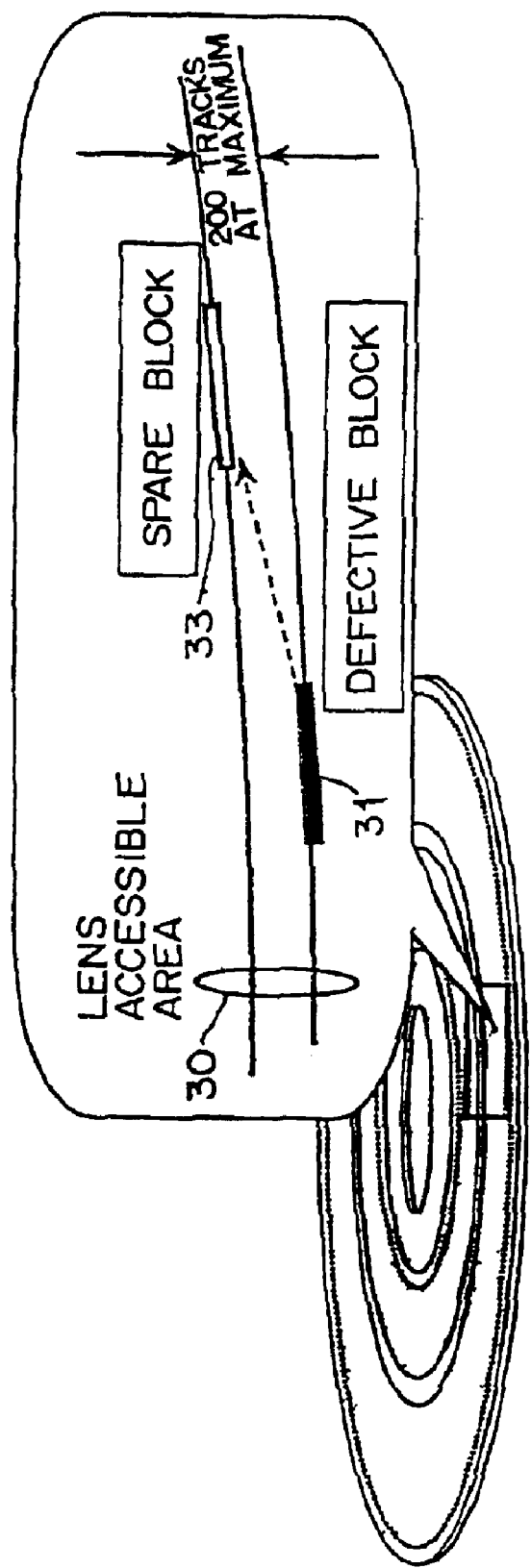
FIG. 8 shows the accessible area only by operating a lens with the ASMO.
Figure 9:
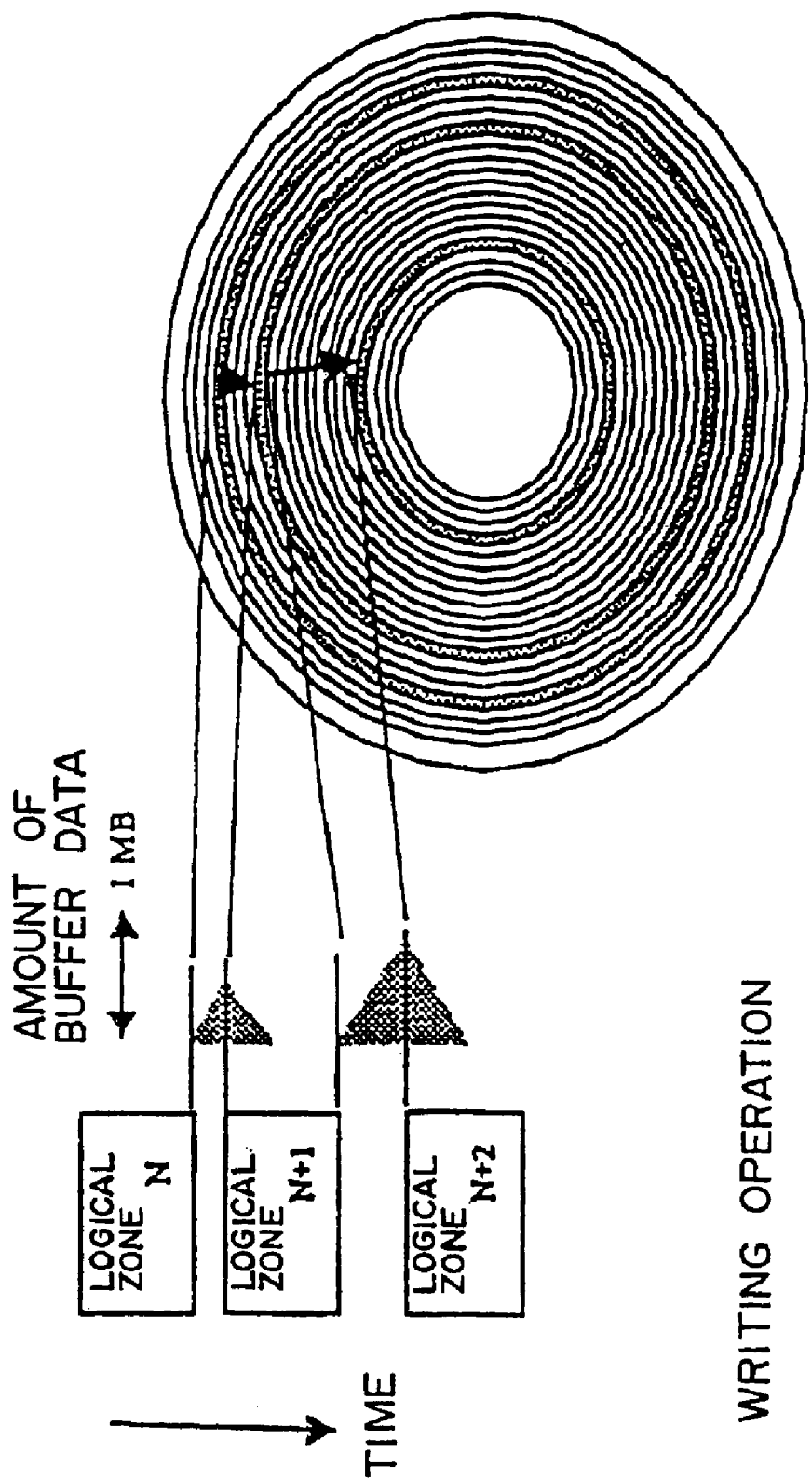
FIG. 9 shows the write operation to the ASMO.
Figure 10:
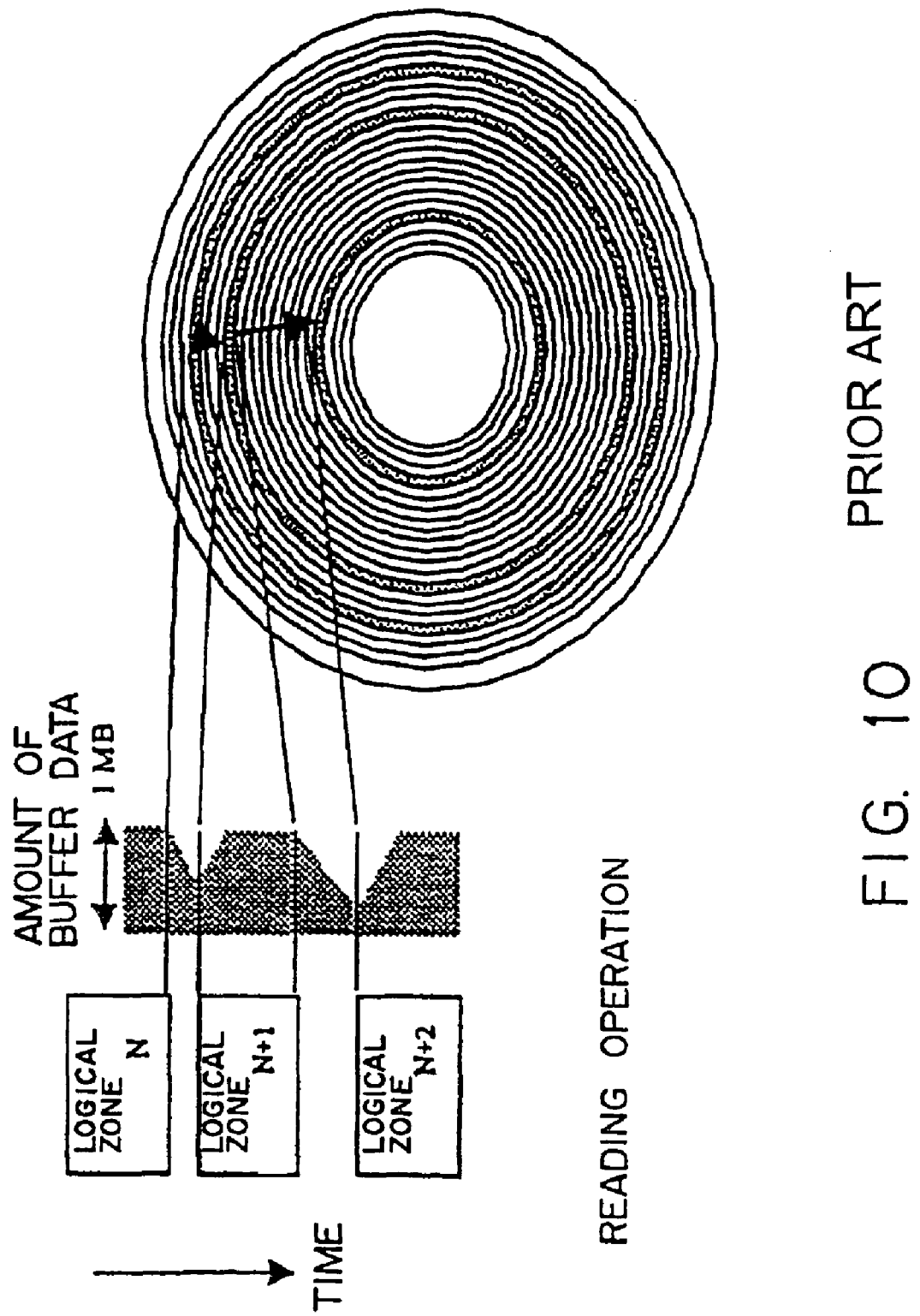
FIG. 10 shows the read operation to the ASMO.

The transport packet 3 shown in FIG. 4 contains 188 byte valid data, and the data corresponding to 340 packets 3a can be stored in the unit blocks of the buffer memory 64 when the disk track level of about 64 KB is adopted as the unit block size of the buffer memory 64. Therefore, when two data block packets 4 are generated from the packet 3a, the deadline is determined from the time required to temporarily store about 680 data block packets 4.

In the example of scheduling shown in FIG. 14, for simple explanation, it is assumed that the capacity of the unit block 64a of the buffer memory 64 equals the capacity of four valid packets, and the deadline can be determined from the time required to store four valid packets. Each of the arrows #1 through #10 indicates the read/write processes on the four valid packets, and the number of each arrow indicates the execution order of the scheduled process. The source of an arrow indicates the deadline determination timing, and the destination of an arrow indicates the determined deadline. The outline of the scheduling process is described as follows.

1: Four packet valid data is read from the disk 66 through the Ch 4, and temporarily stored in the buffer memory 64. At this time, other information shown in FIG. 15 is also stored with the valid data.

2: According to the read deadline information, the deadline of the read process is determined. The stored valid data is transmitted in the isochronous transfer mode from the buffer memory 64 based on the read binary data 1010101. At this time, a valid packet R is transmitted corresponding to the logic 1 of the binary data, and a dummy packet D is transmitted corresponding to the logic 0. Simultaneously, the subsequent four packet valid data is read from the disk 66, and is temporarily stored in the buffer memory 64.

3: In the process of #2, the data of four valid packets W is temporarily stored in the buffer memory 64 through the Ch 1 and CH 3, and the deadline is determined from the temporary storage time. At this time, other information shown in FIG. 15 is also stored with the valid data.

In this example, since four valid packets W are continuously transmitted through the Ch 1 and Ch 3, the binary data is 1111. In addition, since the deadline is determined based on the time required to transfer the four valid packets, the same deadline is determined for the Ch 1 and Ch 3. Therefore, the current position H0 of the disk head is referenced, and the write process performed on the Ch1 having an address point closer to the position (having a shorter seek distance) is scheduled by priority.

4: Then, the write process performed on the Ch 3 having the same deadline as the Ch 1 is scheduled.

5: The data in the four valid packets W through the Ch 2 is temporarily stored, and the deadline is determined. Since two dummy packets D are transmitted among the four valid packets W, the binary data indicates 101101, and the deadline is determined based on the time required to transfer six packets.

Similarly, the read/write process performed on each channel is scheduled in order from the earliest deadline. As a result, #6 refers to the Ch 3, #7 refers to the Ch 4, #8 refers to the Ch 1, #9 refer to the Ch 3, and #10 refers to the Ch 2.

Thus, the execution order of the processes is set not in order of temporary storage in the buffer memory 64, but in order from the earliest deadline determined from the time required to temporarily store data. Therefore, when a plurality of write processes are scheduled, the disk 66 is not always accessed in order of temporary storage of data.

In the example shown in FIG. 14, each channel has the buffer area 64a having three unit blocks, two blocks are used in transferring data to and from the disk 66 depending on the change of the deadline, and one block is used in transferring to and from the LSI 62. Thus, since the capacity of the buffer memory 64 is limited, it is necessary to set the higher limit for the deadline.

In this example, the time required to temporarily store data is within the time taken to transfer 4 through 8 packets. Then, assume that data is input to the buffer memory 64 at the maximum transfer rate immediately after the deadline is set based on the longest transfer time for 8 packets. In this case, two blocks of data are stored in the buffer memory 64 while one block of already stored data is written to the disk 36. Therefore, at least three blocks of buffer areas are required for each channel, and it is necessary to set the deadline within the transfer time for eight packets.

That is, the upper limit of the deadline is determined by the storage time required to store valid data at the maximum transfer rate in an available area of the buffer memory 64. In this example, the storage time equals the temporary storage time per unit block when the transfer rate is ½ of the maximum rate (time required to transfer eight packets), and it is assumed that the transfer rate is lower.

When the sum of valid packets and dummy packets is used as deadline information, it is easy to convert it into a time period or a time stamp. In this example, the range of the deadline information is 4 through 8 packets, the transfer time of one packet in the IEEE 1394 is 125 $\mu s$. Therefore, 4 through 8 packets converted into the transfer time equal 500 µs through 1 ms, and the deadline is the time after the lapse of 500 µs through 1 ms from the starting time. The starting time is the time at which a temporarily storing process in the buffer memory 64 is completed.

Then, FIG. 16 shows an example of disk scheduling in which isochronous transfer packets do not contain a dummy packet. Since a dummy packet is not contained, the process of each channel has the same deadline if the same starting time and transfer rate are assigned to each channel. Then, based on the algorithm of the SCAN-EDF, the execution order is set in order from the shortest seek distance in the same seek direction for two or more processes having the same deadline.

In the example shown in FIG. 16, a schedule is set to start with two read processes (#1 and #2) through the Ch4, then control is passed to the write process (#3) through the Ch2, and the seek direction is changed to process Ch4 (#4), Ch3 (#5), Ch1 (#6) in this order. Then, #7 corresponds to Ch1, #8 corresponds to Ch3, #9 corresponds to Ch4, #10 and #11 correspond to Ch2, #12 corresponds to Ch4, #13 corresponds to Ch3, and #14 corresponds to Ch1.

Then, by referring to FIGS. 17 through 22, the scheduling process performed by the MPU 61 is described in detail. The MPU 61 holds a schedule table (not shown in the attached drawings) in which the process of each channel to be performed is registered, and the scheduling process is performed on disk access using the table.

FIG. 17 shows a schedule table when 2N (2 per channel) process instructions are accepted through N channels. Each element Order (I) (I=1, 2, . . . , 2N) of a schedule table 70 contains the deadline T, the identification information R/W of the read/write process, the channel number C, and the block address A of the disk 66, and indicates one read/write process to be performed. FIG. 17 shows the status of m elements registered in the schedule table 70, and the m elements are arranged in order from the earliest deadline T.

The subscript i of each data contained in Order (1) indicates the number of a channel through which a corresponding process is performed, and Ci=i. It holds true with the subscript j and k of the data contained in Order (m−1), and Order (m). In addition, Wi refers to a write process, and Rj and Rk refer to a read process.

Figure 18:
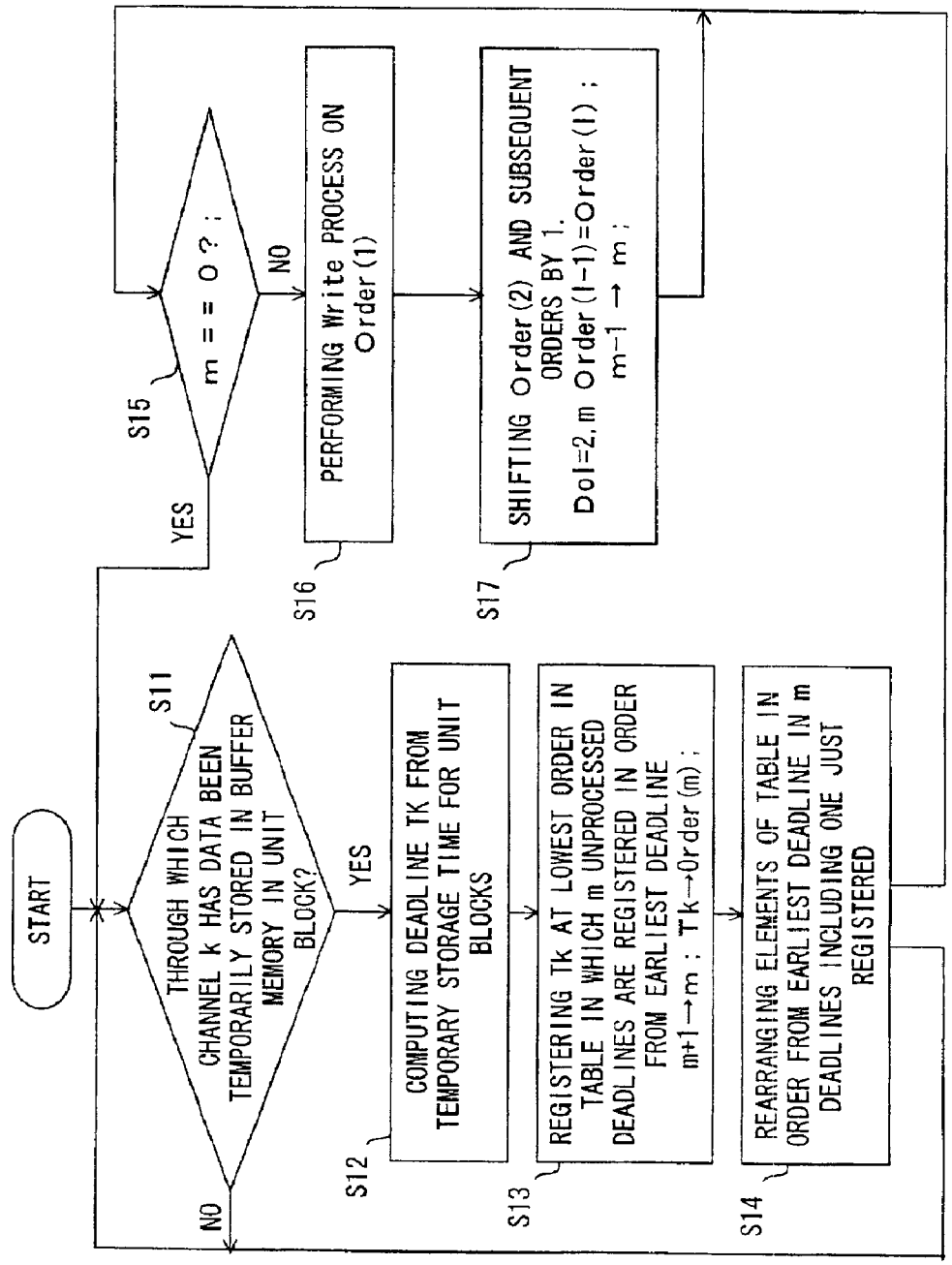
FIG. 18 is a flowchart of the write process.

FIG. 18 is a flowchart of scheduling and performing a write process. The variable m used in the flowchart in FIG. 18 indicates the number of elements Order (I) registered in the schedule table 70.

First, the MPU 61 determines whether or not unit blocks of write data has been temporarily stored in the buffer memory 64 through any channel k (step S11). If the data has not been temporarily stored, then the determination in step S11 is repeated.

When the data is temporarily stored through the channel k, then the deadline Tk of the write process of the channel k is computed depending on the time required to temporarily store the data (step S12). The temporary storage time depends on the transfer rate of the channel k, the deadline Tk also depends on it. The transfer rate of the channel k depends on the ratio of contained dummy packets, but it is assumed that the transfer rate does not largely change while two unit blocks of data is transferred. Therefore, the temporary storage time for the subsequent unit blocks of data is almost the same, and it can be assumed that already stored data can be written to the disk 66 within the time. Then, for example, a temporary storage time is added to the current time obtained from the timer, thereby computing the deadline Tk.

Then, the write process of the channel k is registered at the lowest order of the schedule table 70 in which m unprocessed write processes are arranged in order from the earliest deadline (step S13). That is, after incrementing the value of the variable m by 1, Tk is registered in Order (m). At this time, Wk, Ck, and Ak are simultaneously registered in Order (m). Then, including registered Order (m), the deadlines T of m elements are compared with each other and re-arranged in order from the earliest deadline (step S14), control is returned to step S11, and the processes in and after step S11 are repeated. The processes in steps S11 through S14 are the processes in which a new element is added to the schedule table 70 each time the data of unit blocks through a channel is stored in the buffer memory 64, and the elements registered in the schedule table 70 are sorted in order from the earliest deadline. Thus, elements Order (1), Order (2), . . . are registered in order from the earliest deadline in the schedule table 70.

In parallel with the processes in steps S11 through S14, the loop process in steps S15 through step S17 is performed by the MPU 51.

In this loop process, it is first determined whether or not m=0 (step S15). It is determined to check whether or not the element Order (I) has been registered in the schedule table 70.

If m is not 0, it is determined that an unprocessed write process remains, and the driver circuit 63 is instructed to perform the write process registered in the leading element Order (1) by referring to the schedule table 70 (step S16). Thus, the driver circuit 63 writes the data of the channel i registered in the Order (1) stored in the MPU 61 at the position of the address Ai on the disk 66.

Then, the MPU 61 shifts by 1 the numbers of the registered elements of and subsequent to the Order (2) in the schedule table 70 (step S17). In this example, for I=2, 3, . . . , m, the replacement of Order (I−1)=Order (I) is performed, and the value of the variable m is decremented by 1. Then, the processes in and after step S15; are repeated.

If m=0 in step S15, then it is determined that all write processes have been completed, and control is passed to step S11.

Figure 19:
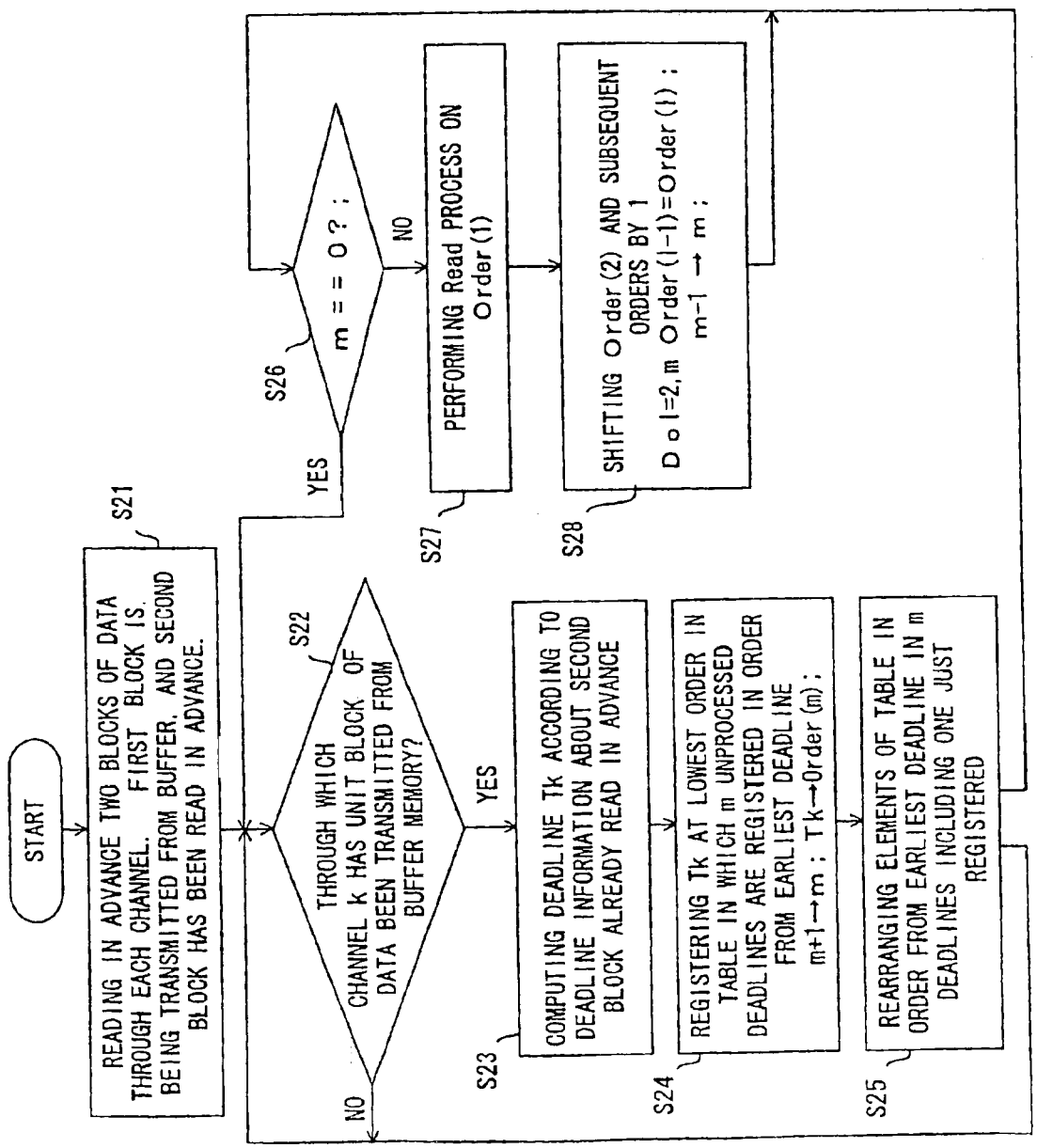
FIG. 19 is a flowchart of the read process.

FIG. 19 is a flowchart of scheduling and performing a read process. In each channel, two unit blocks of data in the buffer memory 64 is read from the disk 66 in advance by the driver circuit 63, and temporarily stored in the buffer memory 64 (step S21). Assume that the data of the first block is being transferred through the channel k from the buffer memory 64 to the LSI 62, and the data of the next block has been read in advance.

At this time, the MPU 61 first determines through which channel the read data of the unit block has been transmitted from the buffer memory 64 (step S22). If the data has not been completely transmitted, then the determination in step S22 is repeated.

If it is determined in step S22 that the data has been completely transmitted, the deadline Tk of the read process through the channel k is computed according to the deadline information of the read data of the next block through the channel k (step S23).

When read data is transferred based on the binary data read from the disk 66, the transfer time depends on the deadline information indicating the temporary storage time in the buffer memory 64 in a write process. For example, the deadline Tk is computed by adding the time corresponding to the deadline information to the current time obtained from the timer. The driver circuit 63 only has to read in advance the data of the next unit block from the disk 66 by the deadline Tk.

Then, as in step S13 shown in FIG. 18, the read process through the channel k is registered at the lowest order in the schedule table 70 containing m unprocessed read processes (step S24). Then, as in step S14 shown in FIG. 18, m elements are re-arranged in order from the earliest deadline (step S25), and the processes in steps S22 through S25 are repeated.

The MPU 61 performs the loop process in steps S26 through S28 in parallel with the loop process in steps S22 through S25.

That is, it is first determined whether or not m=0 (step S26).

If m is not 0, it is determined that an unprocessed read process remains, and the driver circuit 63 is instructed to perform the read process registered in the leading element Order (1) by referring to the schedule table 70 (step S27) Thus, the driver circuit 63 reads the data of the channel i from the position of the address Ai on the disk 66, and stores it in the buffer memory 64.

Then, as in step S17 shown in FIG. 18, the MPU 61 shifts by 1 the number of the elements of and subsequent to the Order (2) in the schedule table 70 (step S28). The processes in and after step S26 are repeated. Then, if m=0 in step S26, then it is determined that all read processes have been completed, and control is passed to step S22.

Figure 20:
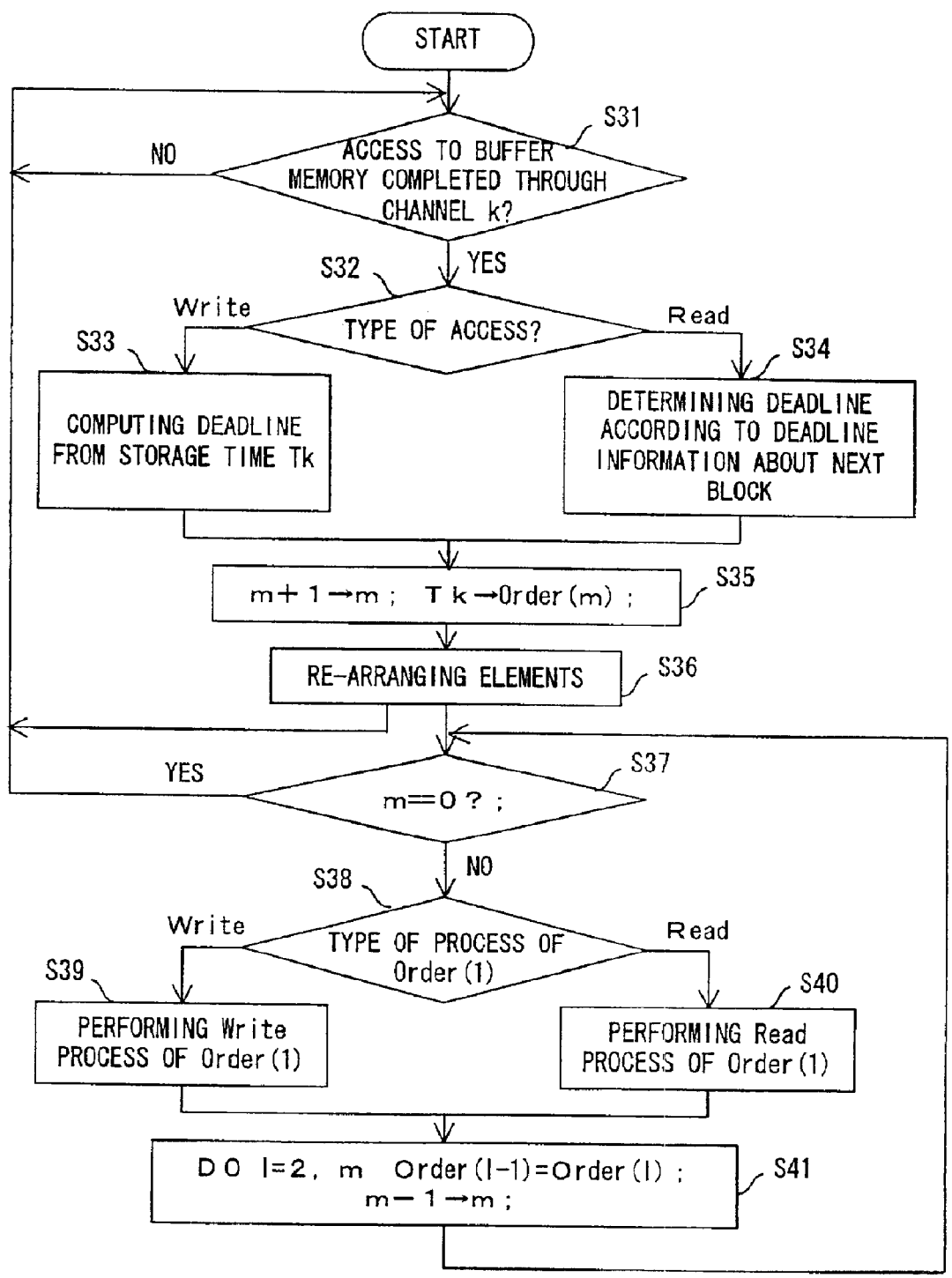
FIG. 20 is a flowchart of the write/read process.

When write processes and read processes coexist, the process shown in FIG. 20 is performed. The MPU 61 first determines whether or not access to the buffer memory 64 has been completed through any channel (step S31). If access has not been completed, the determination in step S31 is repeated.

Then, if it is determined in step S31 that access to the buffer memory 64 has been completed through the channel k, then it is determined whether the type of the completed access relates to temporary storage for a write process or transmission for a read process (step S32). If the access relates to temporary storage, as in step S12, the deadline Tk is computed from the temporary storage time (step S33). On the other hand, if access relates to transmission, as in step S23 shown in FIG. 19, the deadline Tk is computed from the deadline information of the data of the next block (step S34). Then, as in step S13 shown in FIG. 18, the process in the channel k is registered at the lowest order in the schedule table 70 (step S35). At this time, when a write process is performed, Wk is registered. When a read process is performed, Rk is registered.

When, as in step S14 shown in FIG. 18, the elements in the schedule table 70 are re-arranged (step S36), the loop process in steps S31 through S36 is repeated, and the loop process in step S37 through S41 is performed in parallel with the above mentioned loop process. That is, it is first determined whether or not m=0 (step S37).

If m is not 0, the schedule table 70 is referred to, and the type of the process registered in the leading element Order (1) is checked (step S38). If W has been registered, then the driver circuit 63 is instructed to perform the write process (step S39). If R has been registered, then the driver circuit 63 is instructed to perform the read process (step S40).

Then, as in step S17 shown in FIG. 18, the numbers of the elements of and subsequent to the Order (2) in the schedule table 70 are shifted by 1 (step S41), and control is returned to step S37. Then, if m=0 in step S37, then it is determined that all read/write processes have been completed, and control is passed to step S31.

If the elements of the schedule table 70 are re-arranged in step S14 shown in FIG. 18, step S25 shown in FIG. 19, and step S36 shown in 20, there are some algorithms depending on the method of comparing deadlines T.

For example, FIG. 21 shows the algorithm for comparing an element newly registered as shown in FIG. 17 with a one order higher element. In this algorithm, the MPU 61 first compares the deadline Tk (m) of the newly registered Order (m) with the deadline Tj (m−1) of the Order (m−1). If Tk (m)>Tj (m−1), then the re-arrangement terminates.

If Tk (m)=Tj (m−1), then the relationship among the block address Ah of the current head, the block address Ak (m) of the Order (m), and the block address Aj (m−1) of the Order (m−1) is checked. If Ak (m)−Ah>Aj (m−1)−Ah, then it is determined that the seek time of the head of the Order (m) is longer than that of the Order (m−1), thereby terminating the re-arrangement.

If {Tk (m)=Tj (m−1) and Ak (m)−Ah≦Aj (m−1)−Ah} or Tk (m)<Tj (m−1), then the Order (m) and the Order (m−1) are exchanged. Then, the value of m is decremented by 1, and the processes are repeated.

In many cases, since the deadline of a newly registered process is expected to be later than that of an already registered process, the time required to perform the re-arranging process can be minimized according to the above mentioned algorithm.

FIG. 22 shows the algorithm of registering in the schedule table 70 an element newly registered as shown in FIG. 17 in the binary search method. In this algorithm, the MPU 61 first compares the deadline Tk (m) of the Order (m) with the deadline Tj (m/2) of the Order (m/2).

If Tk (m)>Tj (m/2), then an element Order (3m/4) in the middle between the Order (m/2) and the Order (m) is to be compared, and Tk (m) is compared with Tj (3m/4). If Tk (m)<Tj (m/2), then Tk (m) is compared with Tj (m/4).

By repeating the above mentioned comparing process, the range of Tk (m) is stepwise specified, and the Order (m) is set in the finally determined order. Thus, the comparing process terminates at the number of times of the exponentiation of 2, thereby terminating the re-arrangement in a comparatively short time.

Described below by referring to FIGS. 23 through 29 is the scheduling method of assigning an appropriate write area on the disk 66 when real time write requests are issued through a plurality of channels.

As described above, the disk 66 normally has a plurality of zones having one or more tracks. In the ZCAV system, since the storage capacity of an outer zone is larger than that of an inner zone, the transfer rate of an outer zone is higher than that of an inner zone. Therefore, considering the difference in transfer rate between zones, a write zone can be dynamically changed depending on the situation.

Figure 23:
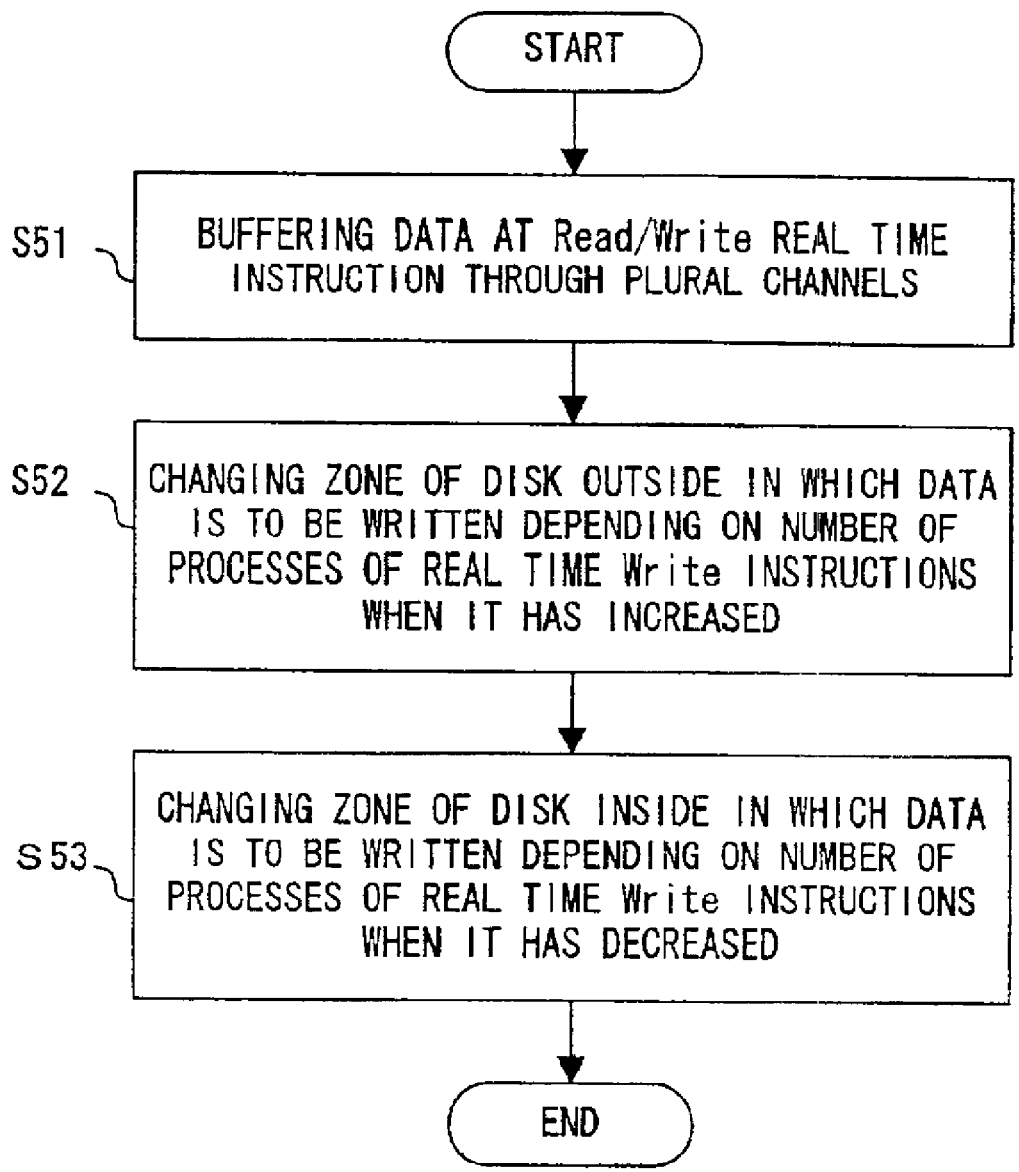
FIG. 23 is a flowchart showing the principle of the first zone determining process.

FIG. 23 is a flowchart showing the first principle of the process of determining a zone depending on the number of write processes at a plurality of real time write requests. First, at real time read/write instructions through a plurality of channels, the MPU 61 temporarily stores data in predetermined block units in the buffer memory 64 (step S51) As described above, the size of a unit block is normally 64 KB.

When the number of times of the processes of real time write instructions increases, the write zone on the disk 66 is extended outward depending on the number of performed processes (step S52). When the number of times of the processes of write instructions is reduced, then the write zone is reduced to inward depending on the number of performed processes (step S53).

In this method, the number of performed processes of a write instruction are associated with zones in advance so that the transfer rate can be optimized by moving the write zone depending on the number of concurrent write processes.

For example, the MPU 61 moves the write area to an outer zone corresponding to the number of performed processes in step S52, and moves it to an inner zone corresponding to the number of processes in step S53. Thus, when the number of write processes increases, an outer zone having a higher transfer rate is used, thereby improving the efficiency of processes.

Figure 24:
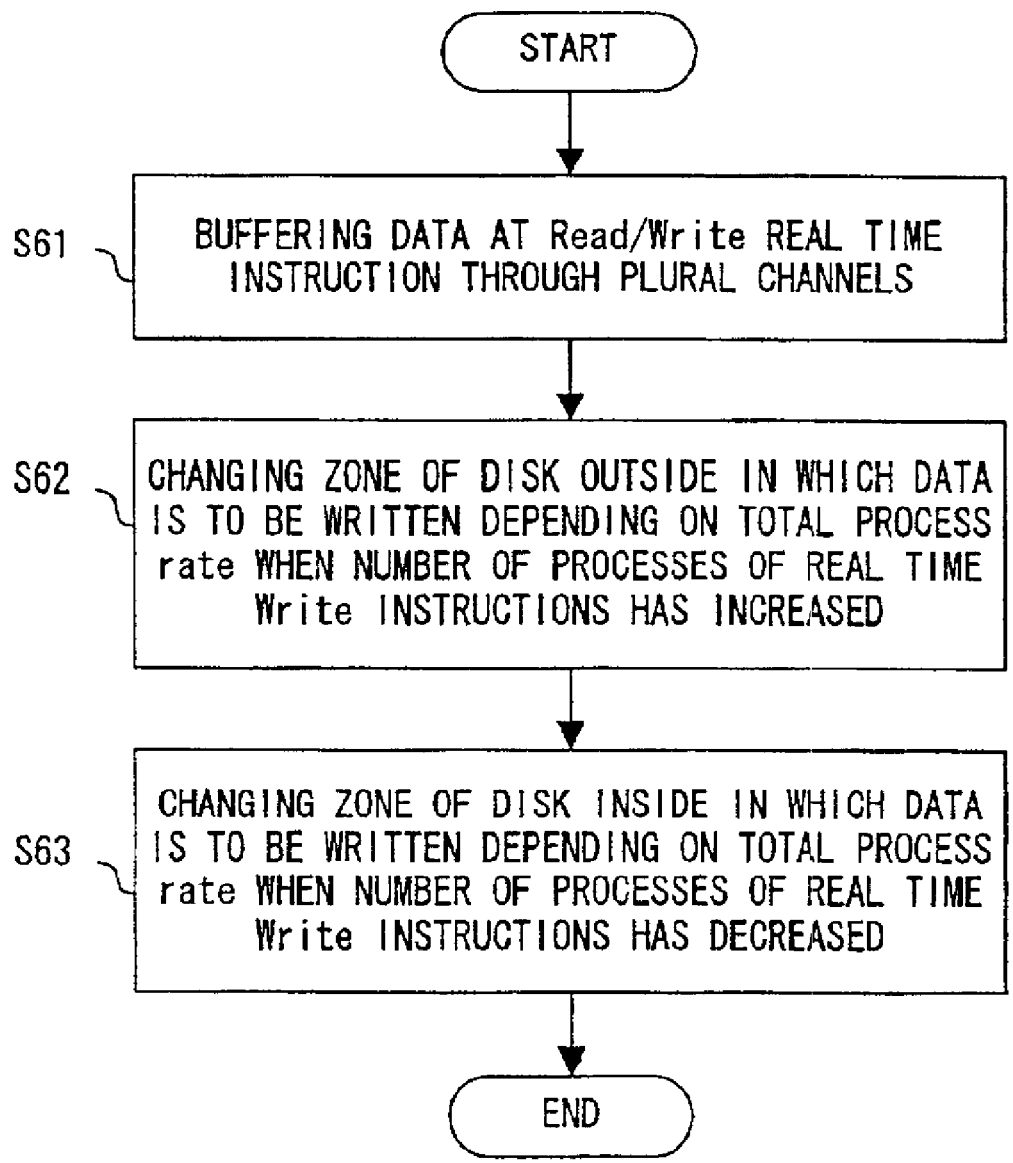
FIG. 24 is a flowchart showing the principle of the second zone determining process.

FIG. 24 is a flowchart showing the second principle of the process of determining a zone depending on the transfer rate of the write process in response to a plurality of real time write requests. First, at real time read/write instructions through a plurality of channels, the MPU 61 temporarily stores data in the buffer memory 64 in predetermined block units (step S61).

When the number of performed processes of real time write instructions increases, the write zone on the disk 66 is changed into an outer zone based on the total execution rate of the instructions (step S62). When the number of performed processes of write instructions increases, the write zone is changed into an inner zone based on the total execution rate of the instructions (step S63).

In this method, the optimization can be further improved than in the method shown in FIG. 23 by changing the zone in consideration of the relationship between the total transfer rate requested by a plurality of write instructions and the transfer rate of each zone.

In step S62, the MPU 61 moves the write address to an outer zone if, for example, the total transfer rate requested by a plurality of write instructions exceeds the reference transfer rate of the zone corresponding to the current head position.

In step S63, if the total transfer rate is lower than the reference transfer rate of the current zone, and the reference transfer rate of an inner zone exceeds the total transfer rate, then the MPU 61 moves the write address to an inner zone. Thus, depending on the total transfer rate requested by a plurality of write instructions, a more appropriate zone area is selected to efficiently use the disk 66 and improve the access efficiency to the disk 66.

Figure 25:
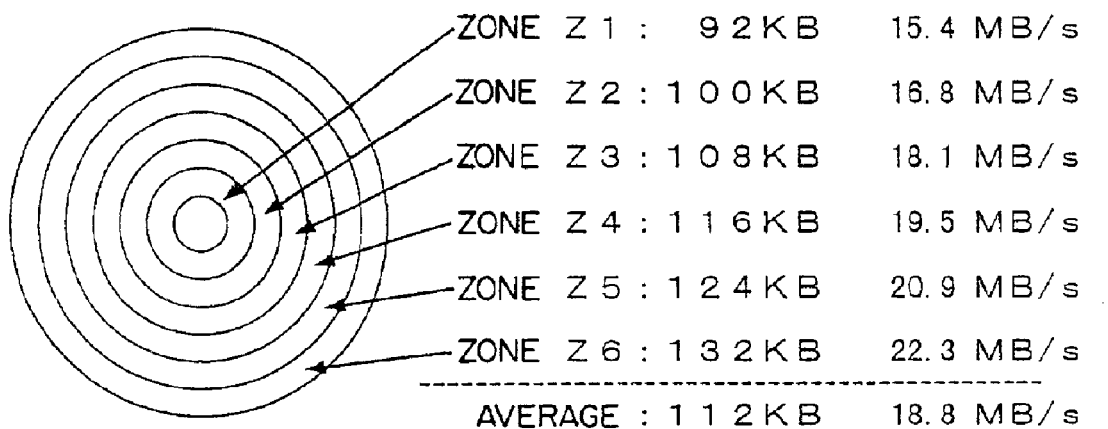
FIG. 25 shows a plurality of zones and the transfer rate.

FIG. 25 shows an example of a, transfer rate of each zone in a plurality of zones on the disk 66. The disk 66 is divided into six zones Z1 through Z6. The capacities of the zones Z1, Z2, Z3, Z4, Z5, and Z6 are respectively 92 KB, 100 KB, 108 KB, 116 KB, 124 KB, and 132 KB.

Assuming that the number of revolutions of the disk 66 is 10,000 rpm (6 ms/revolution), the transfer rates of the zones Z1, Z2, Z3, Z4, Z5, and Z6 are respectively 15.4 MB/s, 16.8 MB/s, 18.1 MB/s, 19.5 MB/s, 20.9 MB/s, and 22.3 MB/s. Normally, the transfer rate of the innermost zone is about 60% of the outermost zone.

Figure 26:
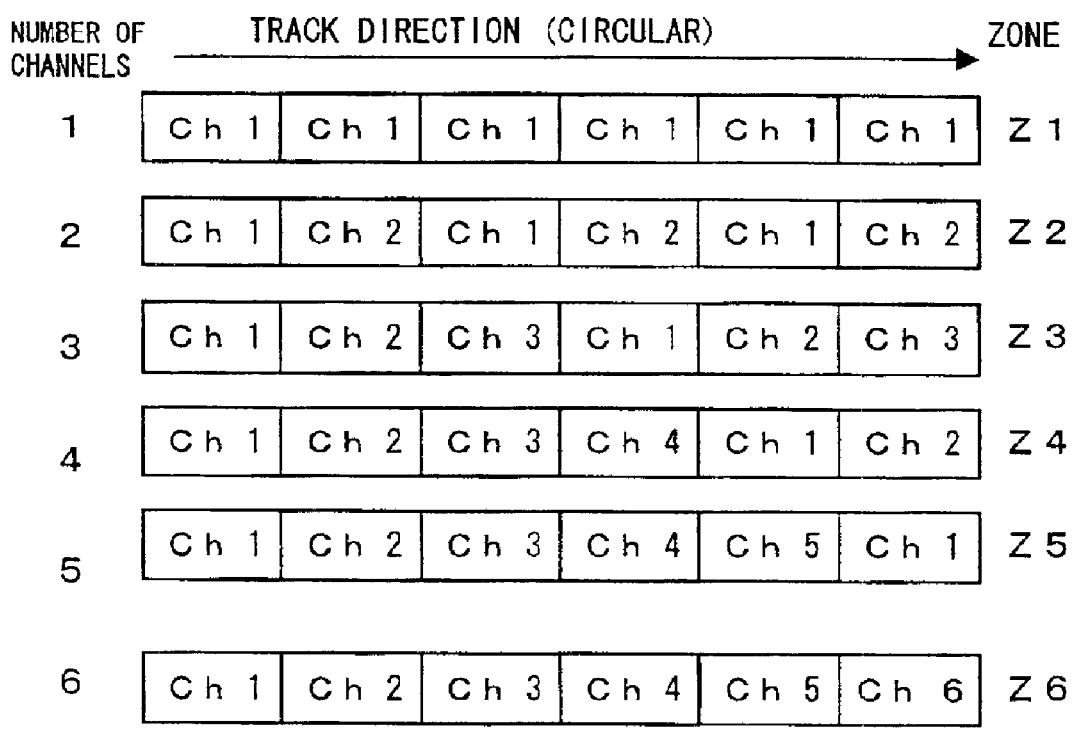
FIG. 26 shows the write process based on the number of channels.

FIG. 26 shows an example of the process of writing data to the zone shown in FIG. 25. First, when the number of channels for the write process is 1 (Ch 1), the innermost zone Z1 is selected, and data is written at the serial addresses in the zone Z1 in order of Ch1, Ch1, Ch1, Ch1, . . . along the direction of the track (circularly). When the number of channels is 2 (Ch1, Ch2), the zone Z2 is selected, and data is written at the serial addresses in the zone Z2 in order of Ch1, Ch2, Ch1, Ch2, . . .

When the number of channels is 3 (Ch1 through Ch3), the zone 3 is selected, and data is written at the serial addresses in the zone Z3 in order of Ch1, Ch2, Ch3, . . . When the number of channels is 4 (Ch1 through Ch4), the zone Z4 is selected, and data is written at the serial addresses in the zone Z4 in order of Ch1, Ch2, Ch3, Ch4, . . . When number of channels is 5 (Ch1 through Ch5), the zone Z5 is selected, and data is written at the serial addresses in the zone Z5 in order of Ch1, Ch2, Ch3, Ch4, Ch5 . . . When number of channels is 6 (Ch1 through Ch6), the zone Z6 is selected, and data is written at the serial addresses in the zone Z6 in order of Ch1, Ch2, Ch3, Ch4, Ch5, Ch6 . . .

When data is written in the zone determining process shown in FIG. 24, a reference transfer rate is determined for each zone, the total transfer rate of the write process is compared with the reference transfer rate, and a write zone is determined. The transfer rate of each write process is, for example, computed from a temporary storage time per unit block in the buffer memory 64.

As a reference transfer rate, the value equal to or lower than the transfer rate of each zone shown in FIG. 25 is used. In this example, the value of about 30% of the transfer rate of each zone is used with the wait for seek or revolution taken into account. As a result, the reference transfer rates of the zones Z1, Z2, Z3, Z4, Z5, and Z6 are respectively 5.0 MB/s, 5.5 MB/s, 6.0 MB/s, 6.5 MB/s, 7.0 MB/s, and 7.5 MB/s.

When the total transfer rate of the write process is 5.0 MB/s or lower, the innermost zone Z1 is selected, and data is written at the serial addresses of the zone Z1 as in the process shown in FIG. 26. When the total transfer rate is higher than 5.0 MB/s and equal to or lower than 5.5 MB/z, data is written at the serial addresses of the zone Z2

When the total transfer rate is higher than 5.5 MB/s and equal to or lower than 6.0 MB/s, data is written to the serial addresses of the zone Z3. When the total transfer rate is higher than 6.0 MB/s and equal to or lower than 6.5 MB/s, data is written to the serial addresses of the zone Z4. When the total transfer rate is higher than 6.5 MB/s and equal to or lower than 7.0 MB/s, data is written to the serial addresses of the zone Z5. When the total transfer rate is higher than 7.0 MB/s and equal to or lower than 7.5 MB/s, data is written to the serial addresses of the zone Z6.

Thus, the data through each channel is sequentially written in the scheduled order by concentrating write areas on the same zone or vicinal zones on the disk 66. Thus, the wait for seek, revolution, etc. on the disk 66 can be reduced.

When an assigned zone is full when a process is performed (when there is no empty area), an outer adjacent zone is automatically selected. When all outer zones are full, an inner zone is selected.

Figure 27:
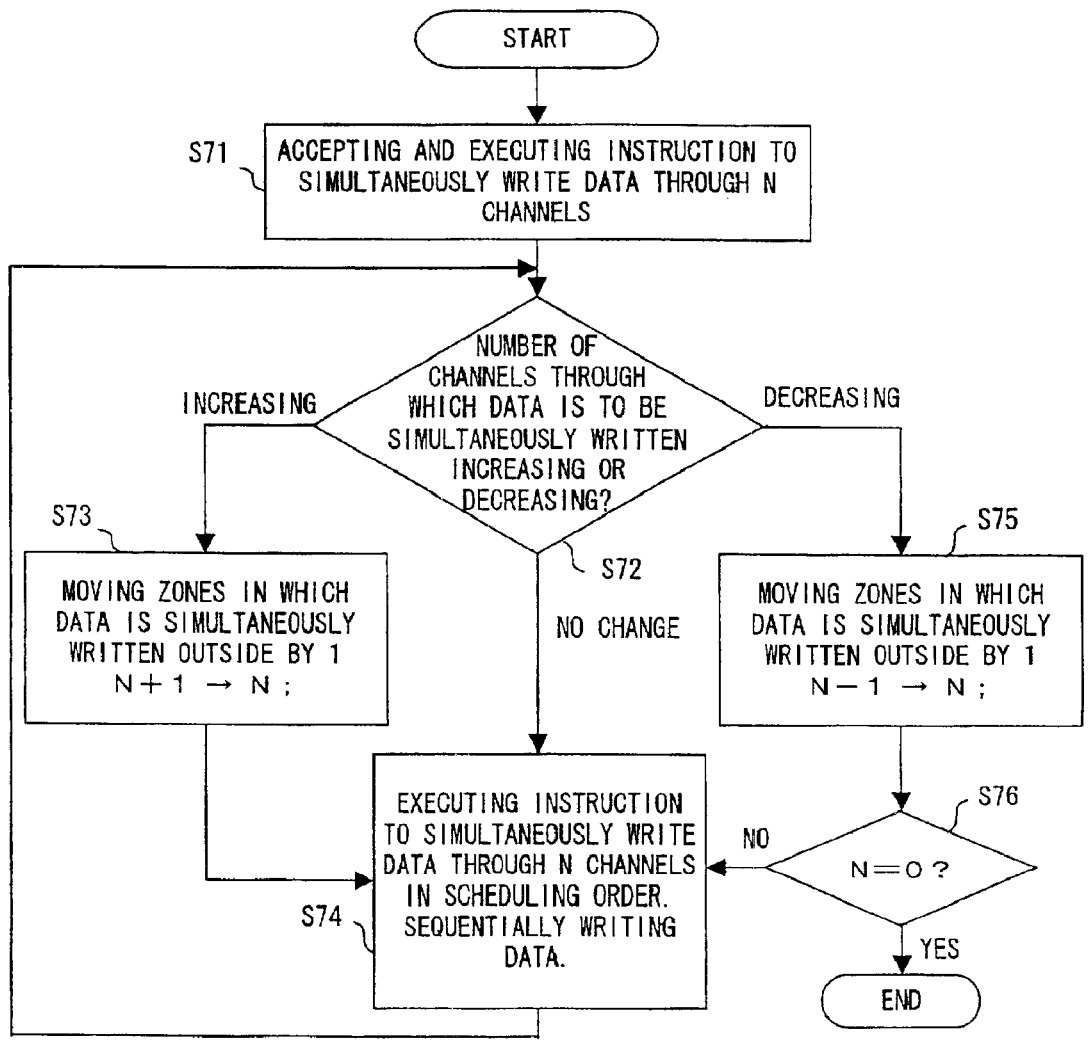
FIG. 27 is a flowchart of the write process based on the number of channels.

FIG. 27 is a flowchart of the write process based on the zone determining process shown in FIG. 23. The storage device 51 first accepts simultaneous write instructions through N channels (step S71), and checks whether or not there in an increasing or decreasing number of channels for the simultaneous write processes (step S72).

When the number of channels increases, the write zone is extended by 1 to the outer zone, the number N of channels is incremented by 1 (step S73), and the simultaneous write processes are performed in the scheduled order through N channels (step S74). At this time, the data in each channel is sequentially written to the selected zone, and the processes in and after step S72 are repeated.

When the number of channels decreases in step S72, the write zone is moved to an inner zone, the number N of channels is decremented by 1 (step S75), and it is checked whether or not N=0 (step S76). If N is not 0, the processes in and after step S74 are performed.

When the number of channels remains unchanged in step S72, the processes in and after step in S74 are performed without moving the write zone. When N reaches 0 in step S76, it is determined that all simultaneous write processes have terminated, thereby terminating the entire processes.

It is difficult to write data with concentration on an inner zone. In this case, the transfer rate can be leveled on the entire disk by alternately accessing a pair of inner and outer zones, thereby obtaining a constant transfer rate. For example, an average transfer rate of the six zones shown in FIG. 25 is 18.8 MB/s.

Figure 28:
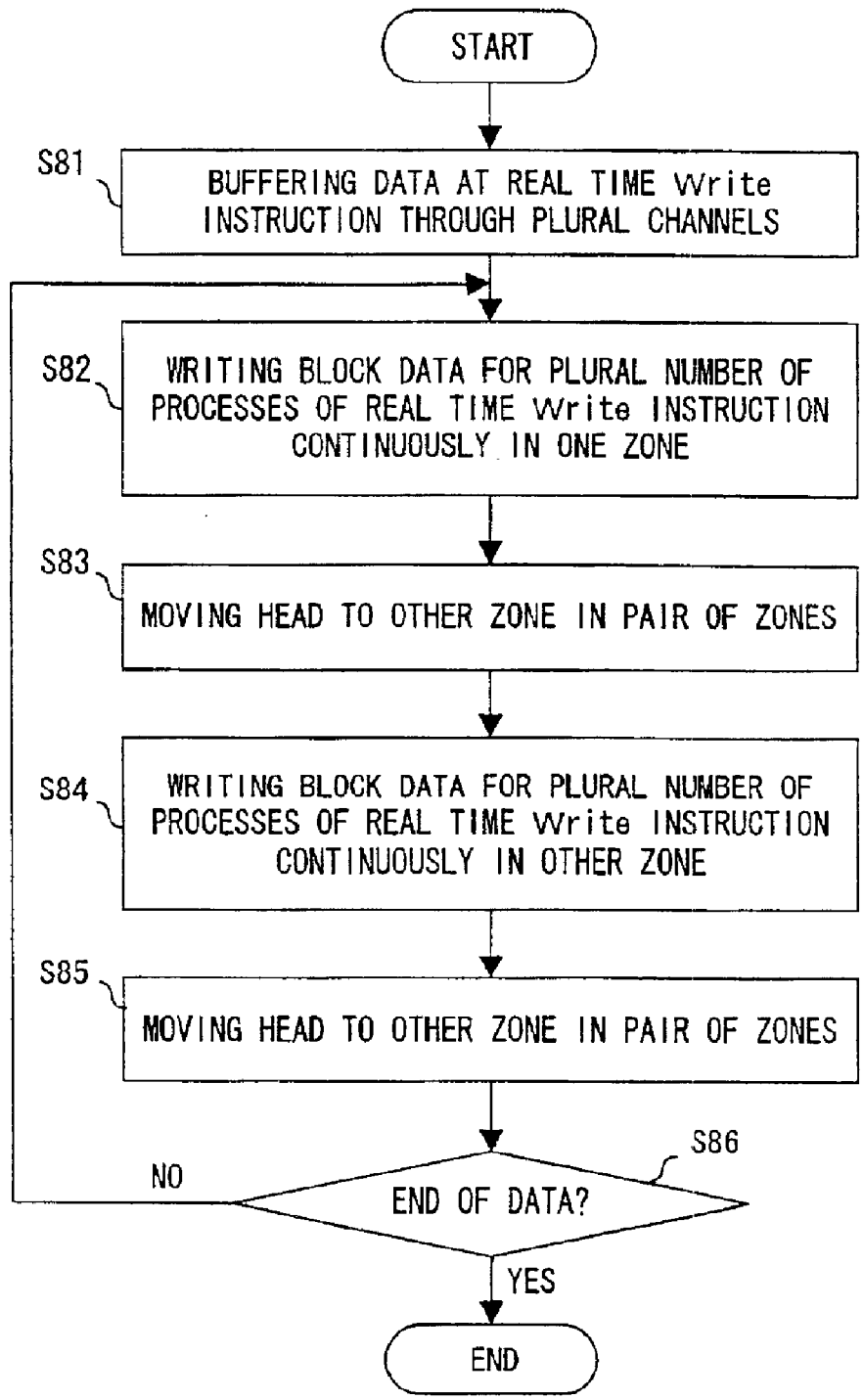
FIG. 28 is a flowchart of the write process using a pair of zones.

FIG. 28 is a flowchart of the above mentioned write process. At real time write instructions through a plurality of channels, the storage device 51 temporarily stores data in predetermined block units in the buffer memory 64 (step S81).

Then, the driver circuit 63 continuously writes block data of the number of processes to be performed corresponding the write instructions through the plurality of channels in one zone in a pair of zones (step S82), and moves the head to the other zone (seek) (step S83).

Then, block data of the number of processes to be performed corresponding to the write instructions through the plurality of channels are continuously written (step S84), and the head is returned to the other zone in the pair of zones (step S85).

It is determined whether or not the write data has been completely written (step S86). If it has not been completely written, the processes in and after step S82 are repeated. Then, if data has completely been written in step S86, the process terminates.

In this method, the head is moved alternately between an inner zone and an outer zone as a pair of zones, and data is sequentially written to each zone. That is, data is not written with concentration on a specific zone on the disk 66, but is distributed and written to a plurality of zones, thereby leveling the transfer rate on the entire disk 66, and improving the efficiency of the processes.

Figure 29:
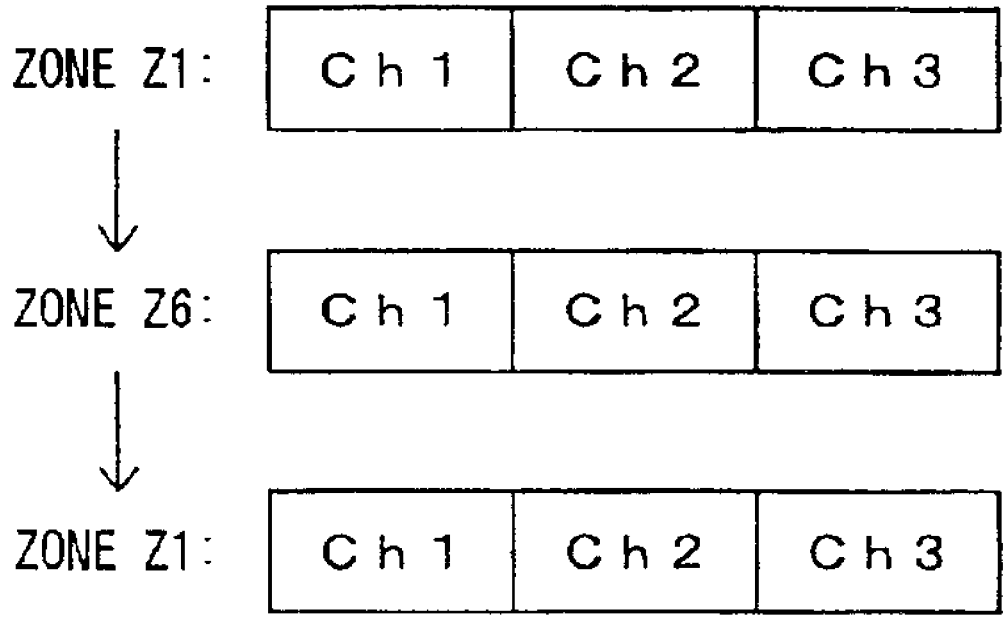
FIG. 29 shows the write process using a pair of zones.

FIG. 29 shows an example of the write process shown in FIG. 28. Assuming that the number of channels for the write process is set to 3 (Ch1 through Ch3), and the innermost zone Z1 and the outermost zone Z6 are set as a pair of zones, data is first written at the serial addresses in the zone Z1 in order of Ch1, Ch2, Ch3, . . . , and then the zone Z6 is sought to write data at the serial addresses in order of Ch1, Ch2, Ch3, . . . . The operation is repeated until all data is completely written, and the disk head is moved between the zones Z1 and Z6 to continuously write data through 3 channels.

As described above, the disk access is controlled mainly by the MPU 61 shown in FIG. 12. The MPU 61 comprises a microprocessor 71 and memory 72 as shown in FIG. 30. The memory 72 comprises, for example, ROM (read only memory), RAM (random access memory), etc., and stores a program and data used for control. The microprocessor 71 performs a necessary process by executing a program using the memory 72.

A medium drive device 73 connected to a bus 65 drives a portable storage medium 74, and accesses the stored data. The portable storage medium 74 can be an optional computer-readable storage medium such as a memory card, a floppy disk, CD-ROM (Compact Disk Read Only Memory), an optical disk, a magneto-optical disk), etc. The above mentioned program and data are stored in the portable storage medium 74, and loaded to the memory 72 of the MPU 61 for use.

Furthermore, the MPU 61 can receive the above mentioned program and data from an external network, and load them to the memory 72 for use.

The present invention can be applied not only to the process of picture/voice data in a home network, but also to any data process to be performed in real time. For example, when data to be processed is fetched to a computer system, the above mentioned control can be performed. Access can be gained to a magnetic disk, an optical disk, a magneto-optical disk, and any other storage medium including a memory card, etc.

According to the present invention, the deadline is determined according to the actual transfer rate of write data, and the disk access is scheduled based on the deadline, thereby recording/reading a number of channels. Furthermore, using the difference in transfer rate depending on the write areas in response to a plurality of real time write requests, the process can be efficiently performed, and data can be recorded and read through a larger number of channels.

Figure 31:
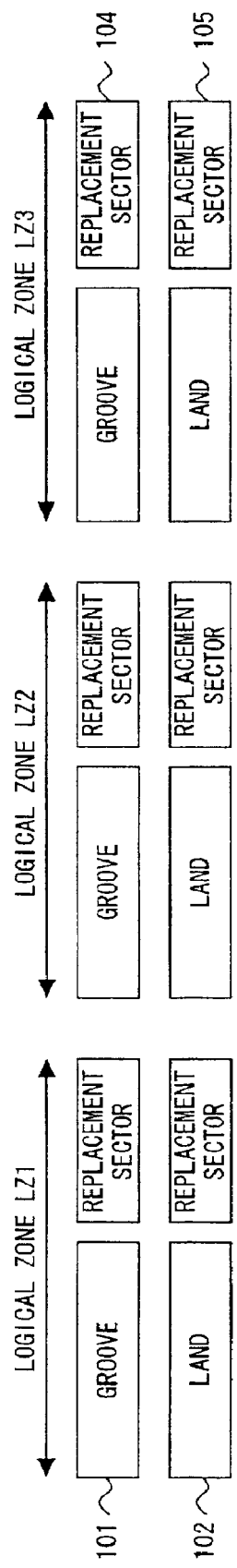
FIG. 31 shows the state in which the ASMO is divided into three logical zones.
Figure 32:
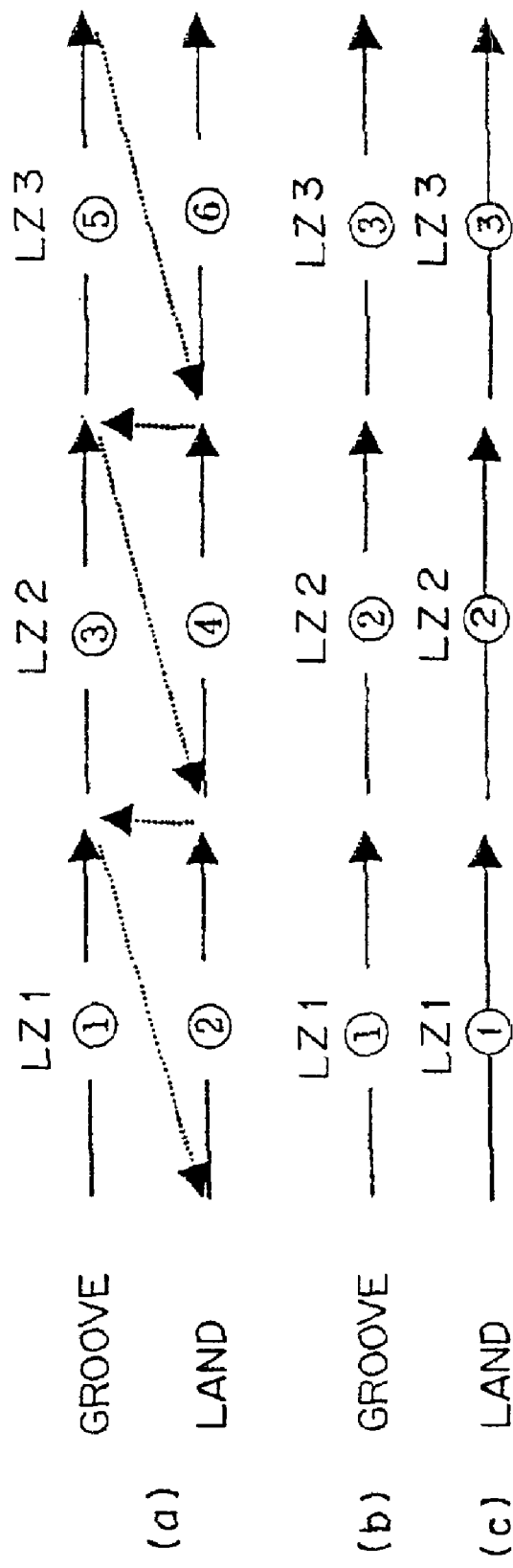
FIGS. 32(*a*), 32(*b*) and 32(*c*) show the method of recording data of 1 channel on the ASMO shown in FIG. 31 in which FIG. 32(*a*) shows the method of recording data in a logical zone, FIG. 32(*b*) shows the method using the groove, and FIG. 32(*c*) shows the method using the land.
Figure 33:
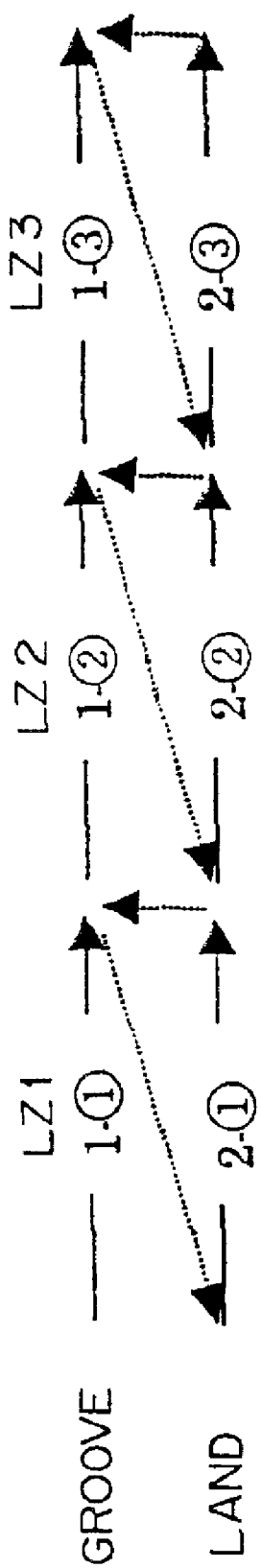
FIG. 33 shows the method of recording data of 2 channels on the ASMO shown in FIG. 31.

FIGS. 31 through 33 show the system of recording data when the present embodiment is applied as a storage medium to the ASMO. The present invention is not limited to the ASMO, but can be applied to any other storage medium based on the land-groove recording system.

FIGS. 31 through 33 show an example of recording data in three logical zones LZ1, LZ2, and LZ3 for easy understanding.

As shown in FIG. 31, each of the logical zones LZ1, Z2, and LZ3 has adjacent groove 101 and land 102 and has replacement sectors 104 and 105 subsequent to the groove 101 and the land 102 respectively.

FIGS. 32(a), 32(b) and 32(c) show the method of recording data through one channel sequentially in the logical zones LZ1, LZ2, and LZ3.

FIG. 32(a) shows an example of recording data in logical zone units in order of LZ1, LZ2, and LZ3 from 1 to 6. That is, in this case, data is recorded in the order of the groove 101 and the land 102 in each logical zone.

FIG. 32(b) shows an example of recording data only on the groove 101, and data is recorded in each groove 101 in order of the logical zones LZ1, LZ2, and LZ3. FIG. 32(c) shows an example of recording data only on the land 102, and data is recorded in each land 102 in order of the logical zones LZ1, LZ2, and LZ3.

FIG. 33 shows the method of simultaneously recording data in the logical zones LZ1, LZ2, and LZ3 through two channels.

In FIG. 33, 1-1 through 1-3 indicate the data through the channel Ch1, 2-1 through 2-3 indicate the data through the channel Ch2. In this case, data is alternately recorded on the groove 101 and the land 102. However, the data through the Ch1 is recorded on the groove 101 of the logical zones LZ1, LZ2, and LZ3, and the data through the channel Ch2 is recorded on the land 102 of the logical zones LZ1, LZ2, and LZ3. Thus, since the data through the channel Ch1 and the data through the channel Ch2 are separately recorded on the groove 101 and the land 102, the data through one channel can be successfully read although the data recorded through the other channel has been deleted. In addition, data can be quickly recorded through a new channel with concentration at an area from which recorded data has been deleted.

FIG. 34 shows an example of simultaneously recording data through two channels Ch1 and Ch2 in the method shown in FIG. 33, deleting the recorded data through the channel Ch2, and then garbage-collecting the data recorded through the channel Ch1.

As shown in FIG. 34(a), assume that the data is recorded through the channel Ch1 on the groove 101 in the logical zones LZ1, LZ2, and LZ3, and the data is simultaneously recorded through the channel Ch2 on the land 102 in the logical zones LZ1, LZ2, and LZ3. In this case, it is not necessary to perform the seeking process by the head.

Then, as shown in FIG. 34(b), assume that the data through the Ch2 has been removed from the land 102 of the logical zones LZ1, LZ2, and LZ3. In this case, since the data through the channel Ch1 is continuously recorded on the groove 101 in the logical zones LZ1, LZ2, and LZ3, the data through the channel Ch1 can be smoothly read. In addition, it is also possible to record data through a new channel Ch2' on the land 102 in the logical zones LZ1, LZ2, and LZ3.

Furthermore, when data is to be recorded simultaneously through two new channels in and subsequent to the logical zone LZ3 after deleting the data through the channel Ch2 as described above, the data through the channel Ch1 is garbage-collected as shown in FIG. 34(c). In this case, data recorded in the groove 101 of the logical zone LZ2 through the channel Ch1 is moved to the land 102 of the logical zone LZ1, and the data of the logical zone LZ3 through the channel Ch1 is moved to the groove 101 of the logical zone LZ2. As a result, as shown in FIG. 34(c), the groove 101 and the land 102 of the logical zone LZ3 become empty. Thus, as shown in FIG. 34(d), the data through the channels Ch3 and Ch4 can be simultaneously recorded on the groove 101 and the land 102 in and after the logical zone LZ3.

The process procedure of the present embodiment for realizing the operations shown in FIGS. 33 and 34 is described below by referring to the flowchart shown in FIG. 35.

First, a record, read, or delete instruction is stored in the stack (push up stack) (step S91).

Then, it is determined whether or not there is an instruction in the stack (step S92). If no, the process terminates.

If it is determined in step S92 that there is an instruction in the stack, then the instruction is fetched from the stack, and it is determined whether the instruction is a record, read, or delete instruction through one channel or two (step S93).

If it is an instruction recorded through one channel, then data is recorded in the corresponding logical zone, groove, or land (step S94). If it is a record instruction through two channels, then data is recorded on the groove through one channel and on the land through the other channel (step S95). After the processes in steps S94 and S95, control is returned to step S92.

If it is determined in step S93 that the instruction is not a record instruction through one channel or two, then it is determined that the instruction is a read or delete instruction (step S96). If it is a read instruction, then data is read through one channel (step S97), and control is returned to step S92.

If it is determined in step S96 that the instruction is a delete instruction, then it is determined whether or not the delete instruction indicates deleting data through one channel of the two (step S98). That is, it is determined whether or not the instruction indicates deleting the data through one channel when the data is simultaneously recorded through two channels (refer to FIG. 33).

If the instruction does not indicates deleting the data through one channel when the data is recorded through two channels, but indicates deleting the data through one channel when it is recorded through one channel, then the data recorded through one channel is deleted (step S99), and control is returned to step S92. That is, if the data recorded through one channel is to be deleted as shown in FIGS. 32(a), 32(b) and 32(c), then the data is deleted from the logical zone, groove or land through the specified channel.

On the other hand, if it is determined in step S98 that a delete instruction indicates deleting data through one channel when the data is simultaneously stored through two channels, then the data recorded through one channel is deleted from the groove or the land of a logical zone (step S100). In this case, the groove or the land of the logical zone becomes empty.

Then, it is determined whether or not there is an enough empty area in the logical zone on the disk (step S101). If there in an enough empty area, then control is returned to step S92. If the empty area is not large enough, then the data recorded through the channel from which data is not deleted in step S100 is garbage-collected in the logical zone whose groove or land has become empty in step S100 (step S102).

The garbage collection is performed in the method shown in FIG. 34(b) or 34(c). Thus, the number of logical zones having an empty area increases. After performing the process in step S102, control is returned to step S92.

As described above, when data is simultaneously recorded through two channels, the data can be appropriately read through one channel by utilizing the seriality of the groove or land. Furthermore, although the data is deleted through one channel, it does not cause empty areas to be scattered, but can reduce the number of garbage collecting processes to be performed.

Figure 36:
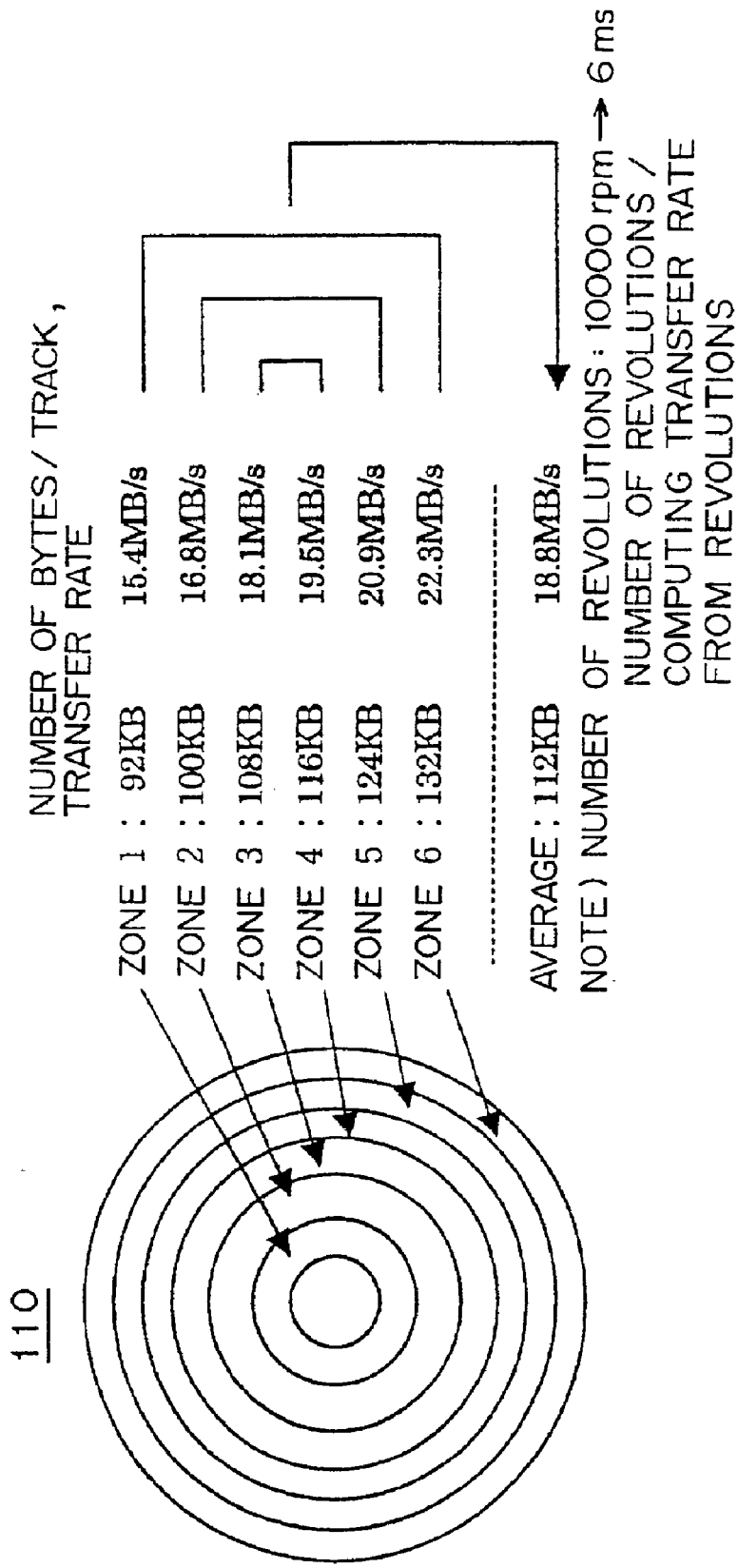
FIG. 36 shows the configuration of the divided zones of the disk in the revolution control system of the ZCAV system, and the method of configuring a pair of zones for a leveled transfer rate.

Described below is an example of recording data through two channels by distributing the data to inner and outer zones as a method of absorbing the difference in transfer speed (transfer rate) between inner and outer zones on the disk whose revolution is controlled by the ZCAV. As shown in FIG. 36, in the drive in which the revolution of a disk 110 is controlled by the ZCAV having different transfer rates between inner and outer zones, it is difficult to record data with concentration on inner zones having lower transfer speeds. Therefore, the transfer speed can be leveled by alternately accessing an inner zone and an outer zone as a pair, thereby obtaining a constant rate on the entire disk 110.

FIG. 36 shows an example of dividing the disk 110 into six zones 1 through 6 as with the disk 66 shown above in FIG. 25. In this case, the average transfer rate is 18.8 MB/s.

Figure 37:
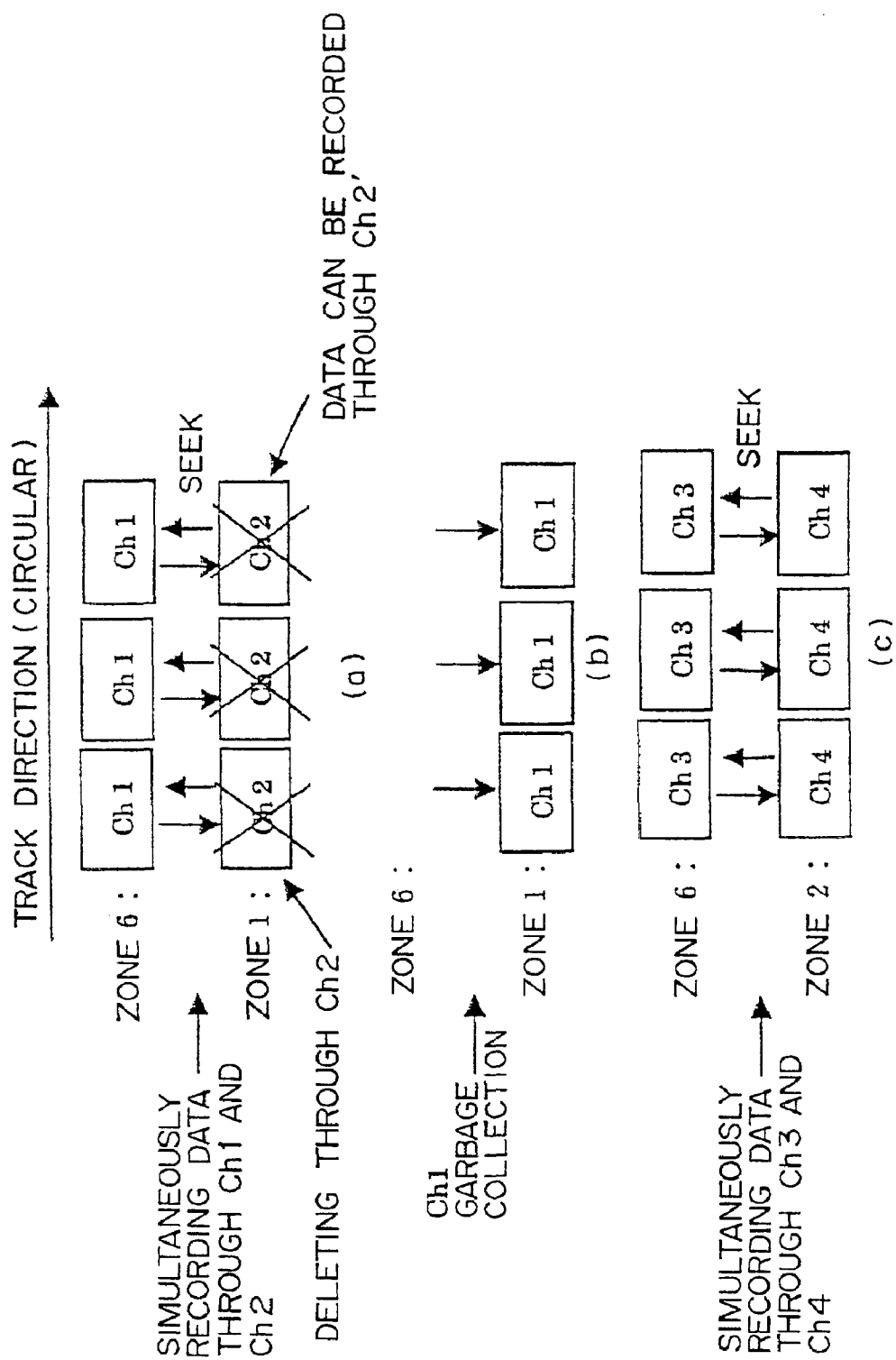

FIGS. 37(a), 37(b) and 37(c) show the process performed when data is simultaneously recorded through two channels on the disk 110 divided into zones as shown in FIG. 36. First, as shown in FIG. 37(a), the zones 1 and 6 are set as a pair, and data is simultaneously recorded in the zones 1 and 6 through the channels Ch2 and Ch1 respectively. In this case, the data through each channel is recorded along the track (circularly), and the seek process by the head is performed alternately in the zones 6 and 1.

Then, assuming that, as shown in FIG. 37(a), data is deleted from the zone 1 through the channel Ch2, data can be newly recorded with concentration through the channel Ch2'. In addition, when the number of empty areas increases only in inner zones and there are no areas enough to simultaneously record data through two channels, as shown in FIG. 37(b), the garbage collecting process is performed to utilize the zone 6 having a higher transfer rate and to move the data recorded in the zone 6 through the channel Ch1 to the zone 1 where there is an empty after the deletion of the data.

After reserving an empty area in the zone 6, the zone 6 and the zone 2 are set as a pair as shown in FIG. 37(c), and data is simultaneously recorded through the channels Ch3 and Ch4.

Figure 38:
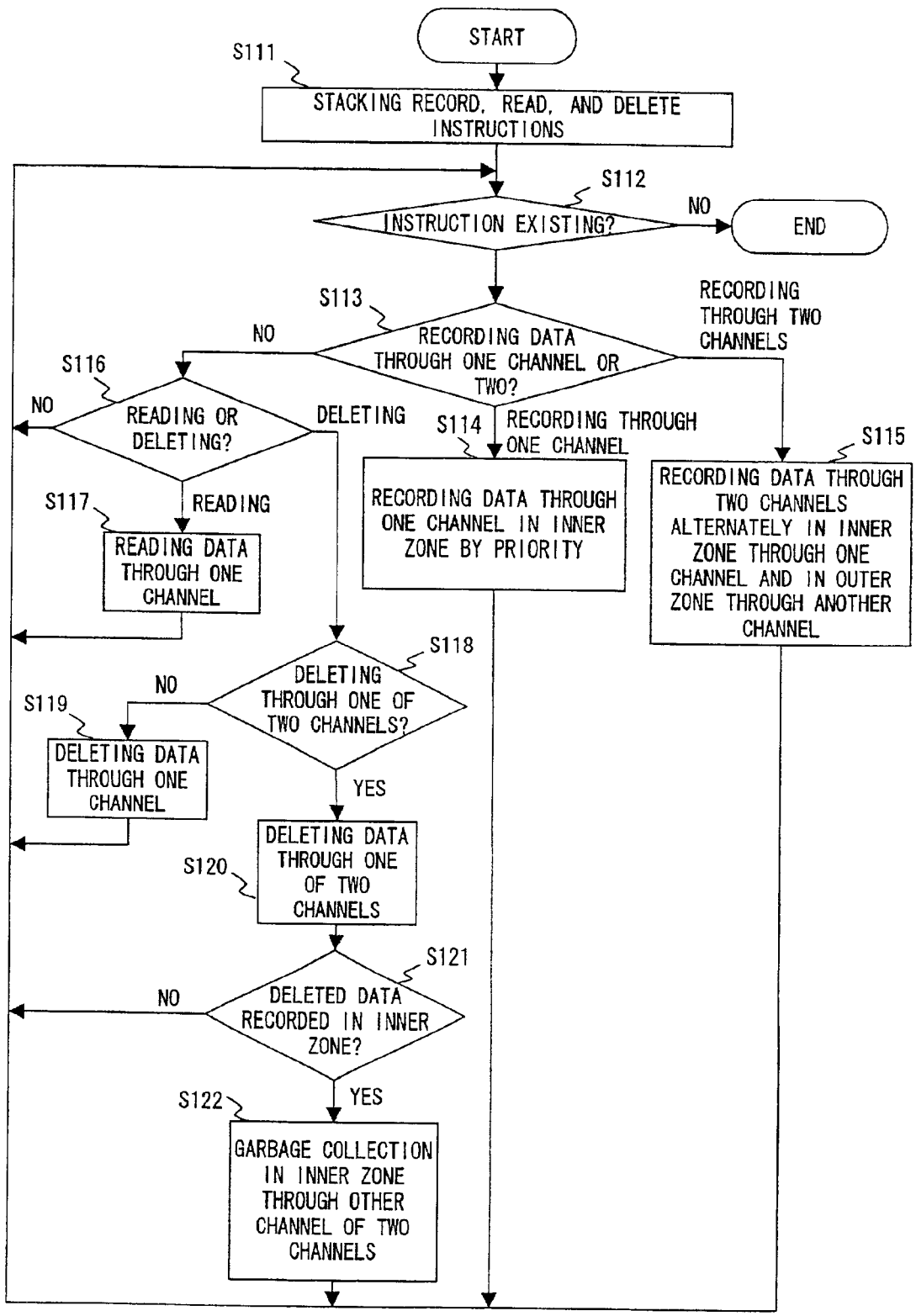
FIG. 38 is a flowchart of the process procedure of recording data at a leveled transfer rate between inner and outer zones.

FIG. 38 is a flowchart of the algorithm for realizing the process shown in FIGS. 37(a), 37(b) and 37(c).

First, a record, read, or delete instruction is stored in a stack (push up stack) (step S111).

Then, it is determined whether or not there is an instruction in the stack (step S112). If no, the process terminates.

If it is determined in step S112 that there is an instruction in the stack, then the instruction is fetched from the stack, and it is determined whether the instruction is a record, read, or delete instruction through one channel or two (step S113).

If it is an instruction to record data through one channel, then data is recorded through a specified channel in an inner zone by priority (step S114). If it is a record instruction through two channels, then data is alternately recorded in an inner zone through one channel and in an outer zone through the other channel (step S115). After the processes in steps S114 and S115, control is returned to step S112.

If it is determined in step S113 that the instruction is not a record instruction through one channel or two, then it is determined that the instruction is a read or delete instruction (step S116). If it is a read instruction, then data is read through one channel (step S117), and control is returned to step S112.

If it is determined in step S116 that the instruction is a delete instruction, then it is determined whether or not the delete instruction indicates deleting data through one channel of the two (step S118). That is, it is determined whether or not the instruction indicates deleting the data through one channel when the data is simultaneously recorded through two channels (refer to FIG. 37(a))

If the instruction does not indicates deleting the data through one channel when the data is recorded through two channels, but indicates deleting the data through one channel when it is recorded through one channel, then the data recorded through one channel is deleted (step S119), and control is returned to step S112.

On the other hand, if it is determined in step S118 that a delete instruction indicates deleting data through one channel when the data is simultaneously stored through two channels, then the data recorded through one channel is deleted (step S120). In this case, inner or outer zones become empty.

Then, it is determined whether or not data is deleted in inner zones (step S121). If not, control is returned to step S112. If yes, the garbage collecting process is performed to move the data recorded in the outer zone from which data is not deleted in step S100 to the inner zone to prepare for the next simultaneous recording through two channels (step S122).

The garbage collecting process is performed in the method shown in FIG. 37(b). Thus, empty areas increase in outer zones. After the process in step S122, control is returned to step S112.

As described above, data can be quickly recorded through two channels using an inner zone having a lower transfer rate and an outer zone having a higher transfer rate as a pair.

Figure 39:
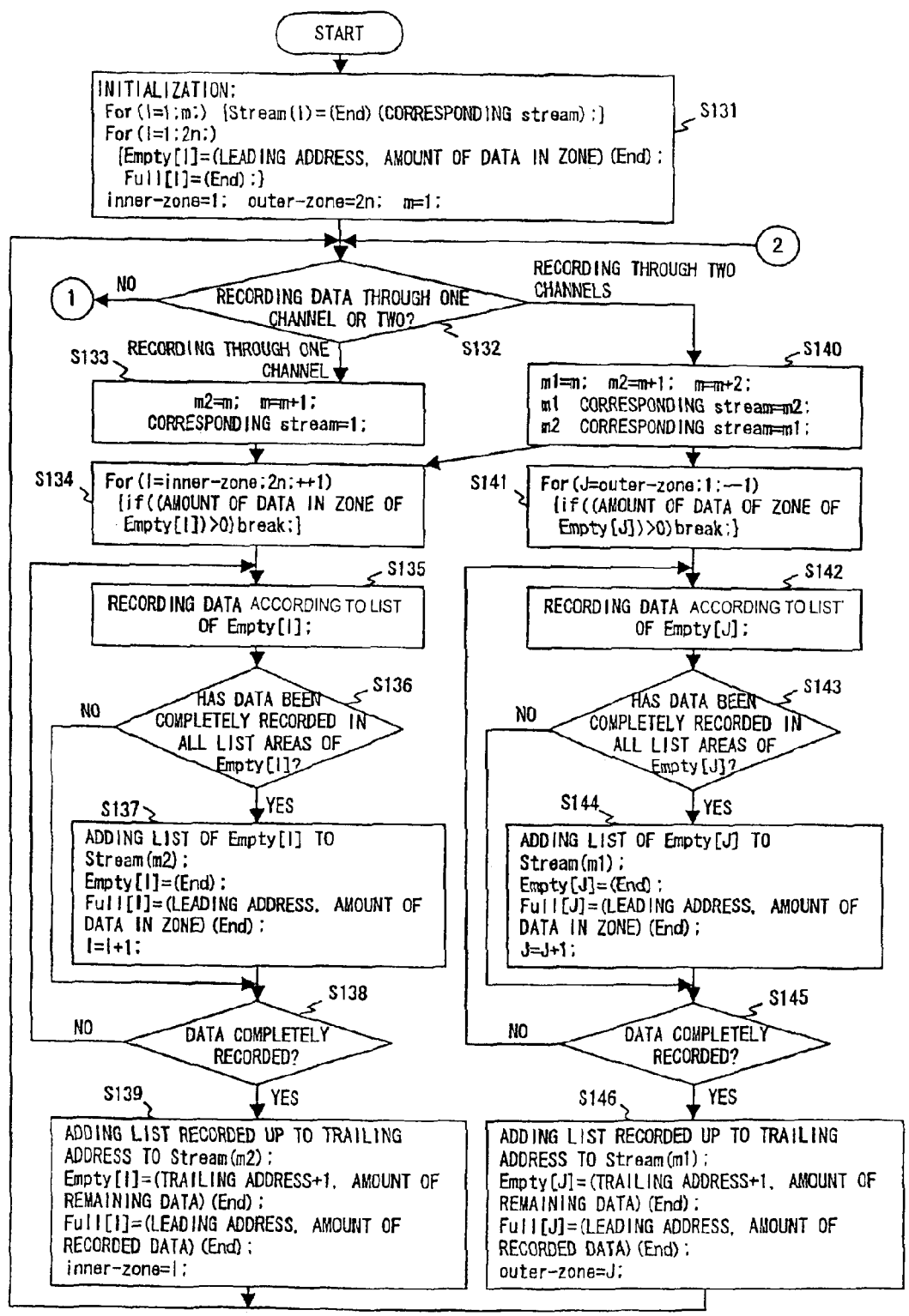
FIG. 39 is a flowchart (1) showing the algorithm of selecting an empty zone on a disk.

FIGS. 39 and 40 are detailed flowcharts for FIG. 38. Before explaining the flowcharts shown in FIGS. 39 and 40, the management table for use with the flowcharts is described first.

In the flowcharts, the information referred to as 'stream' is defined. The information links stream data for each channel for picture data of m channels. FIG. 41 shows an example of a configuration of a table 120 for management of the stream.

The table 120 comprises m streams (1) through (m). The stream (i) refers to the information about the stream data of i channel(s) (i=1, 2, . . . , m). Each stream (i) has a data structure in which a set of the leading address (Add) at which data is recorded and the amount of data (Data) recorded at serial addresses is linked in a list structure. To the end of the list, the information (END) indicating the end of the stream is added. In addition, the stream (i) has the information about 'corresponding stream' indicating whether or not data is to be recorded through two channels. If data is recorded through one channel, the value of the 'corresponding stream' is set to 0.

FIG. 42 shows an example of the configuration of a table 130 for management of an empty area of each zone on the disk 110. In this example, each of the inner and outer portions of the disk 110 are divided into n zones, and inner n zones (zones 1 through n) and outer n zones (zones n+1 through 2n) are individually managed. Each zone j (j=1 through 2n) contains information (Empty [j]) indicating an empty area in each zone and information (Full [j]) indicating a full area to which data has been recorded. The information Empty [j] and Full [j] is formed by a link list similar to the Stream (i). The address Add of the Empty [j] indicates the leading address of the empty area in the corresponding zone j. The address ADD of the Full [j] indicates the leading address of the corresponding zone j. The amount of data of the Empty refers to an available capacity, and the amount of data of the Full refers to the amount of recorded data. The initial value of the Empty [j] is (the leading address of the zone j, and the amount of data of the zone j)→End, and the initial value of the Full [j] is End (no recorded data).

FIG. 43 shows a table 140 for management of the zone configuration of the disk 110 shown in FIG. 36. The table 140 corresponds to the table where n=3. In each zone, the 'number of bytes per track', the 'number of tracks', the 'number of sectors', and a 'selector address' are managed. To the zones 1 through 6, 1 through 6 are respectively assigned as zone no. (zone numbers). Each of the zones 1 through 6 is assigned 1000 tracks. One sector contains 512 B (bytes). The zone 1 has sectors of 184 k (184,000). As shown in FIG. 43, the number of sectors increases for an outer zone. In the zone 6, there are sectors of 264 k (264,000). The sector addresses are serially assigned in order from the leading sector in the zone 1. FIG. 43 shows the leading and trailing sector addresses of each zone. The leading sector address of the zone 1 is 1, and the trailing sector address of the zone 6 is 1,344,000.

The process procedures of the flowcharts shown in FIGS. 39 and 40 are described below.

The addresses shown in the flowcharts are sector addresses.

First, the tables 120 and 130 are initialized to manage the empty zones on the disk 110 (step S131). In this initializing process, the following processes (1) through (3) are performed.

(1) Initializing the table 120

Since no picture data is recorded, END is registered in the Stream (1) through (m), and the corresponding stream is initialized to 0 (data is first recorded through one channel).

(2) Initializing the table 130

Inner zones (numbers 1 through n) and outer zones (numbers n+1 through 2n) are defined, and the Empty information and the Full information about these 2n zones are initialized. In the Empty, the leading address of the corresponding zone, and the amount of data in the corresponding zone are registered, and End is added finally. Only End is registered in the Full.

(3) The parameter inner-zone indicating the zone number of the first inner zone to which data is to be recorded is set to 1, and the parameter outer-zone indicating the zone number of the first outer zone to which data is to be recorded is set to 2n. The Stream number m is set to 1.

Then, it is determined whether the type of the instruction is recorded through one channel, two channels, or other number of channels (step S132). If it is recorded through one channel, then control is passed to step S133. If it is recorded through two channels, then control is passed to step S140. Otherwise, control is passed to step S147.

In step S133, since data is recorded through one channel, data is recorded in an inner zone by priority, the value of m is substituted for the variable m2 to which a Stream number for an inner zone is set, and the value of the Stream number is incremented by 1. Since the corresponding stream has not appeared yet, the corresponding stream is set to 1. In this process, the value of m2 is initially set to 1.

Then, on the table 130, the Empty list showing an empty area of each zone is retrieved from an inner zone. If Empty [I] (I=inner zone through 2n) whose amount of data is larger than 0 can be detected (step S134), then data is recorded through one channel in the zone I based on the contents of the list of the Empty [I] (step S135).

While recording data in step S135, it is determined whether or not data has been completely recorded in all areas listed in the Empty [I] (step S136). If yes, the list of the Empty [I] is added to the Stream (m2) of the table 120. Thus, the record area in the zone I of the stream data having the Stream number m2 is registered in the Stream (m2). Then, only End is input to the list of the Empty [I]. Thus, the information that there is no empty area in the zone I is registered in the Empty [1]. In the Full [I], a list of (the leading address of the zone I, the amount of data in the zone I)→End is registered to indicate that data has been recorded in all areas of the target zone I. Then, I is incremented by 1, and the target zone is transferred to an outer zone (step S137).

Then, it is determined whether or not data has been recorded through one channel (step S138). If yes, then control is passed to step S139. If the stream data having the Stream number of m2 has not been completely recorded, control is returned to step S135.

Thus, when data is recorded through one channel, the processes in steps S135 through S137 are repeated until all stream data having the Stream number of m2 has completely been recorded, and the remaining stream data is recorded one by one from an inner zone to an outer zone.

If it is determined in step S138 that all stream data having the Stream number of m2 has completely been recorded, the list of the addresses including the end address of the recorded data is added to the Stream (m2). Then, the list of (the end address+1, the amount of remaining data)→End is registered in the Empty [I], and the list of (the leading address of the zone I, the amount of recorded data)→End is registered in the Full [I] The inner zone which is the write starting point in the next inner zone is set to I (step S139), and control is returned to step S132.

If it is determined yes in step S138 after it is determined yes in step S136, only the process of setting the inner zone to I is performed in step S139. In this case, when it is determined yes in step S136, the stream data having the Stream number m2 has completely been recorded, and the process in step S135 is not performed again.

As described above, the address information about the recorded stream data having the Stream number of m2 and the amount of data are registered in the Stream (m2) on the table 120, and the lists of the Empty [] and the Full [] on the table 130 are updated.

In step S140, since data is recorded through two channels, the data is distributed and recorded in inner and outer zones. Therefore, the Stream number of m1 for an outer zone is set to m, and the Stream number of m2 for an inner Stream number is set to (m+1). In this embodiment, the Stream number of the channel data to be recorded in an outer zone is smaller by one than the Stream number of the other channel through which data has been recorded in the inner zone. Then, since data is recorded through two channels, the Stream number of m is incremented by 2. In addition, when data is recorded through two channels, corresponding streams exist both in inner zones and outer zones where data is recorded. Therefore, the corresponding stream for the Stream (m1) is set to m2, and the corresponding stream for the Stream (m2) is set to m1. Next, since the stream data of the Stream number m2 is recorded in an inner zone, control is passed to step S134. Similarly, since the stream data of the Stream number m1 is recorded in an outer zone, control is passed to step S141 (step S140).

Afterwards, the processes in and after step S134 and the processes in and after step S141 are performed in parallel.

In step S141, a zone J having an empty area is searched for zone by zone from outer zones to inner zones by referring to the Empty list of the table 130 (step S141) Then, based on the contents of the Empty [J] in the zone J detected in step S141, the stream data having the stream number of m1 is recorded in the zone J (step S142). During the recording process in step S142, it is determined at any time whether or not data has been completely recorded in the zone J (step S143). If yes, then control is passed to step S144. If not, control is passed to step S145.

In step S144, the list of Empty [J] is added to the Stream (m1). Then, the list of the Empty [J] is set to End (no data). It is determined that data has completely been recorded in all areas of the zone J, and the list of (the leading address of the zone J, the amount of data in the zone J)→End is registered in the Full [J]. Then, the J is decremented by 1, and the target zone is transferred to an inner zone.

Then, it is determined whether or not data has completely been recorded (step S145). If yes, control is passed to step S146. If not, control is returned to step S142.

Thus, when data cannot be completely recorded only in one zone, the processes in steps S142 through S145 are repeated until data having the Stream number of m1 can be completely recorded, and the stream data is recorded with the head transferred zone by zone from outer zones to inner zones.

If it is determined in step S145 that the stream data having the Stream number of m1 has completely been recorded, then the list of addresses up to the finally recorded address is registered in the Stream (m1). In addition, in the Empty [J], the list of (the final address+1, the amount of remaining data)→End is registered. In the Full [J], the list of (the leading address of the zone J, the amount of data up to the recorded address)→End is registered. Then, the writing start point to the next outer zone is set to J (step S146), and control is returned to step S132.

If it is determined yes in step S145 after it is determined yes in step S143, then only the process of setting the outer zone to J is performed in step S146, as in step S139. In this case, when it is determined yes in step 146, the stream data is completely recorded, and the process in step S143 is not performed again.

In parallel with the processes in the above mentioned steps S141 through S146, the processes in steps S134 through S139 are performed, and the stream data having the Stream number of m2 is recorded also in inner zones.

In step S147, it is determined whether an instruction refers to a read instruction or a delete instruction. If it refers to a read instruction, then the stream data having the Stream number of mx is read by referring to the list of the Stream (mx) on the table 120 (step S148), and then control is returned to step S132. If it refers to a delete instruction, then the list of the Stream (mx) is added to the Empty of each relevant zone according to the list of the Stream (mx) for management of the stream data of the specified Stream number mx, and the list of the Stream (mx) is deleted from the Full of each relevant zone (step S149). In this process, an area from which the stream data having the Stream number mx has been deleted is added to the corresponding Empty, and the information about the area from which the stream data having the Stream number mx has been deleted is deleted from the corresponding Full.

Then, it is checked whether or not there is a corresponding stream (=my) in the Stream (mx) specified to be deleted (step S150). If not (my=0), control is returned to step S132.

On the other hand, if it is determined that there is a corresponding stream, then it is determined whether or not my>mx (step S151). That is, it is determined whether or not the stream data having the Stream number my is to be moved from an outer zone to an inner zone. As described above, according to the present embodiment, the Stream number of the stream data to be recorded in an outer zone is set to a value smaller by 1 than the Stream number of the stream data recorded in an inner zone when data is to be recorded through two channels in the process in step S140.

Unless my>mx, control is returned to step S142. If my>mx, the list of the Stream (my) is referred to, and the stream data of the Stream number my is read from the disk 110, and the read data is written again to the disk 110 by referring to the list of the Stream (mx) (step S152). The re-writing process is performed by writing the stream data having the Stream number of my in the area registered in the Empty in step S149.

According to the list of the Stream (my), the list of the Stream (my) is added to the Empty of each relevant zone, and the list of the Stream (my) is deleted from the Full of each relevant zone (step S153).

This is the process of updating the Empty and the Full performed when the stream data having the Stream number of my is moved from the current recording area.

Then, the list of the Stream (my) is replaced with the list of the Stream (mx). Additionally, the list of the Stream (my) is deleted from the relevant Empty. Furthermore, the list of the Stream (mx) is added to the relevant Full. Then, the Stream (mx) is initialized (step S154). Then, control is returned to step S132.

When data is read through two channels in the flow of the processes in the flowcharts shown in FIGS. 39 and 40, the process of searching inner zones for an empty area and the process of searching outer zones for an empty area respectively correspond to steps S134 and S141. In the processes in these steps, the amount of the remaining data in each zone k (k=1 through 2n) is checked by retrieving the Empty [k], and a zone in which data is to be recorded is determined.

The processes of the flowcharts shown in FIGS. 39 and 40 are described below in detail by referring to the case in which the processes are performed on the disk 110 with the zone configuration shown in FIG. 43.

FIG. 44 shows an example in which the tables 120 and 130 shown in FIGS. 41 and 42 are installed in memory 150. The memory 150 comprises an initialized area 151 at addresses 0 through 17 and an extension area 152 at and after the address 18. The initialized area 151 stores the tables 120 and 130. The extension area 152 stores an additional list of the Stream (i) (i=1 through 5).

In FIG. 44, the stored data refers to the list to be stored at each address in the memory 150. The elements of the list comprises a set of information of three types (the leading storage address, the amount of data, the next storage address). The End is represented by (0, 0, 0)

(0, 0, 0) is stored at the address 0 of the memory 150. The table 120 is configured by each row of the Stream (1) through (5) at the addresses 1 through 5 of the memory 150. Furthermore, the table 130 is configured by each row of the Empty [1] through [6] and the Full [1] through [6] at the addresses 6 through 17 of the memory 150.

In the initializing process in step S131 in the flowchart shown in FIG. 39, the contents of the tables 120 and 130 are initialized into the state indicated by 1 shown in FIG. 44. That is, the End (0, 0, 0) is registered in the Stream (1) through (5) of the table 120. Additionally, (the leading address, the amount of data, the next storage address) of the zones 1 (Z1) through 6 (Z6) is set in the Empty [1] through [6] of the table 130. In this case, the next storage address is 0. Furthermore, (the leading address of the corresponding zone, the amount of data recorded in the corresponding zone, the next storage address) is set in the Full [1] through [6] of the table 130. In this case, the amount of recorded data is 0. The next storage address is also 0.

Figure 45:
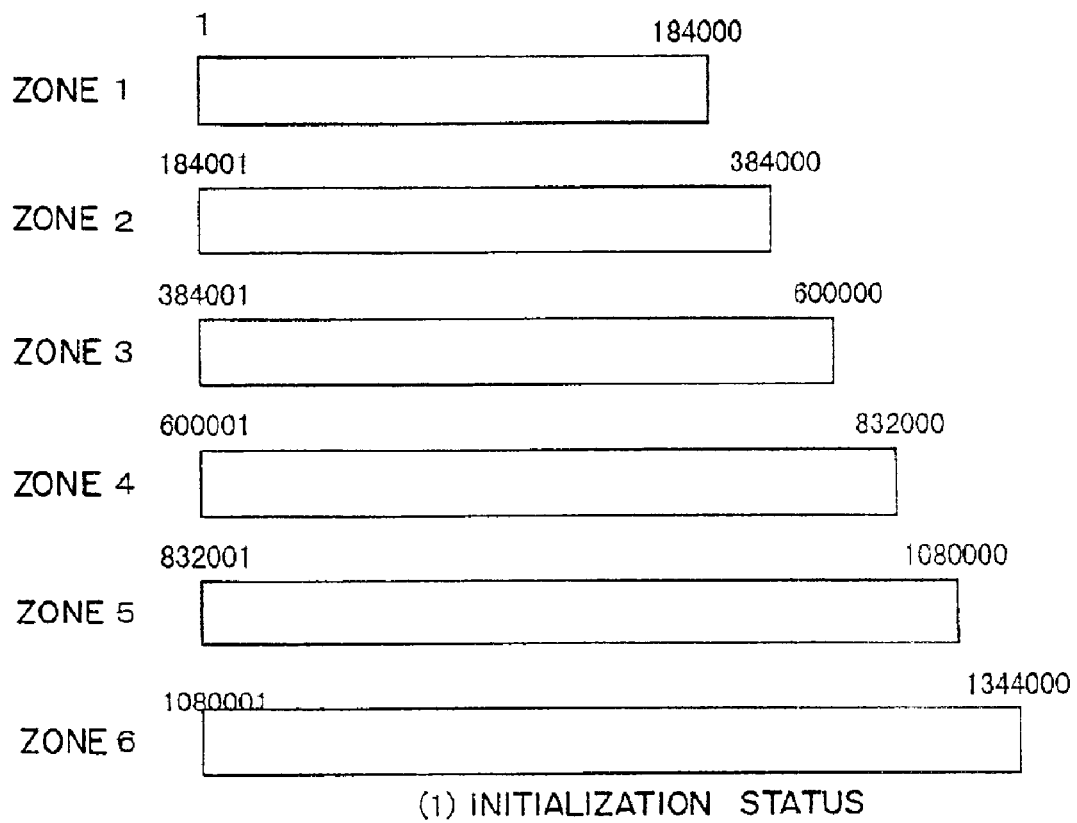
FIG. 45 shows the initial state of the disk having the zone configuration shown in FIG. 43.

FIG. 45 shows the Initial state of the disk having the zone configuration shown in FIG. 43.

Figure 46:
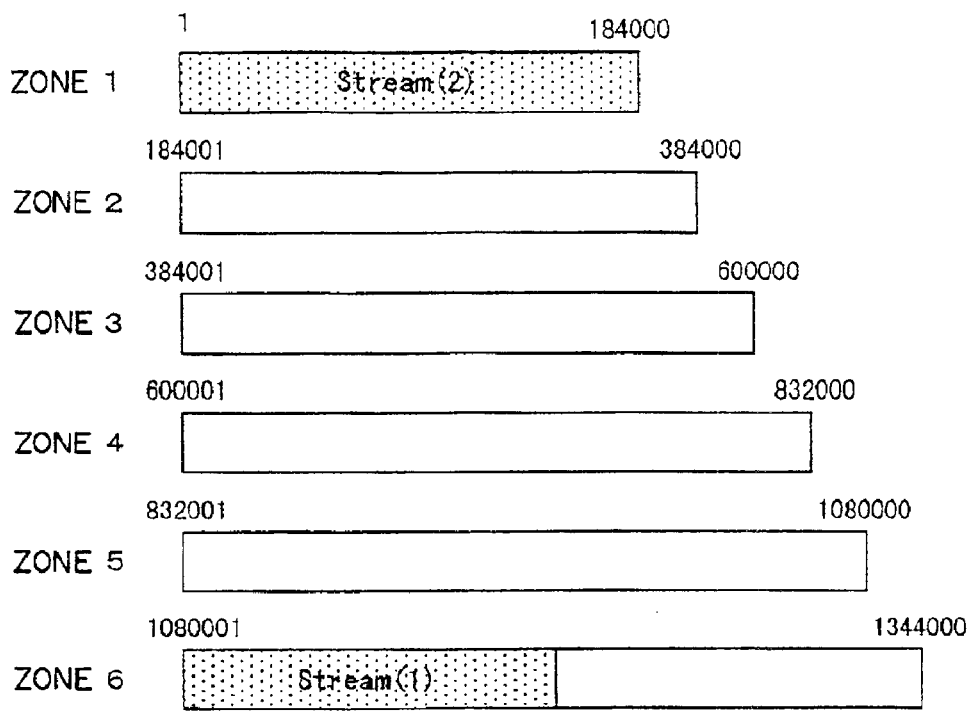
FIG. 46 shows the state transition (1) of the record of the stream data on a disk when the processes shown in the flowcharts of FIGS. 39 and 40 are performed on the disk having the zone configuration shown in FIG. 43.

Then, assume that data Stream (1) and Stream (2) is simultaneously recorded through two channels as shown in FIG. 46. The Stream (1) is recorded from the outer zone 6, and the Stream (2) is recorded from the inner zone 1. The Stream (1) refers to the stream data having the Stream number of 1, and the Stream (2) refers to the stream data having the Stream number of 2. This holds true with the following descriptions.

In FIG. 46, the stream data 2 and the stream data 1 are recorded alternately in the zones 1 and 6 and in the zones 6 and 1 respectively. First, the stream data 2 is recorded in the entire area of the zone 1 having a smaller storage capacity. At this time, the contents of the Stream (2), Empty [1], and Full [1] are indicated by ② shown in FIG. 44. As a result, the list of the Empty [1] is added to the Stream (2), and the address 18 of the extension area 152 is set as the next storage address. In addition, the End indicating that there is no empty areas is set in the Empty [1], and (1, 184000, 0) indicating that data has completely been recorded in the zone 1 is set in the Full [1].

Figure 47:
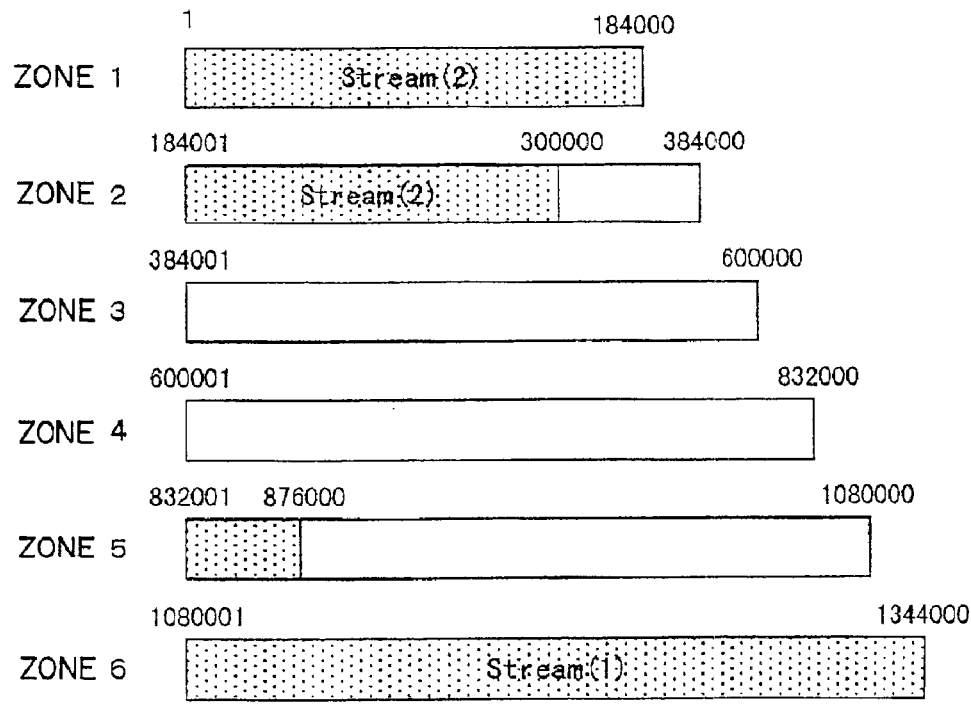
FIG. 47 shows the state transition (2) of the record of the stream data on a disk when the processes shown in the flowcharts of FIGS. 39 and 40 are performed on the disk having the zone configuration shown in FIG. 43.

Then, assume that, as shown in FIG. 47, after the stream data 1 has completely been recorded in the zone 6, it is recorded in the zone 5, and the stream data 2 is recorded in the zone 2, thereby terminating the recording process through two channels. As a result, the management information about the stream data 1 and 2 is indicated by ③ shown in FIG. 44.

That is:

The list of the Empty [6] is added to the Empty [6] is added to the Stream (1), and the address 19 of the extension area 152 is set as the next storage address.

The End (0, 0, 0) is set in the Empty [6], and the information that there is no empty area in the zone 6 is set in the Empty [6].

To register that the Stream (2) has been completely recorded, the list of (the leading address of the zone 2, the amount of data from the leading address to the trailing address at which data bas been recorded, the next storage address) is generated at the address 18 of the extension area 152.

That is, the list of (184001, 116000, 0) is generated at the address 18.

The lists of the Empty [2] and the Full [2] are amended based on the trailing address of the zone 2.

The Empty [2] is set to (300001, 184000, 0), and the Full [2] is set to (184001, 11600, 0).

To register that the Stream (1) has been completely recorded at the address 19 of the extension area 152, the list of (the leading address of the zone 5, the amount of data from the leading address to the trailing address at which data has been recorded, the next storage address (=0)) is generated.

That is, the list of (832001, 44000, 0) is generated at the address 19.

The lists of the Empty [5] and the Full [5] are amended based on the trailing address of the zone 6.

The Empty [5] is set to (876001, 204000, 0), and the Full [5] is set to (832001, 44000, 0).

Figure 48:
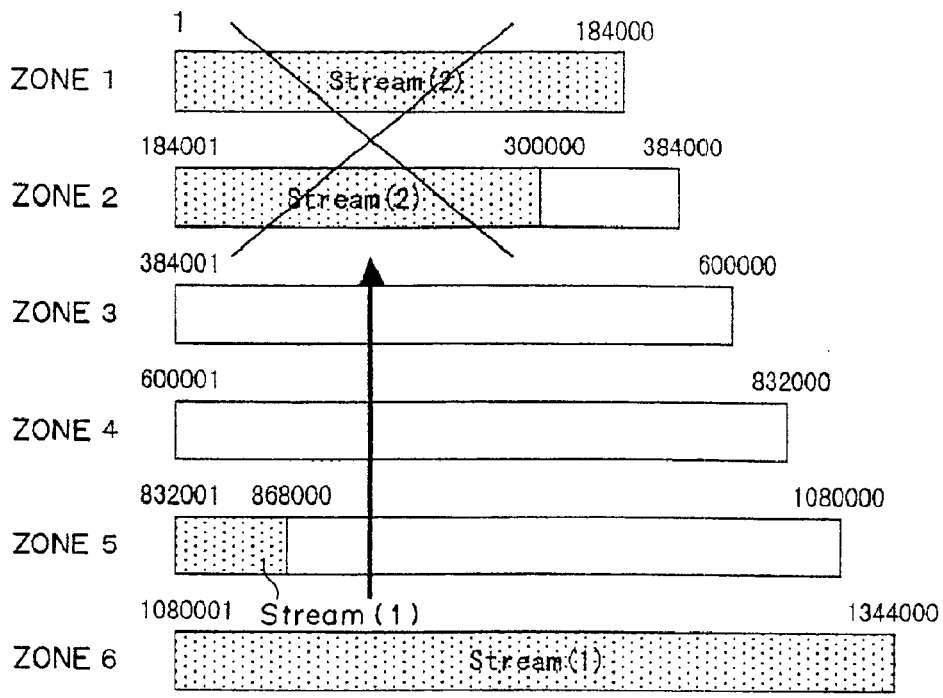
FIG. 48 shows the state transition (3) of the record of the stream data on a disk when the processes shown in the flowcharts of FIGS. 39 and 40 are performed on the disk having the zone configuration shown in FIG. 43.

Then, as shown in FIG. 48, assume that the Stream (2) has been deleted from the zones 1 and 2. As a result, the data management information is changed as indicated by ④ shown in FIG. 44.

That is:

The Empty [1] is set as an entirely empty area again, and the Full [1] is set as a no empty area.

The Empty [1] is set to (1, 184000, 0), and the Full [1] is set to (1, 0, 0).

The Empty [2] is set as an empty area, and the Full [1] is set as a no empty area.

The Empty [2] is set to (184001, 2000001, 0), and the Full [2] is set to (184001, 0, 0).

Figure 49:
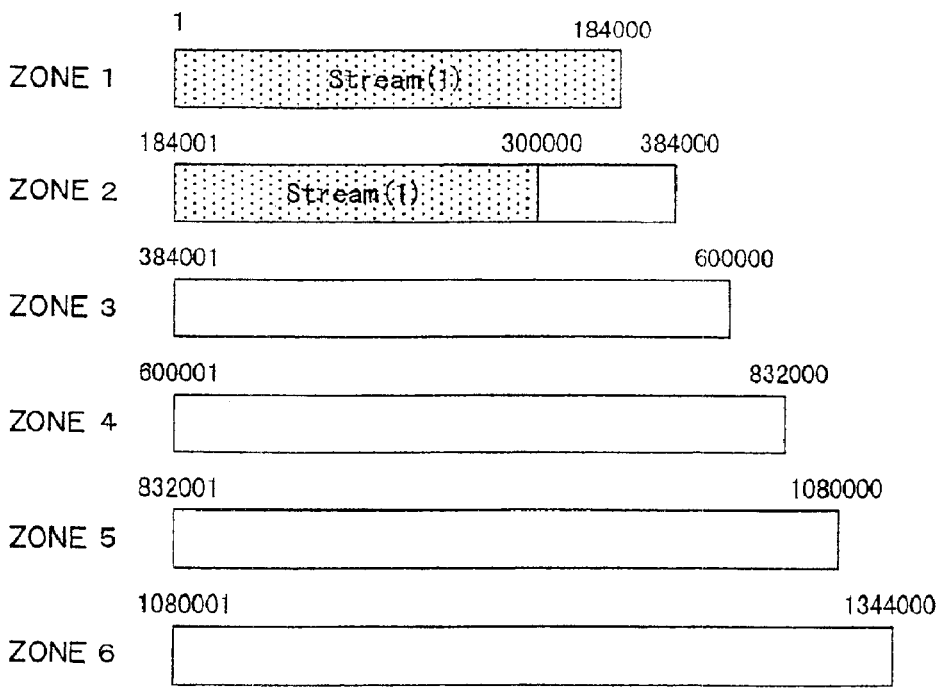
FIG. 49 shows the state transition (4) of the record of the stream data on a disk when the processes shown in the flowcharts of FIGS. 39 and 40 are performed on the disk having the zone configuration shown in FIG. 43.

Then, as shown in FIG. 49, assume that the garbage collecting process is performed to move the Stream (1) to the area in which the Stream (2) has been stored. As a result, the stream data management information is changed as indicated by ⑤ shown in FIG. 44.

That is:

After initializing the Stream (1), the list of the Empty [1] is added, and the next storage address is set at the address 20 of the extension area 152.

The Stream (1) is set to (1, 184000, 20).

The empty area of the Empty [1] is set as a no empty area, and the Full [1] is set as full of recorded data.

The Empty [1] is set to (0, 0, 0), and the Full [1] is set to (1, 184000, 0).

To register that the Stream (1) has been completely recorded at the address 20 of the extension area 152, the list of (the leading address of the zone 2, the amount of data from the leading address to the trailing address at which data has been recorded, the next storage address (=0)) is generated at the address 20 .

The list of (184001, 116000, 0) is generated at the address 20.

Based on the trailing address of the zone 2, the lists of the Empty [2] and the Full [2] are amended.

The Empty [2] is set to (300001, 84000, 0), and the Full [2] is set to (184001, 11600, 0).

The Empty [6] is set as an entirely empty area, and the Full [6] is set as a no empty area.

The Empty [6] is set to (1080001, 256000, 0), and the Full [6] is set to (108000 1, 0, 0).

The Empty [5] is set as an entirely empty area, and the Full [5] is set as a no empty area.

The Empty [5] is set to (832001, 248000, 0), and the Full [5] is set to (832001, 0, 0).

Figure 50:
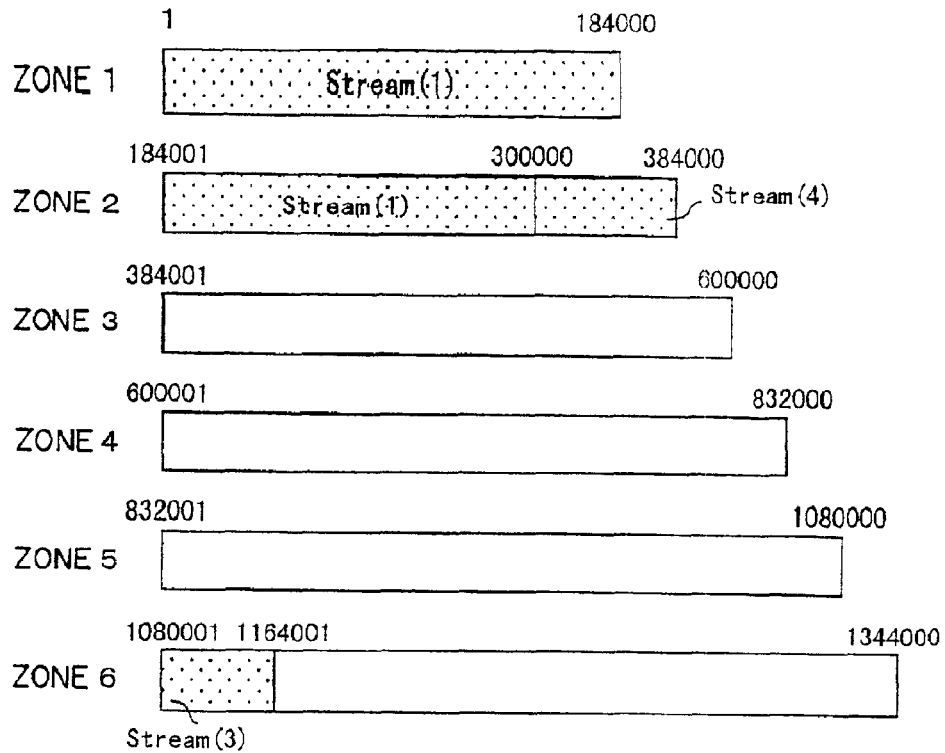
FIG. 50 shows the state transition (5) of the record of the stream data on a disk when the processes shown in the flowcharts of FIGS. 39 and 40 are performed on the disk having the zone configuration shown in FIG. 43.

Then, as shown in FIG. 50, the Stream (3) and the Stream (4) are simultaneously recorded through two channels. At this time, the Stream (3) is recorded from the outer zone 6, and the Stream (4) is recorded from the inner zone 2. FIG. 50 shows the state in which data has been recorded in the entire area of the zone 2. As a result, the data management information is indicated by ⑥ shown in FIG. 44.

That is:

The list of the Empty [2] is added to the Stream (4), and the next storage address is set at the address 21 of the extension area 152.

The Stream (4) is set to (300001, 84000, 21).

The Empty [2] is set as a no empty area, and the Full [2] is set as a completely full area.

The Empty [2] is set to (0, 0, 0), and the Full [6] is set to (832001, 84001, 0).

Figure 51:
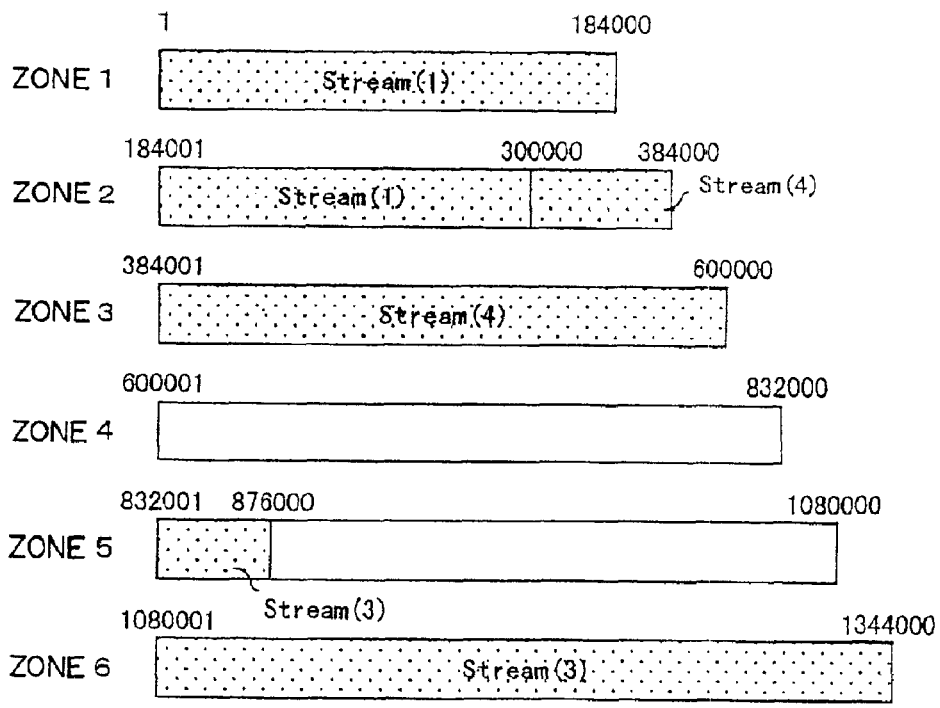
FIG. 51 shows the state transition (6) of the record of the stream data on a disk when the processes shown in the flowcharts of FIGS. 39 and 40 are performed on the disk having the zone configuration shown in FIG. 43.

Then, as shown in FIG. 51, assume that after the Stream (3) has been recorded in the entire zone 6, the remaining data of the Stream (3) is recorded in the zone 5, and the remaining data of the Stream (4) is recorded in the zone 2, thereby completely recording data. As a result, the data management information is indicated by ⑦ shown in FIG. 4.

That is:

The list of the Empty [6] is added to the Stream (3), and the next storage address is set at the address 22 of the extension area 152.

The Empty [6] is set as a no empty area, and the Full [6] is set as a completely full area.

The Empty [6] is set to (0, 0, 0), and the Full [6] is set to (1090001, 256000, 8).

To register that the Stream (4) has been completely recorded at the address 21 of the extension area 152, the list of (the leading address of the zone 3, the amount of data from the leading address to the trailing address at which data has been recorded, the next storage address (=0) is generated at the address 21.

(384001, 216000, 0) is set at the address 21.

Based on the trailing address of the zone 3, the lists of the Empty [3] and the Full [3] are amended. In this case, the Empty [3] is a no empty area, and the Full [3] is a completely full area.

The Empty [3] is set to (0, 0, 0), and the Full [3] is set to (384001, 216000, 0). To register that the Stream (3) has completely been recorded at the address 22 of the extension area 152, the list of (the leading address of the zone 5, the amount of data from the leading address to the trailing address at which data has been recorded, the next storage address (=0)) is generated at the address 22.

(832001, 44000, 0) is set at the address 22.

Based on the trailing address of the zone 4, the lists of the Empty [5] and the Full [5] are amended.

The Empty [5] is set to (876001, 204000, 0), and the Full [5] is set to (832001, 44000, 0).

Thus, according to the present embodiment, an empty area and a recorded area of each zone on the disk are managed according to each of the Stream, Empty, and Full tables, an area in which each Stream is recorded on the disk is managed, and the recording, deleting, and garbage-collecting processes on the stream data through each channel are managed.

Described below is another method of absorbing the difference in transfer rate between an inner zone and an outer zone by selecting the combination of a plurality of zones such that the average transfer function of zones (total storage function) can at least exceed the total request function of simultaneously recording plural pieces of data (total request function), and the plural pieces of data can be distributed and recorded in the selected zones.

Figure 52:
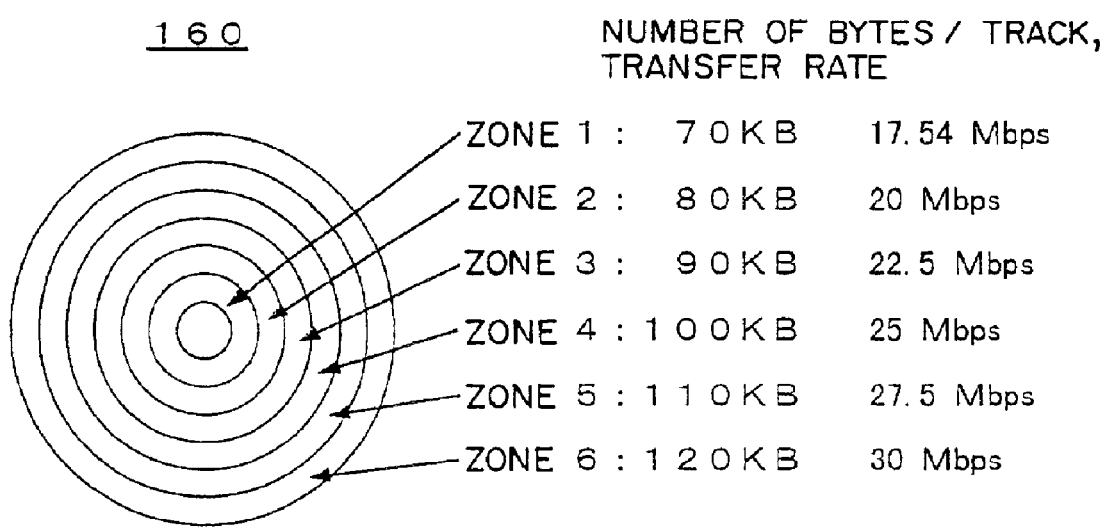
FIG. 52 shows the number of bytes, track, and transfer rate of the disk, divided into six zones, in the revolution control system of the ZCAV system.

The embodiment is explained below using a disk 160 having the zones 1 through 6 shown in FIG. 52 as an example. The number of bytes of a track of the zone 1 of the disk 160 is 70 KB, and the transfer rate (transfer speed) is 17.5 Mbps. The track configurations and the transfer rates of other zones are shown in FIG. 52.

Assume that the following record requests in steps 1 (total request function 1) through 3 (total request function 3) have been issued.

Step 1: MPEG 2 (6 Mbps)×3 channels 18 Mbps
Step 2: MPEG 2 (6 Mbps)×3 channels 12 Mbps
Step 3: MPEG 2 (6 Mbps)×3 channels 24 Mbps Described below first is the first embodiment. In this embodiment, the total storage function is obtained without the access time including the moving time (seek time) between zones, and the number of channels for the processes taken into account, the obtained function is compared with the above mentioned total request function, and a zone for use in attaining the function is selected.

As a result, the recording method in the steps 1 through 3 is determined as follows.

Step 1: The total storage function of the zones 1 and 2 is 18.75 Mbps, and is higher than the total request function of step 1. Therefore, data is distributed and recorded in the zones 1 and 2.

Step 2: The transfer rate (=17.5 Mbps) of the zone 1 is higher than the total request function in step 2. Therefore, the data is recorded in the zone 1.

Step 3: Since the total storage function of the zones 2 and 6 is 25 Mbps, and is higher than the total request function in step 3, the data is distributed and recorded in the zones 2 and 6.

FIGS. 53(*a*), 53(*b*) and 53(*c*) practically show the recording method in steps 1 through 3 according to the first embodiment.

In the process in step 1, as shown in FIG. 53(*a*), the block data is sequentially recorded first in the zone 1 through Ch1, Ch2, and Ch3, then the next block data is sequentially recorded in the zone 2 through Ch1, Ch2, and Ch3. Then, back in the zone 1, the next block data is sequentially recorded through Ch1, Ch2, and Ch3. Thus, the block data is distributed and recorded through the three channels alternately in the zones 1 and 2.

In the process in step 2, as shown in FIG. 53(*b*), the block data is recorded in the zone 1 in the order of Ch1, Ch2, Ch1, Ch2 . . .

In the process in step 3, as shown in FIG. 53(*c*), and as in step S1, the block data through four channels (Ch1, Ch2, Ch3, and Ch4) is sequentially distributed and recorded alternately in the zones 2 and 6.

According to the second embodiment described below, the total storage function is obtained with the access time including the moving time (seek time) between zones taken into account, the obtained function is compared with the total request function in each step, and a zone for realizing the function is selected. In this case, Access time=100 ms×distance between zones
Distance between zones=difference between numbers of two selected zones Assuming that the access time of 100 m (50 ms for one way) is required to move to an adjacent zone. The longer the distance between the zones, the longer the access time proportional to the moving distance of the head.

As a result, the recording method in each step is determined as follows.

Step 1: In response to the total request function of 18 Mbps (recording through three channels), the zones 2 and 3 whose total storage functions (=(20+22.5)×0.9/2) exceed the total request function including the access time (100 ms) are selected to record the block data through Ch1 through Ch3 alternately in the zones 2 and 3.

Step 2: In response to the total request function of 12 Mbps (recording through two channels), only the transfer rate (=17.5 ms) of the zone 1 can be used in recording data. Therefore, the block data is recorded only in the zone 1 through Ch1 and Ch2. In this case, the access time is 0.

Step 3: In response to the total request function of 24 Mbps (recording through four channels), the zones 5 and 6 whose total storage functions (=(27.5+30)×0.9/2) exceed the total request function including the access time (100 ms) are selected to record the block data through Ch1 through Ch4 alternately in the zones 5 and 6.

FIGS. 54(*a*), 54(*b*) and 54(*c*) show the practical recording method in steps 1 through 3 according to the above mentioned second embodiment.

In the process in step 1, as shown in 54(*a*), the block data is sequentially recorded first in the zone 2 through Ch1, Ch2, and Ch3, then the process is moved to the zone 3 at 50 ms, and the next block data is sequentially recorded in the zone 2 through Ch1, Ch2, and Ch3. Then, the process is moved to the zone 2 again at 50 ms, and the next block data is sequentially recorded through the Ch1, Ch2, and Ch3. Thus, the block data through three channels is distributed and recorded alternately in the zones 2 and 3.

In the process in step 2, as shown in FIG. 54(*b*), the block data is recorded in the zone 1 in order of Ch1, Ch2, Ch1, Ch2 . . .

In the process in step 3, as shown in FIG. 54(*c*), and as in step S1, the block data through four channels (Ch1, Ch2, Ch3, and Ch4) is moved at 50 ms between the zones 5 and 6, and is sequentially distributed and recorded alternately in the zones 5 and 6.

In the third embodiment described below, the total storage function is obtained with the moving time (seek time) between zones and the number of channels to be processed taken into account, the obtained function is compared with the total request function in each step, and a zone realizing the function is selected. In this embodiment, it is assumed that the data through each channel is distributed and recorded for convenience in individually reading or deleting the data.

As a result, as described below, the recording method in steps 1 through 3 is determined.

Step 1: In response to the total request function of 18 Mbps (recording through three channels), the zones 2 and 3 whose total storage functions (=(20+22.5)×0.9/2) exceed the total request function including the access time (100 ms) are selected to record the block data through Ch1 through Ch3 alternately in the zones 2 and 3. In this example, three channels are used, and the data through Ch1 and Ch2 is recorded in the zone 2, and data through Ch3 is recorded in the zone 3.

Step 2: In response to the total request function of 12 Mbps (recording through two channels), only the transfer rate (=17.5 ms) of the zone 1 can be used in recording data. However, it is desired to distribute and record data. Therefore, the data through Ch1 is recorded in the zone 1, and the data through Ch 2 is recorded in the zone 2.

Step 3: In response to the total request function of 24 Mbps (recording through four channels), the zones 5 and 6 whose total storage functions (=(27.5×2/4+30×2/4)×0.9/2) exceed the total request function including the access time (100 ms) are selected to record the block data through Ch1 through Ch4 alternately in the zones 5 and 6. In this case, data is recorded through four channels, the data through Ch1 and Ch2 is recorded in the zone 5, and the data through Ch3 and Ch4 is recorded in the zone 6.

FIGS. 55(*a*), 55(*b*) and 55(*c*) show the practical recording method in steps 1 through 3 according to the above mentioned third embodiment.

In the process in step 1, as shown in FIG. 55(*a*), the block data is sequentially recorded first in the zone 2 through Ch 1 and Ch2. then the process is moved to the zone 3 at 50 ms, and the block data is sequentially recorded in the zone 2 through Ch3. Then, the process is moved to the zone 2 again at 50 ms, and the next block data is sequentially recorded through the Ch1 and Ch2. Then, the process is moved to the zone 3 at 50 ms, and the next block data is sequentially recorded in the zone 3 through Ch3. Thus, by repeating the above mentioned processes, the block data through three channels is distributed and recorded alternately in the zones 2 and 3.

In the process in step 2, as shown in FIG. 55(*b*), the block data is recorded through the Ch1 and Ch2 alternately in the zones 1 and 2.

In step 3, as shown in FIG. 55(*c*), the block data through two channels (Ch1 and Ch2) and the block data through another two channels (Ch3 and Ch4) are moved at 50 ms between the zones 5 and 6, and are sequentially distributed and recorded alternately in the zones 5 and 6.

The above mentioned access time is considered to be proportional to the distance between tracks along which the head is moving. However, since the movement of the head is accelerated or decelerated respectively at the start and the end of the movement. Therefore, strictly speaking, a non-linear factor is applied to the access time. In the above mentioned embodiment, since the head moves among the zones, it moves among several thousands of tracks, and the access time is proportional to the distance between tracks. Then, assuming that the moving time between adjacent zones is 100 ms (50 ms for one way), and that 10% of the transfer speed is wasted, the overhead is multiplied by the distance between the zones (difference in zone number) to compute the reduction of the transfer speed due to the access time.

Therefore, if two-way access time between adjacent zones is represented in ms unit, the total storage function for execution can be computed by the following equation (1).

$$\text{Total storage function} = \{(\text{transfer speed of one zone}) + (\text{transfer speed of the other zone})\}/2 \times \{100\% - \{(\text{distance between zones}) \times (\text{two-way access time between adjacent zones})/10\}\%\} \quad (1)$$

In the third embodiment, when the number of channels used in the processes is odd as in step 1, the first term in the above mentioned equation (1) is a little changed depending on which of the two zones stores data through a larger number of channels.

Then, the algorithm for realizing the first embodiment as shown in FIGS. 53(*a*), 53(*b*) and 53(*c*) is described by referring to the flowcharts shown in FIGS. 56 through 59. In the flowcharts, as in the above mentioned embodiment, the lists of Stream, Empty, and Full are used.

First, the Stream (1) through (m) are initialized. According to the present embodiment, it is assumed that the garbage collecting process is not performed, and the corresponding stream is 0. The request speed Channel-rate (1) through (m) of the channels used to obtain the total request function is set to the request function (6 Kbps in this case). Furthermore, the Empty [1] through [2*n*] and the Full [1] through [2*n*] are initialized. Then, the transfer speeds of the zones 1 through 2*n* are respectively set to Zone-rate [1] through [2*n*]. The variable inz indicating one zone in which data is being recorded is set to 1, and the variable ouz indicating the other zone is set to 2n. The process of setting 2n corresponding to the variable ouz is the process of setting the number of inner and outer zones to an odd number.

Furthermore, the variable tc indicating the total request function is set to 0. Additionally, the flag cont indicating whether or not there is a function (of recording data) corresponding to the request function is set to 0 (step S161).

Figure 58:
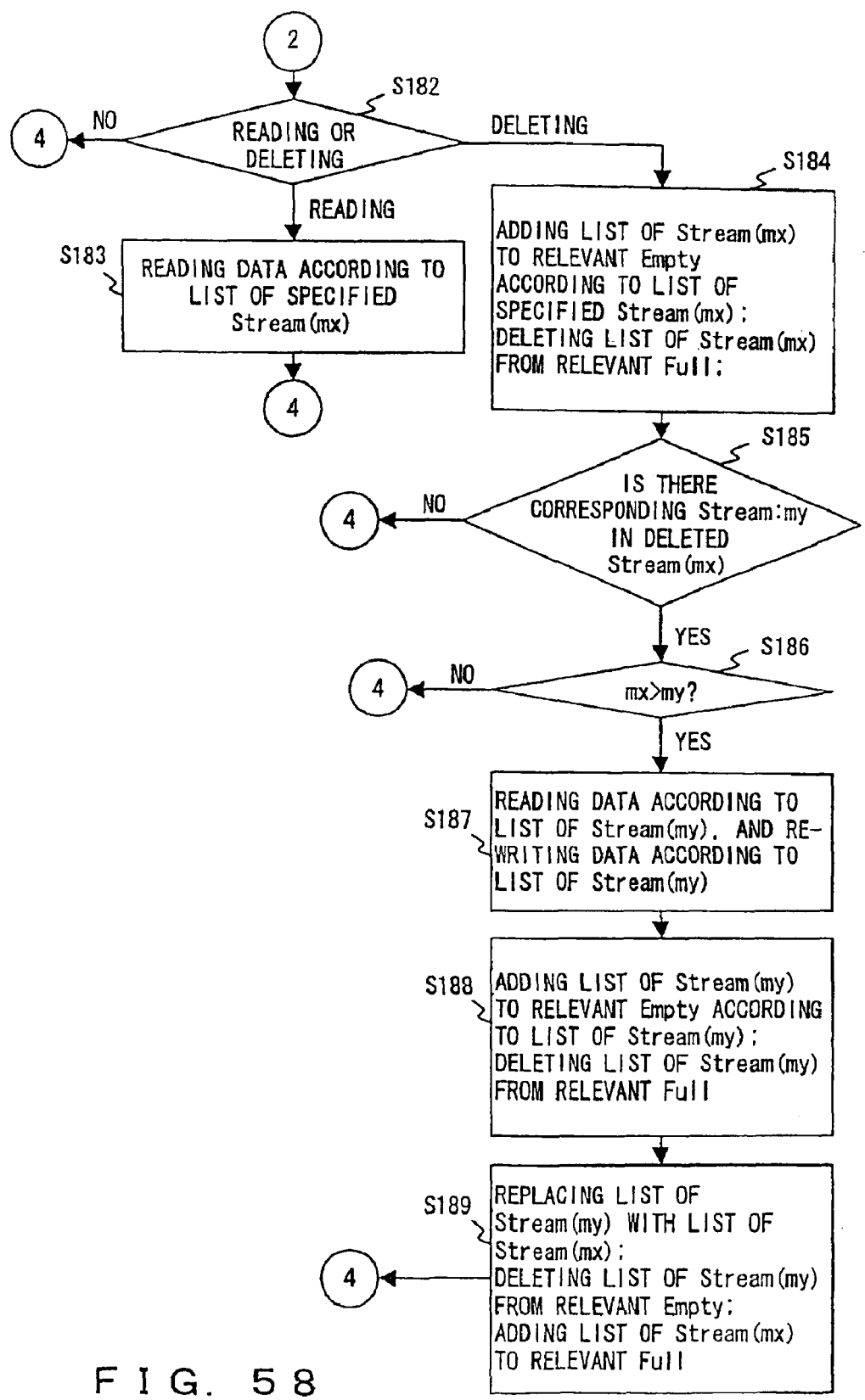
FIG. 58 is a flowchart (3) of the algorithm of simultaneously recording data through a plurality of channels by selecting a plurality of zones such that the general storage performance can be higher than the general request performance.

After the above mentioned initializing process, the type of an instruction is determined (step S162). If data is not to be recorded through one channel or two, then control is passed to step S182 shown in FIG. 58. The processes in steps S182 through S189 according to the flowchart shown in FIG. 58 are similar to the processes of selecting empty zones in steps S147 through S154 shown in FIG. 40. The detailed explanation is omitted here.

Figure 59:
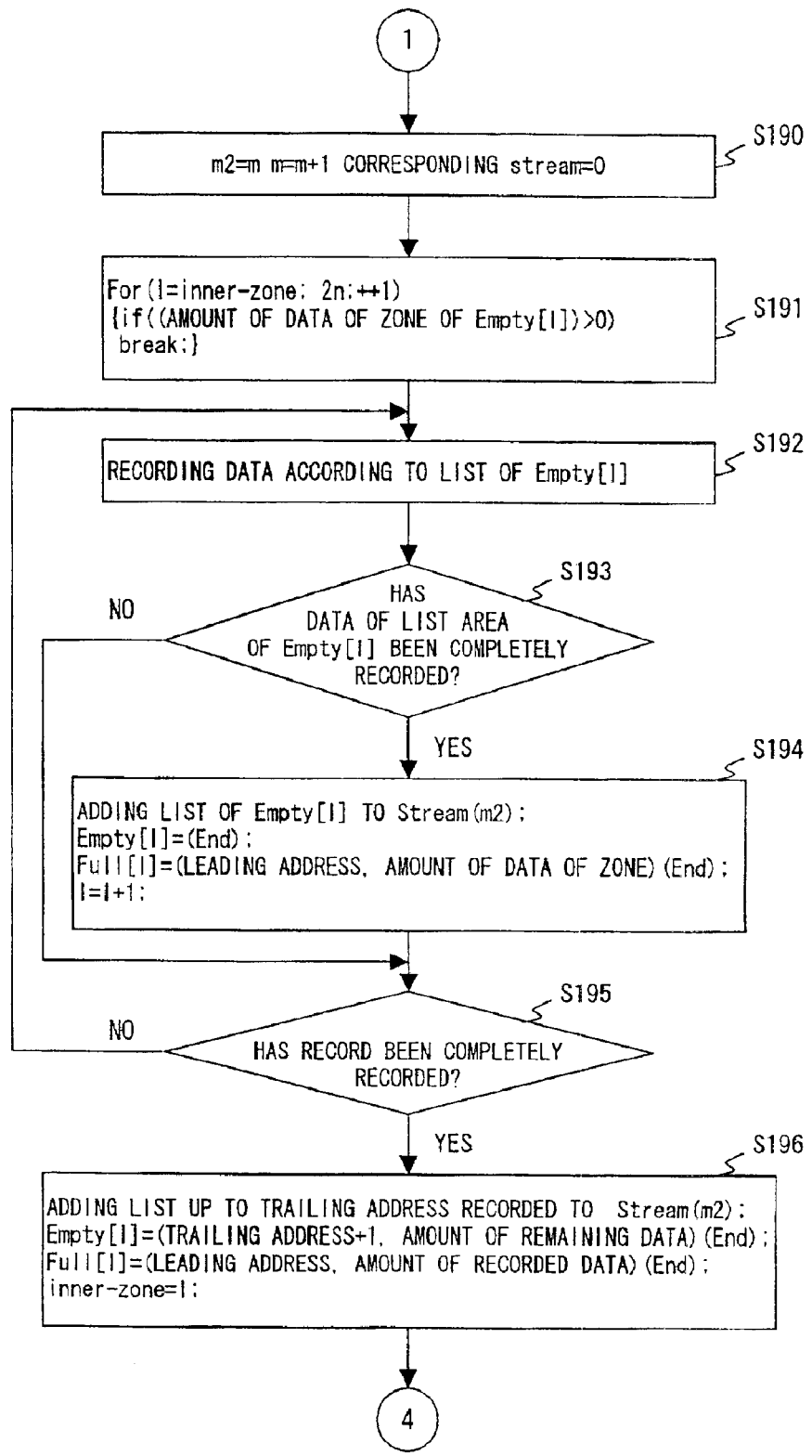
FIG. 59 is a flowchart (4) of the algorithm of simultaneously recording data through a plurality of channels by selecting a plurality of zones such that the general storage performance can be higher than the general request performance.

If it is determined in step S162 that the instruction refers to recording data through one channel, then control is passed to step S190 in the flowchart shown in FIG. 59. The processes in steps S190 through S196 in the flowchart shown in FIG. 59 are similar to the processes in steps S133 through S139 shown in FIG. 39. Therefore, the explanation is omitted here.

If it is determined in step S162 that the instruction refers to recording data through k channels (k>1), then the process of selecting two zones having the total storage function corresponding to the total request function for recording data through k channels is performed (step S163).

In this selecting process, the following processes (1) and (2) are performed.

(1) The total storage function tc for recording data through k channels is obtained.

(2) The total storage function tz is obtained from inner zones toward outer zones, and two corresponding zones satisfying the condition of tz>tc are retrieved. If the zones can be retrieved cont is set to 1.

Then, it is determined whether or not cont is 1 (step S164). If cont=0, then it is determined that data cannot be recorded, thereby stopping the process. If cont=1, then the two zones I and J obtained in step S163 are defined as selected inner zones inz and selected outer zones ouz respectively. The first channel to record data through is set to 1 (step S165).

Then the Empty list is searched for an empty area in each zone in the inner zones inz (step S166). Then, according to the list of Empty [I] of the zone I detected in step S166, one block of data is recorded through the channel indicated by channel in the zone I. Then, the list of one block of data up to the trailing address at which data has been recorded is registered in the Stream (channel). Furthermore, the list of (trailing address+1, the amount of remaining data) (End) is registered in the Empty [I], and the list of (leading address of the zone I, the amount of recorded data ) (End) is registered in the Full [I]. Then, the value of channel is incremented by 1 (step S167).

Then, it is determined whether or not channel>k (step S168). If not, control is returned to step S167. The determination in step S168 is to determine whether or not one block of data has been completely recorded through k channels. The process in step S167 is repeated until it is determined that channel>k in step S168.

If it is determined that the data has been completely recorded through k channels in step S168, then channel is initialized to 1 (step S169), and it is further determined whether or not all areas of the list of the Empty [I] (step S170). If data has not completely been recorded, control is passed to step S172. If the data has completely been recorded, the list of the Empty [I] is set to End (the amount of data is zero). Assuming that all areas of the target zone is full, the list of the Full [I] is set to (the leading address of the zone I, the amount of data of the zone I) (END). Then, I is incremented by 1 (step S171).

Then, it is determined whether or not data has completely been recorded (step S172). If yes, the inner zone which is the starting point of recording data to the next inner zone is set to I (step S173), and control is returned to step S162. If the data has not been completely recorded, then the Empty list is searched from outer zones ouz for the zone J having an empty area (step S174).

Then, according to the list of the Empty [J], one block of data is recorded in the zone J through the channel indicated by channel. Then, the list of one block of data up to the trailing address at which data has been recorded is added to the Stream (J). Then, the list of (the trailing address+1, the amount of remaining data) (End) is registered in the Empty [J], and the list of (the leading address of the zone J, the amount of recorded data) (End) is registered in the Full [J]. Then, the value of channel is incremented by 1 (step S175).

Then, it is determined whether or not channel>k (step S176). The determination is the process of determining whether or not one block of data has been completely recorded through k channels as in step S168. The process in step S176 is repeated until it is determined in step S176 that channel>k.

If it is determined in step S176 that data has completely been recorded through k channels, channel is initialized to 1 (step S177). Then, it is determined whether or not data has been recorded in all list areas of the Empty [J] (step S178). If the data has not been completely recorded, then control is passed to step S180. On the other hand, if the data has completely been recorded, the list of the Empty [J] is set to End (the amount of data is zero). Assuming that all areas of the target zone is full, the list of the Full [J] is set to (the leading address of the zone J, the amount of data of the zone J) (End). Then, J is incremented by 1 (step S179).

Next, it is determined whether or not data has completely been recorded (step S180). If yes, the outer zone which is the starting point of recording data to the next outer zone is set to J (step S181), and control is returned to step S162. If the data has not been completely recorded, then control is returned to step S166 (passed again to the other zone).

In the flowcharts shown in FIGS. 56 through 59, the block data are collected in the selected two zones through k channels, and alternately recorded in the zones. The process of selecting two zones having the total storage function exceeding the total request function indicated by the flowcharts is disclosed in step S163. The process in step S163 corresponds to the process according to the first embodiment. Relating to the process according to the second embodiment, the total storage function tz is obtained by the equation (1) above. Relating to the process according to the third embodiment, the processes in steps S166 through S173 and the processes in steps S174 through S181 can be appropriately selected.

Then, in the disk access control system for simultaneously recording data through a plurality of channels on the disk whose revolution is controlled based on the ZCLV, using a zone having a larger capacity per zone (mainly outer zones) by priority, data is collected in the zone through the plurality of channels, and alternately recorded as described below.

Figure 60:
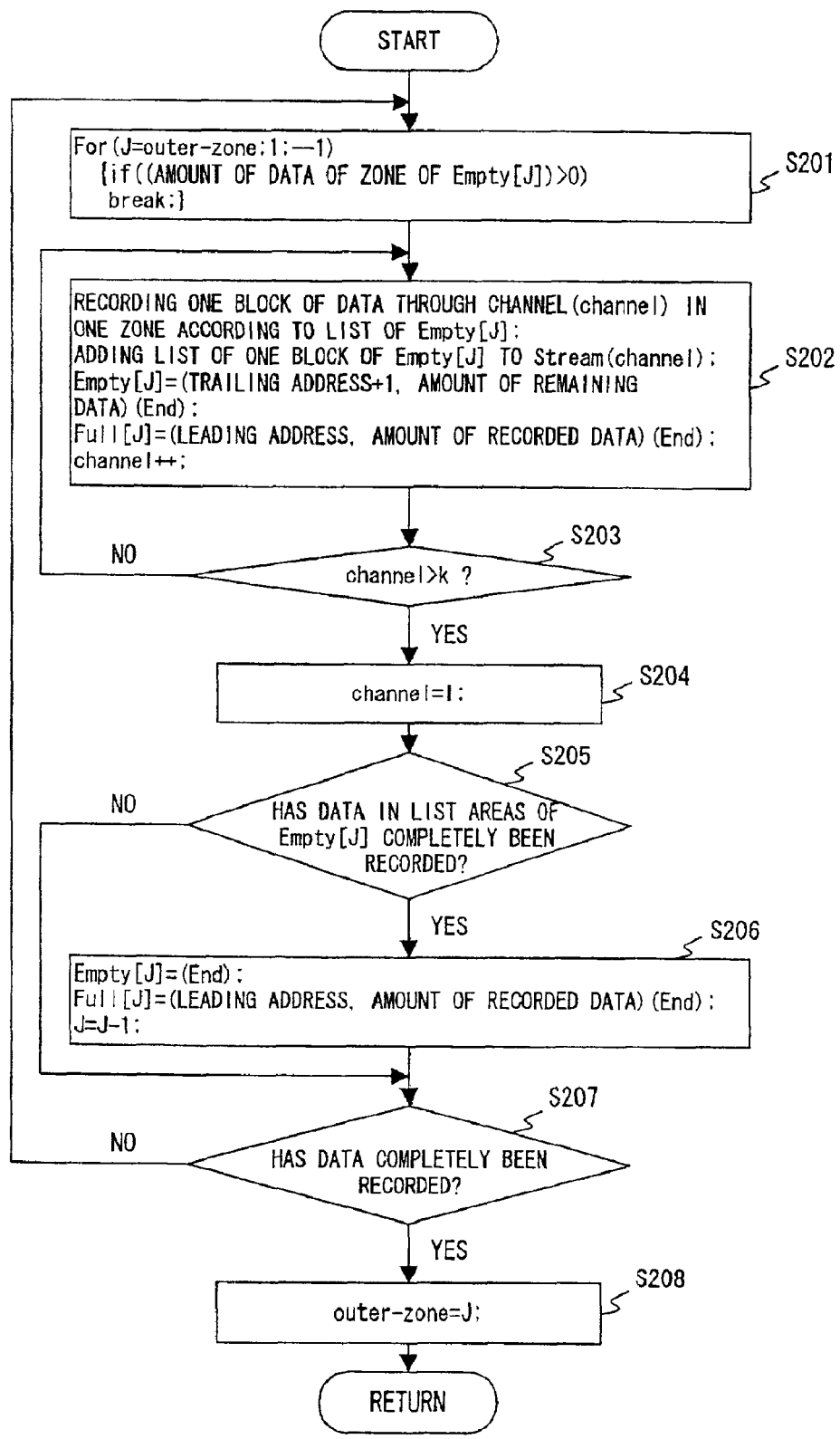
FIG. 60 is a flowchart of the algorithm of simultaneously recording data of a plurality of channels on the disk of the revolution control system of the ZCLV.

FIG. 60 is a flowchart showing the algorithm of the embodiment.

Figure 56:
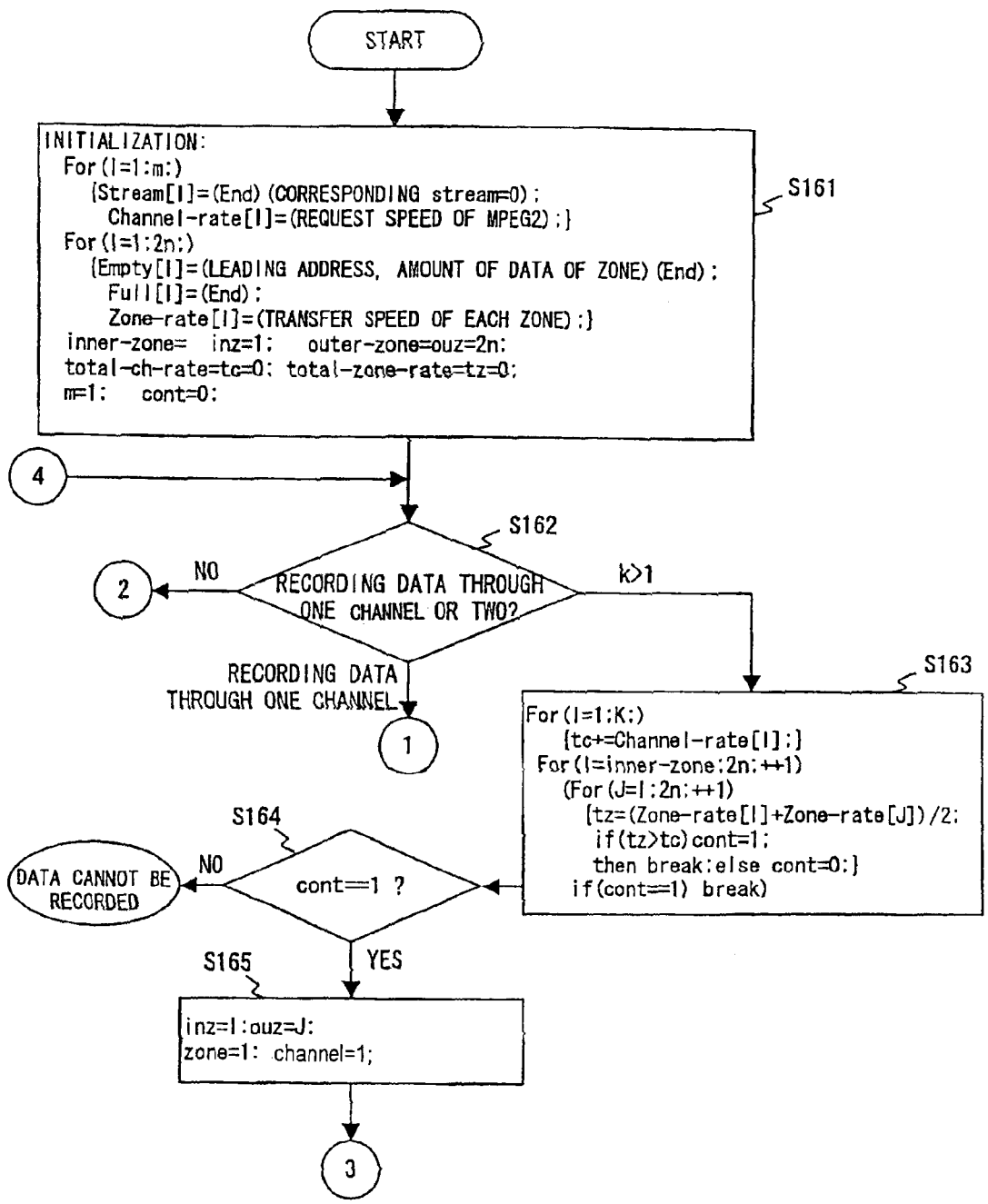
FIG. 56 is a flowchart (1) of the algorithm of simultaneously recording data through a plurality of channels by selecting a plurality of zones such that the general storage performance can be higher than the general request performance.
Figure 57:
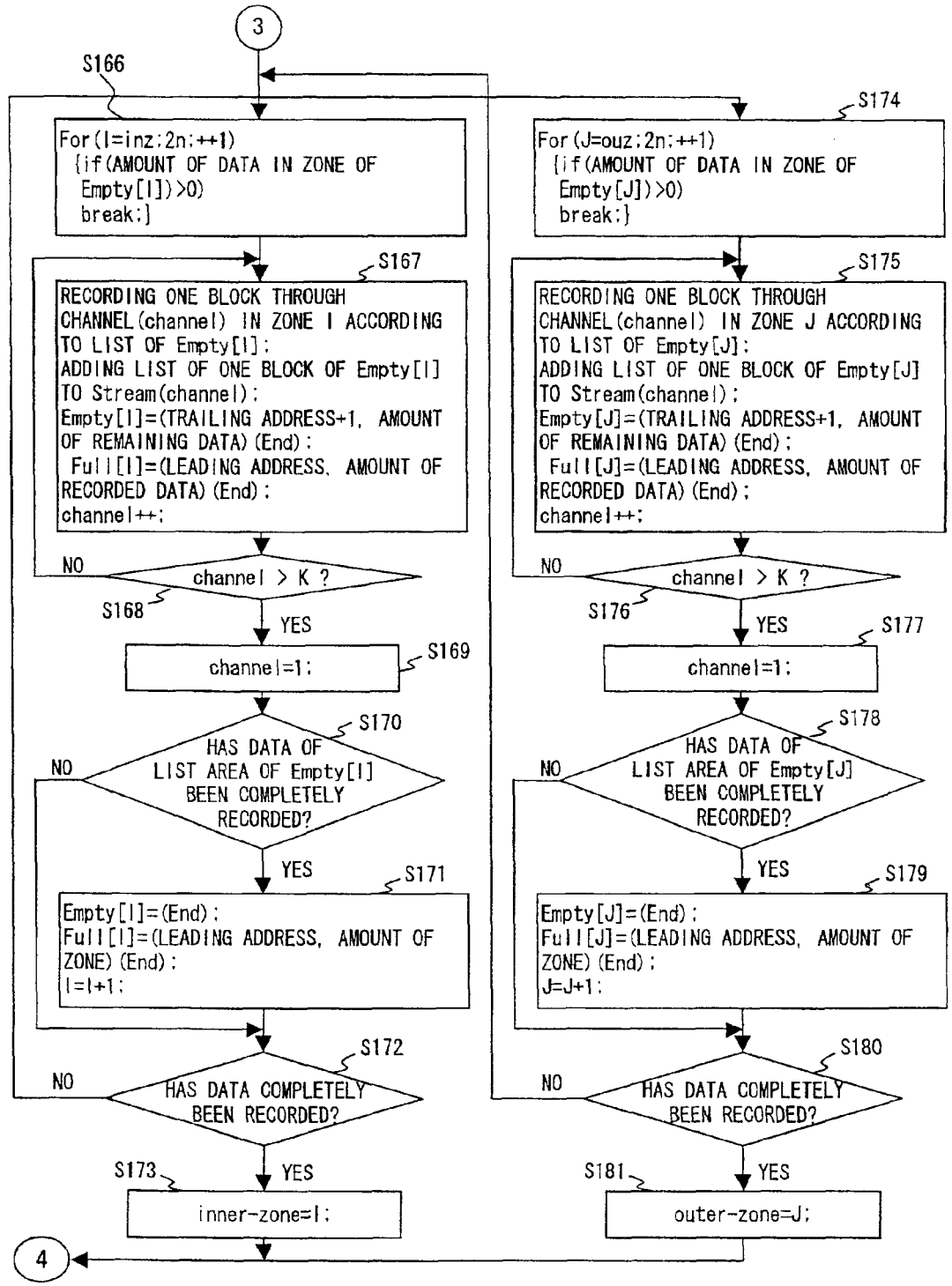
FIG. 57 is a flowchart (2) of the algorithm of simultaneously recording data through a plurality of channels by selecting a plurality of zones such that the general storage performance can be higher than the general request performance.

The processes shown in the flowchart in FIG. 60 are those performed when it is determined in step S162 in the flowchart shown in FIG. 56 that an instruction to record data through k channels has been issued, and replace the processes in steps S163 through S181 of the flowcharts shown in FIGS. 56 and 57.

Therefore, the processes in the flowchart shown in FIG. 60 can be recognized as a subroutine which is invoked when it is determined in step S162 that an instruction to record data through k channels has been issued after the process in step S161, and returns control to step S162 shown in FIG. 56 after the processes have been completed.

Described below is the flowchart shown in FIG. 60.

First, the Empty list is searched for the zone J having an empty area while moving the head zone by zone from outer zones to inner zones (step S201)

Then, according to the list of the Empty [J], one block of data is recorded through the channel specified by channel in the empty area of the zone J. Then, the list of the one block of data up to the trailing address at which the data has been recorded in the zone J is added to the Stream (channel). Then, the list of (the trailing address+1, the amount of remaining data) (End) is registered in the Empty [J], and the list of (the leading address of the zone J, the amount of recorded data) (End) is registered in the Full [J]. Then, the value of channel is incremented by 1 (step S202).

Then, it is determined whether or not channel>k (step S203). If not, control is returned to step S202. Thus, the process in step S202 is repeated until it is determined in step S203 that channel>k, that is, it is determined that one block of data has completely been recorded through k channels.

If it is determined in step S203 that one block of data has completely been recorded through k channels, then channel is initialized to 1 (step S204), and it is further determined whether or not the list area (an empty area of the zone J) of the Empty [J] has completely been recorded (step S205). If not, control is passed to step S207. If yes, the Empty [J] is set to End. Furthermore, the list of (the leading address of the zone J, the amount of data of the zone J) (End) is registered in the Full [J]. Then, J is decremented by 1, and the target zone is transferred to an inner zone (step S206).

Then, it is determined whether of not data has completely been recorded (step S207). If not, control is returned to step S201, and data is recorded in the adjacent inner zone. On the other hand, if data has completely been recorded, the outer zone indicating the zone which is the next starting point of recording data is set to J (step S207), and control is returned to step S162 shown in FIG. 56.

Since the above mentioned disk is revolution-controlled in the ZCLV system, the transfer speed is constant in any zone. Therefore, no merit can be gained by moving the head among zones. On the contrary, moving the head among zones incurs an access time loss due to the seek time, etc. Therefore, in this case, plural zones are not used, but the block data can be sequentially and continuously recorded with efficiency in the same zone through k channels by sequentially moving the head to an inner zone from an outer zone having a larger storage capacity.

The program for realizing the process on the disk shown in FIGS. 31 through 60 is executed by the MPU 61 for controlling the disk access of the storage system shown in FIG. 30. That is, it is executed by the MPU 61 comprising the microprocessor 71 and the memory 72 shown in FIG. 30. In this case, the program executed by the MPU 61 is stored in the portable storage medium 74, and the portable storage medium 74 is installed in the medium drive device 73, thereby allowing the MPU 61 to access the medium drive device 73 and load the program stored in the portable storage medium 74 to the memory 72 for execution.

Furthermore, the program can be downloaded through various networks such as a public line, a dedicated line, Internet, etc. In this case, for example, when an information provider manages the program and the program is updated, it is also possible to immediately download it from the information provider. Additionally, the information provider can remotely maintain the program through a network.

As described above, according to the present invention, the deadline can be determined at an actual transfer rate for write data, and disk access schedule is fixed based on the deadline, thereby allowing a large number of channels to be used in recording and reading data. Furthermore, by utilizing the difference in transfer rate among write areas in response to a plurality of real time write requests, the processes can be efficiently performed, and a larger number of channels can be used in recording and reading data.

Furthermore, according to the present invention, when data is simultaneously recorded through two channels, using the seriality of the storage areas of groove and land, the data through one channel can be recorded on the groove while the data through the other channel can be recorded on the land. As a result, data can be quickly recorded, and then can be quickly read and deleted afterwards. Furthermore, the number of times of the garbage collecting processes can be considerably reduced.

When data is simultaneously recorded through a plurality of channels on the disk whose revolution is controlled by the ZCAV system, a plurality of zones having a total storage function (average of the transfer functions of the zones in which data is recorded) exceeding the total request function (a total of request functions for simultaneously recording data through a plurality of channels) are selected, and the data is distributed and recorded in the plurality of zones through the plurality of channels, thereby quickly recording the data through a plurality of channels and easily reading and deleting the data afterwards through each channel.

Furthermore, when data is simultaneously recorded through a plurality of channels on a disk whose revolution is controlled by the ZCLV system, block data can also be continuously and sequentially recorded in the same zone without using a plurality of zones through each channel while sequentially moving the head to an inner zone from an outer zone having a larger storage capacity, thereby realizing quick data recording.

The present invention can be applied not only to a process of pictures and voice data through a home network, but also to any process in which data has to be processed in real time through a plurality of channels. For example, when data to be processed is fetched to a computer system, similar control can be performed. Access can be gained to a disk type storage medium such as a magnetic disk, an optical disk, a magneto-optical disk, etc., and any other storage medium such as a memory card, etc.

What is claimed is:

1. An access control apparatus which processes a plurality of access requests to a storage medium, comprising:
   a scheduling unit determining a deadline of reading and writing processing for the storage medium, based on a change of a transfer rate of data which is actually received, and setting an execution schedule for the plurality of access requests in descending order of deadlines; and
   a control unit controlling execution of the access requests according to the execution schedule.

2. The apparatus according to claim 1, wherein
   said scheduling unit determines the deadline of the reading process according to information about a deadline which is determined when the received data is written in response to read data from the storage medium.

3. An access control apparatus which processes a plurality of access requests to a storage medium, comprising:
   a scheduling unit determining a deadline of an accessing process depending on a change of a data transfer rate, and setting an execution schedule for the plurality of access requests in order from a process having an earliest deadline; and
   a control unit controlling execution of the access requests according to the execution schedule, and
   wherein said control unit comprises a buffer unit for buffering only valid data excluding dummy data as write data in received data when said control unit receives a request to write data to the storage medium, and said scheduling unit determines a deadline of a writing process based on a time required by said buffer unit to buffer the valid data in a predetermined area.

4. The apparatus according to claim 3, wherein
   said control unit controls information about the deadline of the writing process to be written in the storage medium together with the write data.

5. The apparatus according to claim 3, wherein
   upon receipt of the request to read data from the storage medium, said control unit adds the dummy data to the read data based on a transfer order of the dummy data and the valid data when the read data is written.

6. An access control apparatus which processes a plurality of access requests to a disk type storage medium, comprising:
   a determination unit determining a write position of data on the disk type storage medium in such a way that a plurality of write positions can be located close to each other in response to requests to write data into the disk type storage medium; and
   a control unit controlling a process of sequentially writing data to a write area on the disk type storage medium specified by each write request.

7. The apparatus according to claim 6, wherein
   said determination unit determines the write area based on at least one of a number of the write requests and a total transfer rate of the plurality of write requests.

8. A method for controlling access in processing a plurality of access requests to a storage medium, comprising:
   determining a deadline of reading and writing processing for the storage medium, based on a change of a transfer rate of data which is actually received;
   setting an execution schedule for the plurality of access requests in descending order of deadlines; and
   controlling execution of the access requests according to the execution schedule.

9. A method for controlling access in processing a plurality of access requests to a disk type storage medium, comprising:

determining a write position of data on the disk type storage medium in such a way that a plurality of write positions can be located close to each other in response to a plurality of requests to write data into the storage medium; and controlling a process of sequentially writing data into a write area specified by each write request.

10. A computer-readable storage medium storing a program used with a device for processing a plurality of access requests to a storage medium to direct a computer to perform:

determining a deadline of reading and writing processing for the storage medium based on a change of a transfer rate of data which is actually received;

setting an execution schedule for the plurality of access requests in descending order of deadlines; and controlling execution of the access requests according to the execution schedule.

11. A computer-readable storage medium storing a program used with a processing device for processing a plurality of access requests to a disk type storage medium to direct a computer to perform:

determining a write position of data on the disk type storage medium in such a way that a plurality of write positions can be located close to each other in response to a plurality of requests to write data to the disk type storage medium; and controlling a process of sequentially writing data into a write area specified by each write request.

* * * * *